US012761593B2

(12) United States Patent
Nihonyanagi et al.

(10) Patent No.: US 12,761,593 B2
(45) Date of Patent: Oct. 13, 2026

(54) IMAGE FORMING APPARATUS HAVING IMAGE FORMING UNIT AND FIXING DEVICE

(71) Applicant: CANON KABUSHIKI KAISHA, Tokyo (JP)

(72) Inventors: Koji Nihonyanagi, Shizuoka (JP); Takashi Honke, Shizuoka (JP); Toshiya Kaino, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/939,843

(22) Filed: Nov. 7, 2024

(65) Prior Publication Data

US 2025/0155841 A1 May 15, 2025

(30) Foreign Application Priority Data

Nov. 15, 2023 (JP) ................................ 2023-194635

(51) Int. Cl.
*G03G 15/20* (2006.01)
*G03G 15/00* (2006.01)

(52) U.S. Cl.
CPC ....... *G03G 15/206* (2013.01); *G03G 15/2053* (2013.01); *G03G 15/2064* (2013.01); *G03G 15/657* (2013.01)

(58) Field of Classification Search
USPC .......................................................... 399/329
See application file for complete search history.

(56) References Cited

U.S. PATENT DOCUMENTS 5,195,430 A * 3/1993 Rise ........................ G03B 27/32 100/168
5,525,775 A 6/1996 Setoriyama et al.
2018/0024481 A1* 1/2018 Umeda ................ H05B 3/0095 219/216

FOREIGN PATENT DOCUMENTS

JP 4-44075 A 2/1992
JP 6-130846 A 5/1994
JP 2005-284089 A 10/2005
JP 2014-115509 A 6/2014
JP 2019-23681 A 2/2019
JP 2022-66948 A 5/2022
JP 2022-126295 A 8/2022

* cited by examiner

*Primary Examiner* — Quana Grainger
(74) *Attorney, Agent, or Firm* — Venable LLP

(57) ABSTRACT

A fixing device includes a heating unit configured to heat a sheet, and a counter roller facing the heating unit and forming a fixing nip together with the heating unit. The counter roller includes a roller portion including an elastic layer. When a side on which a predetermined position is positioned with respect to a central portion of the roller portion in a width direction is defined as a first side, and a side opposite to the first side is defined as a second side, the roller portion has a first end portion which is an end portion on the first side in the width direction, and a second end portion which is an end portion on the second side in the width direction. A thickness of the elastic layer at the second end portion is smaller than a thickness of the elastic layer at the first end portion.

35 Claims, 21 Drawing Sheets

IMAGE FORMING APPARATUS HAVING IMAGE FORMING UNIT AND FIXING DEVICE

BACKGROUND OF THE INVENTION

Field of the Invention

The present invention relates to a fixing device used in an image forming apparatus using an electrophotographic system or an electrostatic recording system, and the image forming apparatus including the fixing device.

Description of the Related Art

Hitherto, for example, in an image forming apparatus of an electrophotographic system, a fixing device that fixes an unfixed toner image formed on a sheet to the sheet is used, and, for example, a film heating type fixing device is widely used as the fixing device (see JP H04-044075 A). The film heating type fixing device includes a heating unit that heats a sheet, and a counter roller that faces the heating unit and forms a fixing nip together with the heating unit. The heating unit includes a tubular film (hereinafter, referred to as a fixing film) having high heat resistance and flexibility, and a ceramic heater (hereinafter, referred to as a heater) provided in an internal space of the fixing film.

Further, as an image forming apparatus, there is known an image forming apparatus that employs a side-end reference conveyance method in which a positional reference in a width direction of a sheet is not set at the center in the width direction but at one side end (see JP 2019-23681 A). Such a side-end reference image forming apparatus has, for example, a configuration of a conveyance unit that abuts on a wall surface on a reference side and conveys a recording material at the time of conveying the recording material.

However, in a case where the side-end reference conveyance method described in JP 2019-23681 A is applied to the fixing device described in JP H04-044075 A, since a temperature of a non-sheet-passing portion rises higher than that of a sheet passing portion, there is a possibility that a force (hereinafter, referred to as a shift force), which shifts the fixing film in the width direction of the sheet, is generated. In a case where the fixing film receives the shift force, an end surface in a pressurizing direction of the shift force rotates while being pressed by a restriction member, and thus, wear, damage, and the like may occur, and an increase in life of the heating unit may be hindered. On the other hand, when a thickness of the fixing film is increased in order to increase the life, there is a possibility that a thermal conductivity of the fixing film decreases and fixing processing is slowed down.

SUMMARY OF THE INVENTION

According to a first aspect of the present invention, a fixing device includes a heating unit configured to heat a sheet, and a counter roller facing the heating unit and forming a fixing nip together with the heating unit. The fixing device is configured to fix a toner image borne on the sheet to the sheet by applying heat and pressure at the fixing nip. One end portion of the sheet conveyed to the fixing device in a width direction intersecting a sheet conveyance direction passes through a predetermined position of the fixing nip in the width direction regardless of a size of the sheet. The counter roller includes a roller portion including a base portion and an elastic layer provided around the base portion and having elasticity. In a case where a side on which the predetermined position is positioned with respect to a central portion of the roller portion in the width direction is defined as a first side, and a side opposite to the first side is defined as a second side, the roller portion has a first end portion which is an end portion on the first side in the width direction, and a second end portion which is an end portion on the second side in the width direction. A thickness of the elastic layer at the second end portion is smaller than a thickness of the elastic layer at the first end portion.

According to a second aspect of the present invention, a fixing device includes a heating unit configured to heat a sheet, a counter roller facing the heating unit and forming a fixing nip together with the heating unit, and an urging unit configured to urge one of the heating unit and the counter roller toward the other one of the heating unit and the counter roller. The fixing device is configured to fix a toner image borne on the sheet to the sheet by applying heat and pressure at the fixing nip. One end portion of the sheet conveyed to the fixing device in a width direction intersecting a sheet conveyance direction passes through a predetermined position of the fixing nip in the width direction regardless of a size of the sheet. The counter roller includes a roller portion including a base portion and an elastic layer provided around the base portion and having elasticity. In a case where a side on which the predetermined position is positioned with respect to a central portion of the roller portion in the width direction is defined as a first side, and a side opposite to the first side is defined as a second side, the roller portion has a first end portion which is an end portion on the first side in the width direction, and a second end portion which is an end portion on the second side in the width direction. The urging unit is configured such that an urging force at the first end portion is larger than an urging force at the second end portion. The elastic layer includes a high-hardness region provided on the first side and having a hardness higher than that of the elastic layer at the central portion.

According to a third aspect of the present invention, a fixing device includes a heating unit configured to heat a sheet, and a counter roller facing the heating unit and forming a fixing nip together with the heating unit. The fixing device is configured to fix a toner image borne on the sheet to the sheet by applying heat and pressure at the fixing nip. One end portion of the sheet conveyed to the fixing device in a width direction intersecting a sheet conveyance direction passes through a predetermined position of the fixing nip in the width direction regardless of a size of the sheet. The heating unit includes an endless rotary member that is rotatable and flexible, a heater disposed in an internal space of the rotary member and configured to heat the rotary member, and a restriction member. The counter roller includes a roller portion including a base portion and an elastic layer provided around the base portion and having elasticity. In a case where a side on which the predetermined position is positioned with respect to a central portion of the roller portion in the width direction is defined as a first side, and a side opposite to the first side is defined as a second side, the restriction member has a restriction surface configured to come into contact with an end surface of the rotary member on the second side in the width direction to restrict movement of the rotary member toward the second side. The rotary member includes a base layer and an elastic layer provided around the base layer and containing a filler. The base layer has a protruding portion that protrudes in a first direction directing from the first side to the second side in the width direction relative to the elastic layer and is configured to come into contact with the restriction surface in the width direction.

According to a fourth aspect of the present invention, a fixing device includes a heating unit configured to heat a sheet, and a counter roller facing the heating unit and forming a fixing nip together with the heating unit. The fixing device is configured to fix a toner image borne on the sheet to the sheet by applying heat and pressure at the fixing nip. One end portion of the sheet conveyed to the fixing device in a width direction intersecting a sheet conveyance direction passes through a predetermined position of the fixing nip in the width direction regardless of a size of the sheet. The heating unit includes an endless rotary member that is rotatable and flexible, a heater disposed in an internal space of the rotary member and configured to heat the rotary member, a first support member disposed in the internal space and configured to support the heater, and a second support member disposed in the internal space and configured to support the first support member. The counter roller includes a roller portion including a base portion and an elastic layer provided around the base portion and having elasticity. In a case where a side on which the predetermined position is positioned with respect to a central portion of the roller portion in the width direction is defined as a first side, and a side opposite to the first side is defined as a second side, the first support member includes a first guide portion that is provided on the first side in the width direction and is configured to guide the rotary member at a position upstream of the fixing nip in the sheet conveyance direction, and a second guide portion that is provided on the second side in the width direction and is configured to guide the rotary member at a position upstream of the fixing nip in the sheet conveyance direction. The second support member has a facing portion that is positioned farther from the fixing nip than the first guide portion and the second guide portion in an orthogonal direction orthogonal to the sheet conveyance direction and the width direction, and faces an upstream part of an inner circumferential surface of the rotary member in the sheet conveyance direction. A distance from the facing portion to an upstream end of the second guide portion in the sheet conveyance direction is longer than a distance from the facing portion to an upstream end of the first guide portion in the sheet conveyance direction.

According to a fifth aspect of the present invention, a fixing device includes a heating unit configured to heat a sheet, and a counter roller facing the heating unit and forming a fixing nip together with the heating unit. The fixing device is configured to fix a toner image borne on the sheet to the sheet by applying heat and pressure at the fixing nip. One end portion of the sheet conveyed to the fixing device in a width direction intersecting a sheet conveyance direction passes through a predetermined position of the fixing nip in the width direction regardless of a size of the sheet. The heating unit includes an endless rotary member that is rotatable and flexible, a heater disposed in an internal space of the rotary member and configured to heat the rotary member, a first support member disposed in the internal space and configured to support the heater, and a second support member disposed in the internal space and configured to support the first support member. The counter roller includes a roller portion including a base portion and an elastic layer provided around the base portion and having elasticity. The second support member has a facing portion that faces an upstream part of an inner circumferential surface of the rotary member in the sheet conveyance direction at an end portion on a side opposite to the roller portion with respect to the fixing nip in an orthogonal direction orthogonal to the sheet conveyance direction and the width direction. The heating unit includes a cover disposed on a side opposite to the predetermined position with respect to a central portion of the roller portion in the width direction, the cover being provided between the facing portion of the second support member and the inner circumferential surface of the rotary member upstream in the sheet conveyance direction.

According to a sixth aspect of the present invention, a fixing device includes a heating unit configured to heat a sheet, and a counter roller facing the heating unit and forming a fixing nip together with the heating unit. The fixing device is configured to fix a toner image borne on the sheet to the sheet by applying heat and pressure at the fixing nip. One end portion of the sheet conveyed to the fixing device in a width direction intersecting a sheet conveyance direction passes through a predetermined position of the fixing nip in the width direction regardless of a size of the sheet. The heating unit includes an endless rotary member that is rotatable and flexible, a heater disposed in an internal space of the rotary member and configured to heat the rotary member, and a restriction member. The counter roller includes a roller portion including a base portion and an elastic layer provided around the base portion and having elasticity. In a case where a side on which the predetermined position is positioned with respect to a central portion of the roller portion in the width direction is defined as a first side, and a side opposite to the first side is defined as a second side, the restriction member has a restriction surface configured to come into contact with an end surface of the rotary member on the second side in the width direction to restrict movement of the rotary member toward the second side, and a guide portion provided so as to protrude from the restriction surface toward the rotary member in the width direction and configured to guide the rotary member by coming into contact with an inner circumferential surface of the rotary member. The restriction member is configured to move to a first position and a second position such that the guide portion of the restriction member positioned at the second position is located upstream in the sheet conveyance direction of the guide portion of the restriction member positioned at the first position, and is configured to move from the first position to the second position by the rotary member pushing the restriction surface in a first direction directing from the first side toward the second side in a case where the restriction member is positioned at the first position.

According to a seventh aspect of the present invention, an image forming apparatus includes an image forming unit configured to form a toner image on a sheet, and the fixing device configured to fix the toner image formed by the image forming unit to the sheet.

Further features of the present invention will become apparent from the following description of exemplary embodiments with reference to the attached drawings.

BRIEF DESCRIPTION OF THE DRAWINGS

FIGS. 4A and 4B are views illustrating the fixing device according to the first embodiment, in which FIG. 4A is a cross-sectional view of a counter roller, and FIG. 4B is a graph illustrating an outer diameter of the counter roller in a width direction.

DESCRIPTION OF THE EMBODIMENTS

First Embodiment

Figure 1A:
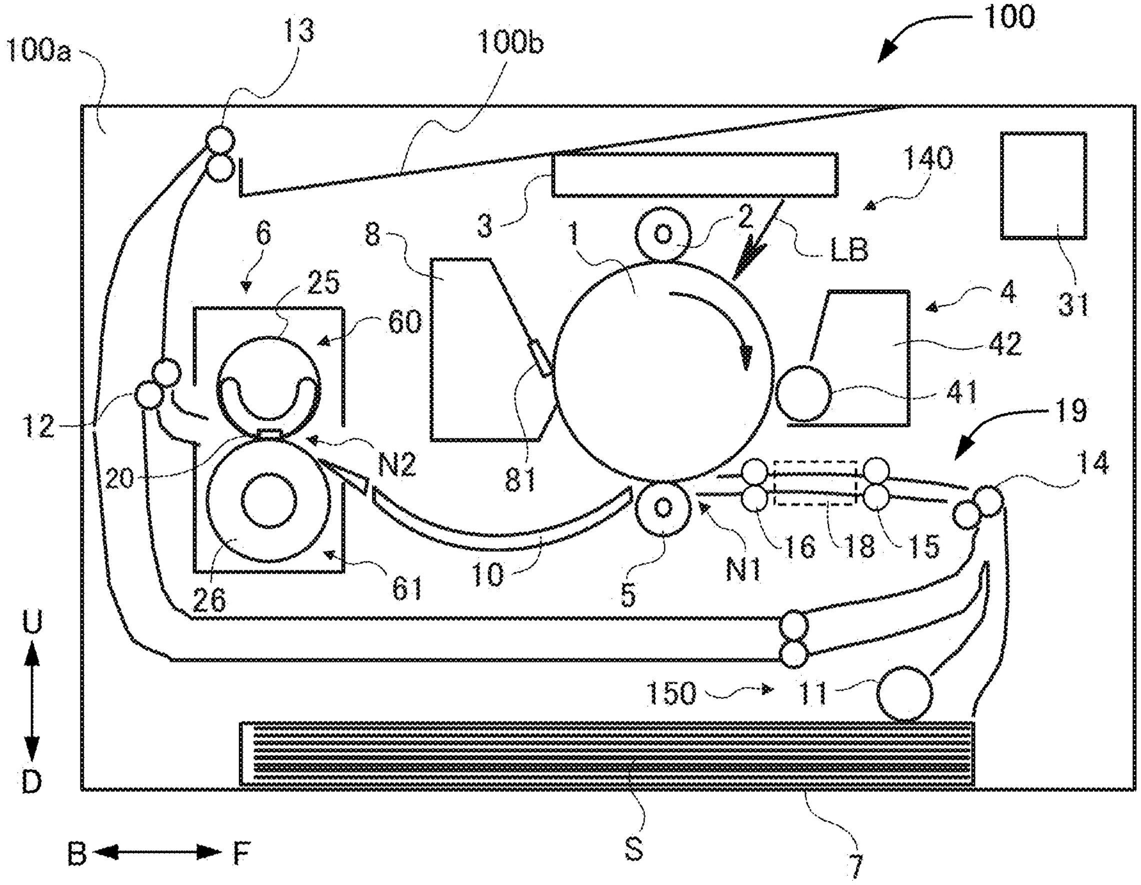
FIG. 1A is a schematic cross-sectional view illustrating an image forming apparatus according to a first embodiment.

First, a first embodiment of the present invention will be described. An image forming apparatus 100 is an electrophotographic laser beam printer that forms a monochrome toner image. FIG. 1A is an overall schematic cross-sectional view illustrating the image forming apparatus 100 according to the first embodiment.

Figure 1B:
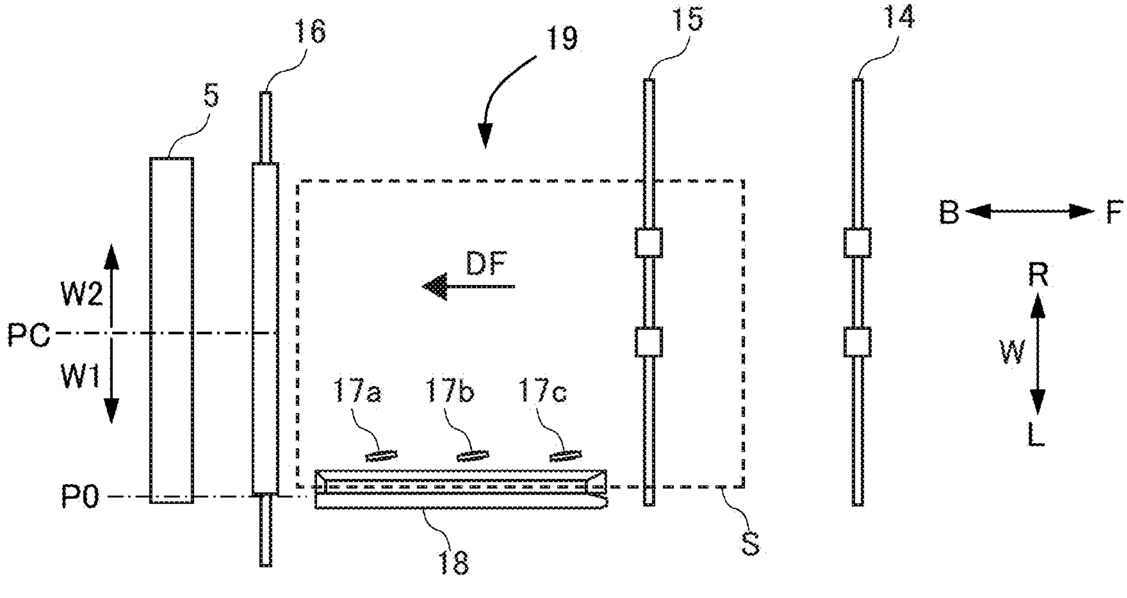
FIG. 1B is a plan view illustrating a skew feeding correction device according to the first embodiment.

Hereinafter, each direction is defined as each arrow indicating a direction in FIGS. 1A and 1B. That is, an upward direction in the drawing of FIG. 1A is referred to as an upward direction U, a downward direction in the drawing is referred to as a downward direction D, a rightward direction in the drawing is referred to as a front direction F (front side direction), a leftward direction in the drawing is referred to as a back direction B (back side direction), a frontward direction in the drawing is referred to as a left direction L, and a rearward direction in the drawing is referred to as a right direction R (see FIG. 1B). As illustrated in FIG. 1B, a left-right direction is referred to as a width direction W that intersects a sheet conveyance direction DF (the width direction W is orthogonal to the sheet conveyance direction DF in the present embodiment).

Schematic Configuration of Image Forming Apparatus

The image forming apparatus 100 includes an image forming unit 140 that forms a toner image on a sheet that is a recording material, a feeding unit 150 that feeds the sheet to the image forming unit 140, a skew feeding correction device 19, and a fixing device 6 that heats and fixes the toner image on the sheet to the sheet. The image forming unit 140 includes a photosensitive drum 1 which is a drum-type electrophotographic photosensitive member as an image bearing member. The photosensitive drum 1 is rotatably supported by an apparatus body **100*a* forming a casing of the image forming apparatus 100. The image forming unit 140 includes a charging roller 2, a laser scanner 3, a developing device 4, a transfer roller 5, and a cleaning device 8 which are arranged in order in a rotation direction around an outer circumferential surface of the photosensitive drum 1**.

The image forming apparatus 100 according to the first embodiment includes a control unit 31. The control unit 31 controls the image forming unit 140, the feeding unit 150, the fixing device 6, and the like. The control unit 31 includes a central processing unit (CPU) and a memory such as a read only memory (ROM) or a random access memory (RAM), and the memory stores various programs necessary for image formation. The control unit 31 receives a print signal from an external device such as a host computer, and performs a predetermined image formation control sequence based on the print signal.

When the control unit 31 performs the control sequence, a drum motor (not illustrated) is rotationally driven, and the photosensitive drum 1 rotates in an arrow direction at a predetermined circumferential speed (process speed). The surface of the rotating photosensitive drum 1 is uniformly charged to a predetermined potential having the same polarity (a negative polarity in the present embodiment) as toner by the charging roller 2. The laser scanner 3 scans the charged surface of the photosensitive drum 1 with a laser beam LB based on image information to expose the surface of the photosensitive drum 1. By such exposure, charges of the exposed portion are removed, and an electrostatic latent image is formed on the surface of the photosensitive drum 1.

The developing device 4 includes a developing roller 41 and a toner container 42 that stores the toner. The toner is rubbed by a member such as a urethane blade (not illustrated) and charged to a predetermined polarity (a negative polarity in the present embodiment). When a negative potential is applied to the developing roller 41 by a developing voltage power supply (not illustrated), the developing device 4 attaches the toner to the electrostatic latent image on the surface of the photosensitive drum 1 by using a potential difference, and develops the electrostatic latent image as a toner image T. As a positive potential having a polarity opposite to that of the toner is applied to the transfer roller 5, the toner image T formed on the surface of the photosensitive drum 1 is transferred to a sheet S by using a potential difference due to a transfer voltage.

Meanwhile, the feeding unit 150 includes a feeding roller 11 and a conveyance drive motor (not illustrated) that drives the feeding roller 11. The control unit 31 rotationally drives the conveyance drive motor, and the feeding roller 11 rotates to feed the sheet S supported and stored in a cassette 7 to a conveyance path. The sheet S is conveyed to the skew feeding correction device 19.

As illustrated in FIG. 1B, the skew feeding correction device 19 includes a plurality of conveyance roller pairs 14 and 15, skew roller pairs 17*a*, 17*b*, and 17*c*, and a side abutment plate 18. The skew feeding correction device 19 operates as follows, for example, in a case where the sheet S is conveyed in the sheet conveyance direction DF by the plurality of conveyance roller pairs 14 and 15 in a skewed state. First, when the sheet S reaches the skew roller pairs 17*a*, 17*b*, and 17*c*, a conveyance force is applied to the sheet S in the width direction W in addition to the sheet conveyance direction DE, so that the sheet S is conveyed while moving toward the side abutment plate 18. When a side end of the sheet S abuts on the side abutment plate 18, the skew roller pairs 17*a*, 17*b*, and 17*c* slip, so that the sheet S rotates and is aligned with the side abutment plate 18, thereby correcting skew feeing. Further, for example, even in a case where the sheet S is conveyed in the sheet conveyance direction DF by the plurality of conveyance roller pairs 14 and 15 in a state in which the sheet S is not skewed, the sheet S is conveyed so as to be aligned with the side abutment plate 18 by the skew roller pairs 17*a*, 17*b*, and 17*c*. In the present embodiment, an abutment surface of the side abutment plate 18 is set as a sheet passing reference position P0. As a result, the sheet S is conveyed based on a side-end reference, in which one end portion of the sheet S in the width direction W passes through the sheet passing reference position P0 (predetermined position) regardless of a size of the sheet at a transfer nip N1 of the image forming unit 140 and a fixing nip N2 of the fixing device 6. That is, the skew feeding correction device 19 is an example of a conveyance unit, is disposed upstream of the image forming unit 140 in the sheet conveyance direction DF, and conveys the sheet in the sheet conveyance direction DF while moving the sheet in the width direction W such that one end portion of the sheet passes through the sheet passing reference position P0 of the fixing nip N2.

A registration roller pair 16 is provided downstream of the skew feeding correction device 19 and upstream of the transfer nip N1 between the surface of the photosensitive drum 1 and an outer circumferential surface of the transfer roller 5. The control unit 31 adjusts a conveyance timing of the sheet S by the registration roller pair 16, and starts the conveyance of the sheet S such that the toner image is transferred from the photosensitive drum 1 to the sheet S at the transfer nip N1. In the present embodiment, a case where the skew feeding correction device 19 that conveys the sheet so as to be aligned with the side abutment plate 18 by the skew roller pairs 17*a*, 17*b*, and 17*c* is applied in order to implement the side-end reference has been described, but the present technology is not limited thereto. For example, the skew feeding correction device 19 does not have to be provided, and the side-end reference may be implemented by positioning the sheet in the width direction by moving the registration roller pair in the width direction in a state in which the sheet is nipped by the registration roller pair or the like.

The sheet S to which the toner image formed on the surface of the photosensitive drum 1 has been transferred is conveyed to the fixing device 6 along a conveyance guide 10, and the toner image on the sheet S is heated and pressed by the fixing device 6 to be heated on and fixed to the sheet S. The sheet S to which the toner image T is fixed is conveyed in the order of a conveyance roller pair 12 and a discharge roller pair 13, and discharged to a discharge tray 100*b* provided on an upper surface of the apparatus body 100*a*. The residual toner remaining on the surface of the photosensitive drum 1 after the toner image is transferred to the sheet S is removed by a cleaning blade 81 of the cleaning device 8 and accumulated in the cleaning device 8. Image formation is sequentially performed by repeating the above operation. The image forming apparatus 100 according to the first embodiment can form an image at a printing speed of 70 sheets/minute, for example, in the case of an A4-sized sheet.

Fixing Device

Figure 2:
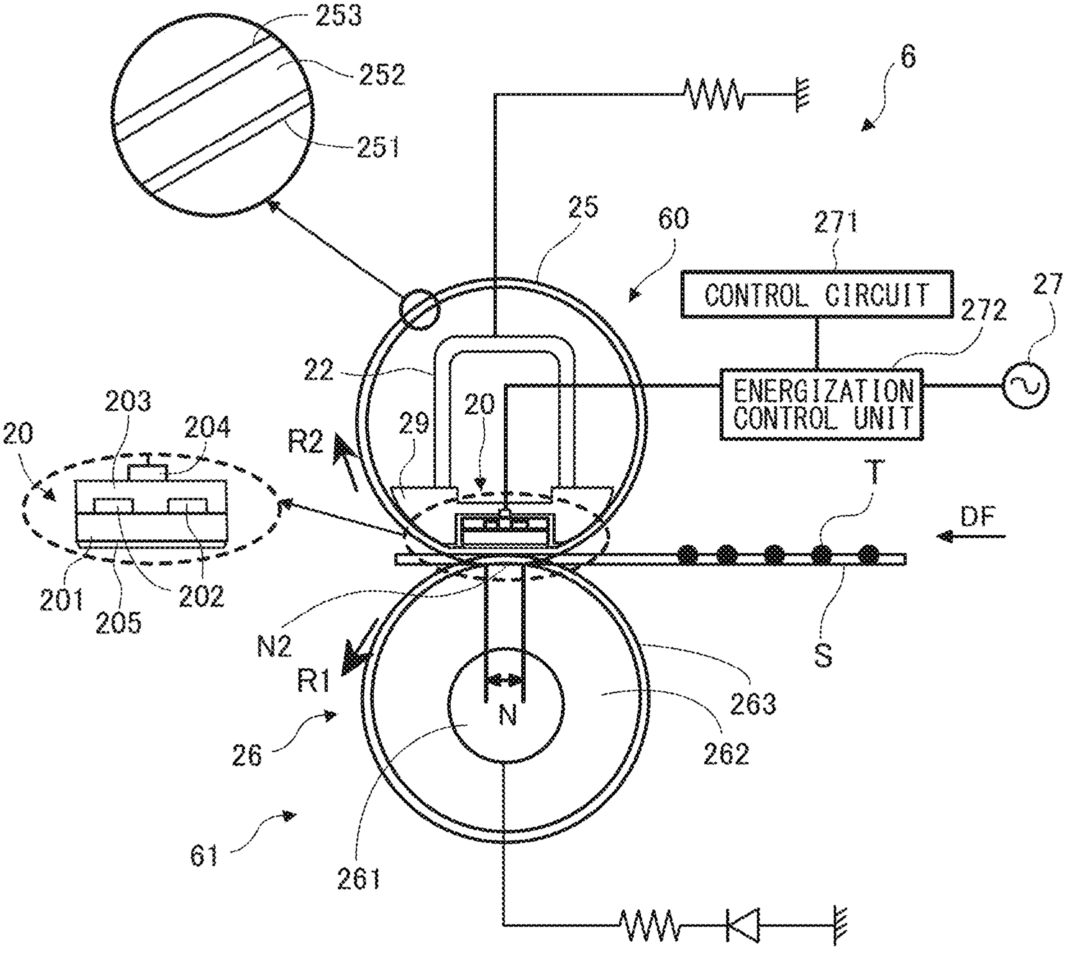
FIG. 2 is a schematic cross-sectional view of a fixing device according to the first embodiment.
Figure 3:
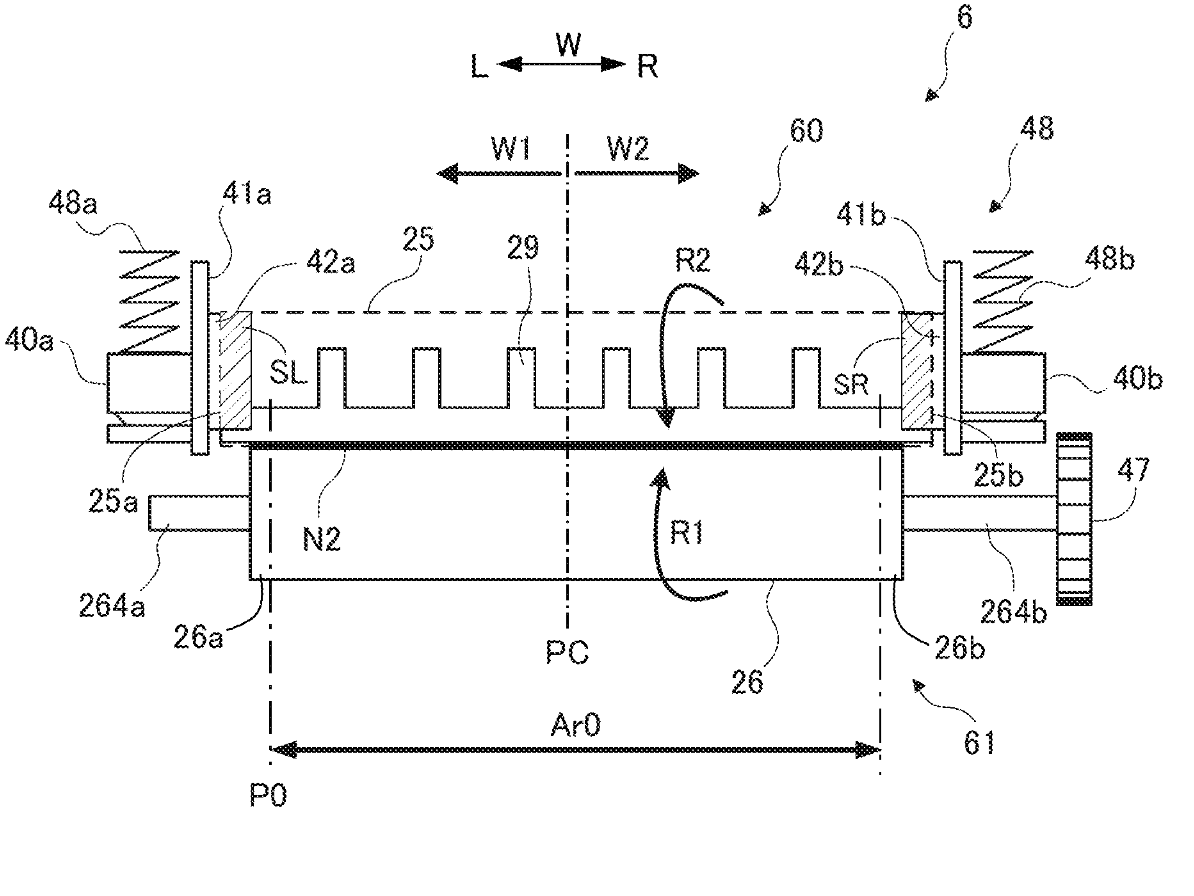
FIG. 3 is a schematic side view of the fixing device according to the first embodiment.

Next, the fixing device 6 will be described with reference to FIGS. 2 and 3. FIG. 2 is a cross-sectional view of the fixing device 6, and FIG. 3 is a schematic view of the fixing nip N2 when viewed from upstream (the front) in the sheet conveyance direction DF. The fixing device 6 fixes the toner image formed by the image forming unit 140 to the sheet. The fixing device 6 includes a heating unit 60 that heats the sheet S, a counter roller 61 that faces the heating unit 60 and forms the fixing nip N2 together with the heating unit 60, and an urging unit 48 (see FIG. 3). The counter roller 61 is rotationally driven by a driving gear 47 and rotationally driven in an R1 direction. A fixing film 25 is rotationally driven by the counter roller 61 that comes into contact with the fixing film 25 at the fixing nip N2, and is driven to rotate in an R2 direction opposite to the R1 direction. The fixing device 6 nips the sheet S at the fixing nip N2 and applies heat and pressure to fix the toner image T borne on the sheet S to the sheet S.

Counter Roller

The counter roller 61 includes a roller portion 26 that forms the fixing nip N2 together with the heating unit 60, and shaft portions 264*a* and 264*b* provided continuously from the roller portion 26 on both sides of the roller portion 26 in the width direction W. The shaft portions 264*a* and 264*b* are rotatably supported by a frame (not illustrated) of the fixing device 6. The roller portion 26 includes a base portion 261 which is a shaft core, an elastic layer 262 which is an example of a second elastic layer having elasticity and provided around the base portion 261, and a release layer 263 provided around the elastic layer 262.

In the present embodiment, in the width direction W, a side on which the sheet passing reference position P0 is positioned with respect to a central portion PC of the roller portion 26 is referred to as a first side W1, and a side opposite to the first side W1 is referred to as a second side W2. That is, the first side W1 is a left direction L side in the width direction W, and the second side W2 is a right direction R side in the width direction W. The right direction R is a first direction directing from the first side W1 to the second side W2 in the width direction W. The roller portion 26 has a first end portion 26*a*, which is an end portion on the first side W1, and a second end portion 26*b*, which is an end portion on the second side W2 in the width direction W. In the present specification, the first side W1 not only indicates the side on which the sheet passing reference position P0 is positioned with respect to the central portion PC of the roller portion 26 in the width direction W, but also may mean a direction from the side on which the sheet passing reference position P0 is not positioned toward the side on which the sheet passing reference position P0 is positioned (the left direction L in the present embodiment). Similarly, in the present specification, the second side W2 may mean not only the side opposite to the first side W1 in the width direction W, but also a direction from the side on which the sheet passing reference position P0 is present toward the side on which the sheet passing reference position P0 is not positioned (the right direction R in the present embodiment).

In the present embodiment, an outer diameter of the central portion PC of the roller portion 26 in the width direction W is about 25 mm. The base portion 261 is made of a metal material such as aluminum or iron, and has a solid or hollow shape. In the present embodiment, the base portion 261 is made of aluminum and has a solid shape. The elastic layer 262 is made of heat-resistant silicone rubber, and is made conductive by adding an electrically conductive material such as carbon.

The release layer 263 that comes into contact with an outer surface of the fixing film 25 is a releasable tube having a thickness of 10 to 80 μm and made of a fluororesin such as PFA, PTFE, or FEP. Here, PFA is an abbreviation of tetrafluoroethylene-perfluoroalkyl vinyl ether copolymer, PTFE is an abbreviation of polytetrafluoroethylene (tetrafluoride), and FEP is an abbreviation of tetrafluoroethylene-hexafluoropropylene copolymer (4,6-fluorinated).

It is desirable that the release layer 263 has conductivity from the viewpoint of preventing charge-up associated with sheet passage. However, on the other hand, when a conductive material is added for imparting conductivity, releasability is deteriorated, and there is a possibility that a problem that a mixture of the toner and paper dust adheres to the roller portion 26 (hereinafter, referred to as roller-contamination) occurs. It is known that means of applying a potential to the base portion 261 while using a high-resistance fluororesin material for the release layer 263 is effective to suppress the charge-up and the roller-contamination. Therefore, in the present embodiment, the release layer 263 of the roller portion 26 is a PFA tube having a thickness of 30 μm, and a potential of +300 Vis applied to the base portion 261.

Heating Unit

As illustrated in FIGS. 2 and 3, the heating unit 60 includes a heater 20, a heater holder 29, a stay 22 made of metal, the fixing film 25 having a tubular shape, and flanges 40*a* and 40*b*. An energization control unit 272 connected to a commercial AC power supply 27 supplies power to the base portion 261 based on a signal from a control circuit 271.

Heater

The heater 20 is disposed in an internal space of the fixing film 25 and heats the fixing film 25. The heater 20 includes a heat-resistant heater substrate 201 made of aluminum nitride, alumina, or the like. A resistor pattern 202 serving as a conductive heating resistance layer that generates heat by energization is formed on the surface of the heater substrate 201 by, for example, screen printing. The resistor pattern 202 is covered by a heat-resistant covering material 203, and a thermistor 204 serving as a temperature detection member that detects a temperature of the heater 20 is provided on the covering material 203. In the present embodiment, a case where the heater substrate 201 is made of ceramic such as aluminum nitride or alumina has been described, but the present technology is not limited thereto, and the heater substrate 201 may be made of metal. In this case, it is possible to employ a configuration in which an insulating layer made of glass or the like is provided on the surface of the heater substrate 201, and the resistor pattern 202 is provided on the insulating layer.

Heater Holder

The heater holder 29 is a holding member that holds the heater 20 serving as a heating body. That is, the heater holder 29 is an example of a first support member, is disposed in the internal space of the fixing film 25, and supports the heater 20. A heat-resistant resin such as a liquid crystal polymer, a phenol resin, PPS, or PEEK is used as a material of the heater holder 29. The heater holder 29 functions as a support member that supports the heater 20 and also functions as a guide member that guides rotation of the fixing film 25.

Stay

The stay 22 is an example of a second support member, is disposed in the internal space of the fixing film 25, and supports the heater holder 29. The stay 22 is fixedly supported by the frame (not illustrated) of the fixing device 6.

Fixing Film

The fixing film 25 is an example of a rotatable and flexible endless rotary member, and has a cylindrical shape having a diameter of 24 mm in the present embodiment. The fixing film 25 is loosely fitted onto the heater holder 29 from the outside such that a gap is provided therebetween. The fixing film 25 is formed by stacking a base layer 251, an elastic layer 252 which is an example of a first elastic layer provided around the base layer 251, and a surface layer 253 provided around the elastic layer 252. A heat-resistant resin material having a low heat capacity, such as polyimide, polyamideimide, PEEK, or PES, which is a general material, is used as a material of the base layer 251. A thickness of the base layer 251 is desirably 18 μm or more and 150 μm or less because it is necessary to reduce the heat capacity to achieve quick start performance and also satisfy a mechanical strength requirement. The base layer 251 according to the first embodiment is a cylindrical polyimide base layer having a thickness of 70 μm.

The elastic layer 252 is made of a material having elasticity typified by silicone rubber. As the elastic layer 252 is provided, it becomes possible to wrap the toner image T and uniformly apply heat, so that it is possible to obtain a high-quality image without unevenness. Since the elastic layer 252 has a low thermal conductivity with silicone rubber alone, a thermally conductive filler made of an inorganic material is added. A filler containing ceramic powder, metal oxide powder, or metal powder can be applied as the filler. In the present embodiment, a thermally conductive filler such as alumina, metallic silicon, silicon carbide, or zinc oxide is added as the filler to impart a high thermal conductivity to the elastic layer 252. In a high-speed machine such as the image forming apparatus 100 according to the first embodiment, an addition amount (content) of the filler may be appropriately adjusted to secure a thermal conductivity of 0.9 W/m K or more. In the present embodiment, alumina and metallic silicon are added as the thermally conductive fillers to a rubber material of the elastic layer 252, thereby securing a thermal conductivity of 1.5 W/m·K. The elastic layer 252 has a thickness of 270 μm.

The surface layer 253 is required to have high releasability for the toner and high abrasion resistance as a release layer. A fluororesin such as PFA, PTFE, or FEP is used as a material of the surface layer 253. The surface layer 253 is formed of a coating layer or tube layer obtained by firing a resin dispersion. In addition, conductivity may be imparted by adding an additive such as carbon or an ion conductive material to the fluororesin. In the surface layer 253 according to the first embodiment, a fluororesin (PFA) is used as the material, a conductive material is not added, and a tube layer having a thickness of 25 μm is used.

Flange

Next, the flanges 40*a* and 40*b* according to the present embodiment will be described with reference to FIG. 3. In FIG. 3, the fixing film 25 is indicated by a broken line and is illustrated in a manner in which the inside thereof is visible. The fixing film 25 may be shifted to the left or the right in the width direction W. The flanges 40*a* and 40*b* are provided so as to abut on both end portions of the fixing film 25 in the width direction W in order to regulate the shift. The first flange 40*a* is provided so as to face an end surface 25*a* of the fixing film 25 on the first side W1 in the width direction W, and the second flange 40*b* is provided so as to face an end surface 25*b* of the fixing film 25 on the second side W2 in the width direction W.

The first flange 40*a* includes a restriction surface 41*a* and a guide portion 42*a*. The second flange 40*b* is an example of a restriction member, and includes a restriction surface 41*b* and a guide portion 42*b*. Since the first flange 40*a* and the second flange 40*b* have horizontally symmetrical shapes, the second flange 40*b* will be mainly described below. The restriction surface 41*b* restricts movement of the fixing film 25 to the second side W2 (right direction R) by coming into contact with the end surface 25*b* of the fixing film 25 on the second side W2 in the width direction W. The guide portion 42*b* is provided so as to protrude in the left direction L from the restriction surface 41*b* toward the fixing film 25, and comes into contact with an inner circumferential surface of the fixing film 25 to guide the fixing film 25.

For example, when the shift of the fixing film 25 in the right direction R occurs, the end surface 25*b* of the fixing film 25 abuts on the restriction surface 41*b* of the second flange 40*b*, so that the shift is restricted. The guide portion 42*b* is in contact with the inner circumferential surface of the fixing film 25, and guides the inner circumferential surface of the fixing film 25 in an end portion region adjacent to the end surface 25*b* of the fixing film 25. In FIG. 3, the guide portion 42*a* of the first flange 40*a* and the inner circumferential surface of the fixing film 25 are in contact with each other in a contact region SL, and the guide portion 42*b* of the second flange 40*b* and the inner circumferential surface of the fixing film 25 are in contact with each other in a contact region SR.

For example, when the inner circumferential surface of the fixing film 25 and the guide portion 42*b* of the second flange 40*b* slide while being in contact with each other in the contact region SR, heat necessary for fixing the toner may escape from the fixing film 25 to the second flange 40*b*. Therefore, the guide portion 42*b* of the second flange 40*b* is provided outside (in the right direction R) a maximum conveyance region Ar0, which is a conveyance region for the sheet having a maximum width, in the width direction W. Similarly, the guide portion 42*a* of the first flange 40*a* is provided outside (in the left direction L) the maximum conveyance region Ar0 in the width direction W.

It is desirable that a material of the flanges 40*a* and 40*b* has the same hardness as that of the base layer 251 of the fixing film 25 which is a sliding counterpart member. This is because when the hardness of the flanges 40*a* and 40*b* is higher than that of the base layer 251 of the fixing film 25, wear occurs on an inner circumferential surface of the base layer 251 of the fixing film 25, and conversely, when the hardness of the flanges 40*a* and 40*b* is lower than that of the base layer 251, wear occurs on outer circumferential surfaces of the guide portions 42*a* and 42*b*. Therefore, in the present embodiment, a liquid crystal polymer (LCP) is used as the material of the flanges 40*a* and 40*b*.

Urging Unit

In the present embodiment, as illustrated in FIG. 3, the urging unit 48 urges the heating unit 60 toward the counter roller 61. The urging unit 48 includes a first urging spring 48*a*, which is an example of a first urging portion that urges the first flange 40*a* toward the counter roller 61, and a second urging spring 48*b*, which is an example of a second urging portion that urges the second flange 40*b* toward the counter roller 61. Each of the urging springs 48*a* and 48*b* is formed of, for example, a compression coil spring, but the type of the spring is not limited thereto, and for example, a tension coil spring or another type of spring may be applied.

The first urging spring 48*a* urges the first flange 40*a*, and the second urging spring 48*b* urges the second flange 40*b* to apply an urging force to the heater holder 29 via the stay 22 and press the fixing film 25 against the counter roller 61. As a result, a fixing nip N is formed between the fixing film 25 and the counter roller 61.

In the present embodiment, the first urging spring 48*a* is provided so as to urge the first flange 40*a* toward the counter roller 61, and the second urging spring 48*b* is provided so as to urge the second flange 40*b* toward the counter roller 61, but the present technology is not limited thereto. For example, at least one of the first urging spring 48*a* and the second urging spring 48*b* may be provided so as to urge the counter roller 61 to the flanges 40*a* and 40*b*. That is, the first urging spring 48*a* urges one of the heating unit 60 and the counter roller 61 toward the other one of the heating unit 60 and the counter roller 61 on the first side W1 in the width direction W. The second urging spring 48*b* urges one of the heating unit 60 and the counter roller 61 toward the other one of the heating unit 60 and the counter roller 61 on the second side W2 in the width direction W.

Similarly, in the present embodiment, a case where the urging unit 48 urges the heating unit 60 toward the counter roller 61 has been described, but the present technology is not limited thereto. For example, the counter roller 61 may be urged toward the heating unit 60. That is, the urging unit 48 urges one of the heating unit 60 and the counter roller 61 toward the other one of the heating unit 60 and the counter roller 61.

Shift of Fixing Film

Figure 5A:
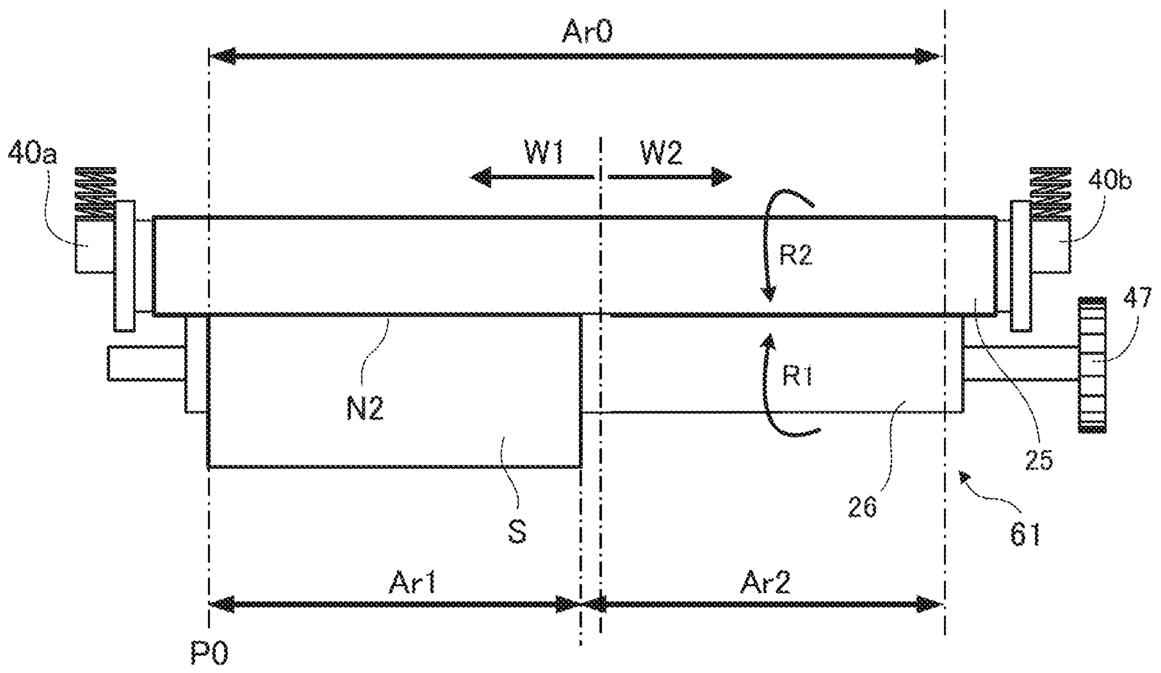
FIG. 5A is a schematic side view of the fixing device according to the first embodiment.

Here, the shift of the fixing film 25 will be described with reference to FIGS. 5A and 5B. FIG. 5A is a schematic view of the fixing nip N2 when the sheet passes based on the side-end reference when viewed from upstream (front side) in the sheet conveyance direction DF, and the sheet S is nipped and conveyed at the fixing nip N2 formed by the fixing film 25 and the roller portion 26. In the present embodiment, the maximum width of the sheet S that can pass through the fixing device 6 is a width of a letter size, and the maximum conveyance region Ar0 is set to the letter size. The sheet S illustrated in FIG. 5A is an A6-sized sheet S having a smaller dimension in the width direction W than the letter size having the maximum width.

Figure 5B:
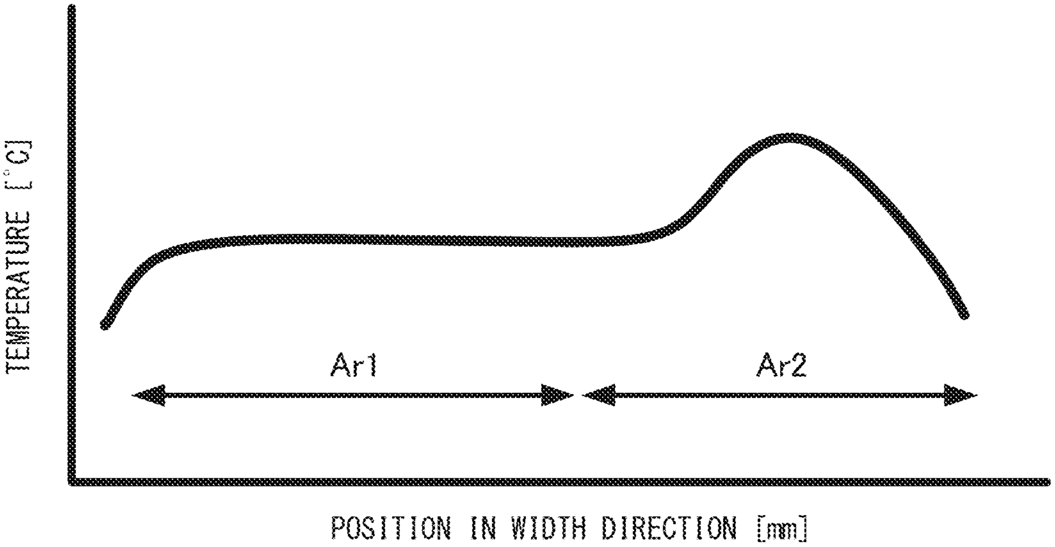
FIG. 5B is a graph illustrating a temperature distribution in the width direction of the counter roller according to the first embodiment.

FIG. 5B illustrates a distribution of a surface temperature of the counter roller 61 in the width direction W when the A6-sized sheet S continuously passes. As illustrated in FIG. 5B, the surface temperature of the counter roller 61 is relatively higher at a non-sheet-passing portion Ar2 than at a sheet passing portion Ar1. In the sheet passing portion Ar1, heat is transferred from the surface of the counter roller 61 to the sheet S, and the temperature of the counter roller 61 decreases. On the other hand, in the non-sheet-passing portion Ar2, since the sheet S does not exist, heat is constantly supplied from the fixing film 25 to the counter roller 61, and thus, the temperature of the counter roller 61 increases.

Here, the counter roller 61 includes the elastic layer 262 made of heat-resistant silicone rubber and provided on the outer circumference of the base portion 261, and the silicone rubber has a property of easily thermally expanding at a high temperature. Therefore, an outer diameter of the non-sheet-passing portion Ar2 of the counter roller 61 becomes larger than that of the sheet passing portion Ar1 due to thermal expansion of the silicone rubber. Therefore, a difference in circumferential speed of the counter roller 61 occurs in the width direction W, and the sheet passing portion Ar1 becomes relatively slow and the non-sheet-passing portion Ar2 becomes fast.

The counter roller 61 is rotationally driven by the driving gear 47 and rotationally driven in the R1 direction in FIG. 5A. The fixing film 25 is rotationally driven by the counter roller 61 at the fixing nip N2, and is driven to rotate in the R2 direction in FIG. 5A. At this time, in a case where there is a difference in circumferential speed of the counter roller 61, a shift force is generated toward a direction in which the fixing film 25 rotates faster, that is, the right direction R in FIG. 5A, the fixing film 25 being driven to rotate. Due to the shift force, the fixing film 25 moves to the right direction R in the width direction W and abuts on the second flange 40*b*. In a case where the temperature of the non-sheet-passing portion Ar2 of the counter roller 61 further increases and the shift force further increases, when the shift force exceeds a stiffness of the fixing film 25, the fixing film 25 may be deformed (buckled).

Here, a shift force generation mechanism will be described. When a portion of the roller portion 26 corresponding to the non-sheet-passing portion Ar2 is thermally expanded due to the temperature rise of the non-sheet-passing portion Ar2, and the outer diameter of the roller portion 26 is increased, the circumferential speed is increased. In the fixing device 6 based on the side-end reference, the temperature rise of the non-sheet-passing portion Ar2 occurs only on a side opposite to a reference surface in the width direction W. Therefore, in the fixing device 6 based on the side-end reference, a difference in outer diameter of the roller portion 26 occurs in the width direction W, and a feeding speed of the fixing film 25 at the fixing nip N2 varies in the width direction W. As a result, the shift force is generated toward a side on which a rotational speed of the fixing film 25 is higher. A magnitude of the shift force increases as the difference in outer diameter of the roller portion 26 in the width direction W, that is, the temperature rise of the non-sheet-passing portion Ar2, increases.

Therefore, in the present embodiment, a change in outer diameter after expansion is suppressed by making the thickness of the elastic layer 262 that thermally expands in the counter roller 61 different in the width direction W. Hereinafter, the counter roller 61 according to the present embodiment will be described with reference to FIGS. 4A and 4B.

Figure 4A:
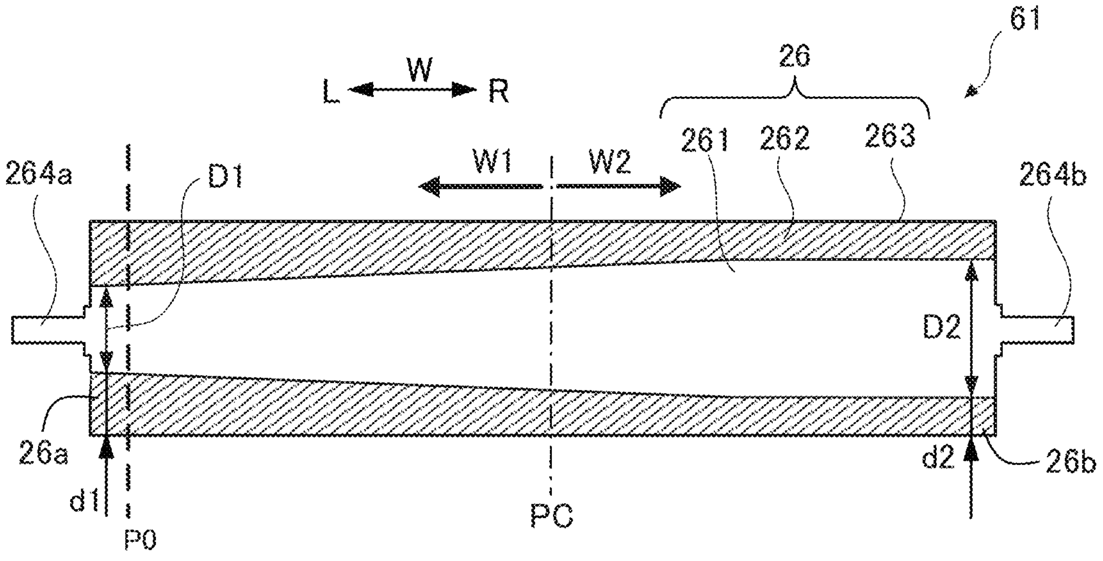

FIG. 4A is a schematic view illustrating a cross section of the counter roller 61 in the width direction W, and illustrates the elastic layer 262 on the outer circumference of the base portion 261. In the present embodiment, the roller portion 26 includes the elastic layer 262 on the base portion 261, and a maximum outer diameter D1 of the base portion 261 at the first end portion 26*a* of the roller portion 26 is smaller than a maximum outer diameter D2 of the base portion 261 at the second end portion 26*b*. In the present embodiment, D1 is 20 mm, and D2 is 22 mm. A shape between D1 and D2 may be a tapered shape connecting D1 and D2, or a straight portion having an outer diameter that does not change may be partially provided and a portion other than the straight portion may have a tapered shape.

Since the outer diameter of the roller portion 26 does not greatly change in the width direction W, a thickness d2 of the elastic layer 262 at the second end portion 26*b* is made smaller than a thickness d1 of the elastic layer 262 at the first end portion 26*a*. As a result, as illustrated in FIG. 5A, even when the non-sheet-passing portion Ar2 has a relatively higher temperature than the sheet passing portion Ar1, an expansion amount of the elastic layer 262 in the non-sheet-passing portion Ar2 can be made smaller than an expansion amount of the elastic layer 262 in the sheet passing portion Ar1. Therefore, in terms of the outer diameter of the roller portion 26, the non-sheet-passing portion Ar2 can be suppressed from being significantly larger than the sheet passing portion Ar1, and the generation of the shift force can be reduced.

The thickness d2 of the elastic layer 262 at the second end portion 26*b* is preferably 65% or more and 75% or less of the thickness d1 of the elastic layer 262 at the first end portion 26*a*, and is about 69% in the present embodiment. In view of a fixing temperature and a thermal expansion coefficient of the elastic layer, when the thickness d2 of the elastic layer 262 is 65% or more and 75% or less of the thickness d1 of the elastic layer 262, it is possible to more effectively suppress the generation of the shift force than when the thickness d2 is less than 65% or more than 75% of the thickness d1 of the elastic layer 262.

Figure 4B:
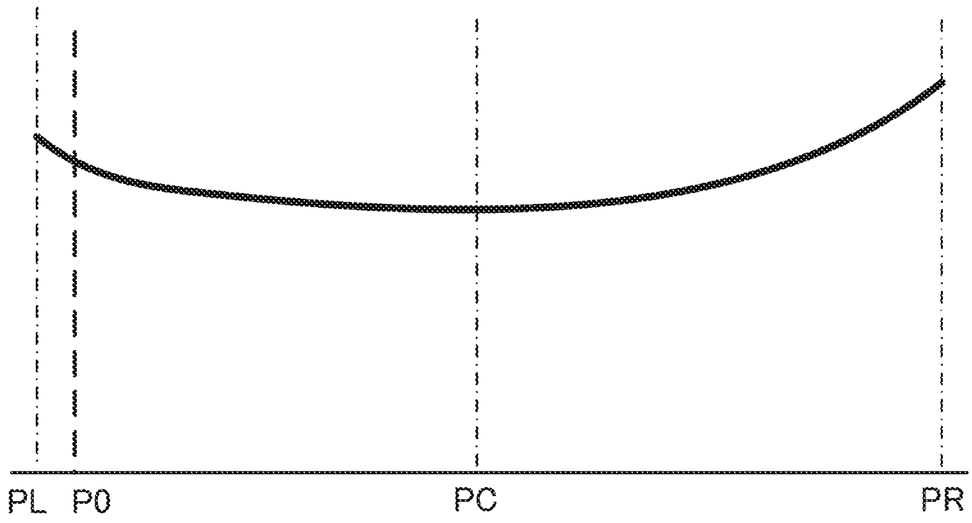

FIG. 4B illustrates a profile when an outer diameter shape of the counter roller 61 is measured, which has an inverted crown shape in which the outer diameter of the central portion PC is the smallest, and the outer diameter increases in a quadratic curve manner from the central portion PC toward an end surface PL on the first side W1 and an end surface PR on the second side W2. As the outer diameter shape is the inverted crown shape, an outer diameter of an end portion of the roller portion 26 increases when the sheet S is conveyed, the conveyance speed increases, and a pulling force is generated on the sheet S toward both ends in the width direction W, so that occurrence of paper wrinkles and the like can be suppressed.

In the present embodiment, a maximum outer diameter of the second end portion 26*b* of the roller portion 26 is larger than a maximum outer diameter of the first end portion 26*a*. The maximum outer diameter of the first end portion 26*a* of the roller portion 26 is an outer diameter of the end surface PL of the roller portion 26 on the first side W1, and the maximum outer diameter of the second end portion 26*b* of the roller portion 26 is an outer diameter of the end surface PR of the roller portion 26 on the second side W2. As a result, for example, when the entire roller portion 26 becomes the sheet passing portion and is substantially uniformly heated as in the case of the letter-sized sheet S, even when the first side W1 in the width direction W expands more than the second side W2, the difference in outer diameter of the roller portion 26 in the width direction W can be reduced.

In the present embodiment, in a room temperature environment, the maximum outer diameter of the first end portion 26*a* is 24.8 mm, the maximum outer diameter of the second end portion 26*b* is 25.3 mm, and the outer diameter of the central portion PC is 24.7 mm. The maximum outer diameter of the second end portion 26*b* is preferably 101% or more and 103% or less of the maximum outer diameter of the first end portion 26*a*, and is 102% of the maximum outer diameter of the first end portion 26*a* in the present embodiment. In view of the fixing temperature and the thermal expansion coefficient of the elastic layer, when the maximum outer diameter of the second end portion 26*b* is 101% or more and 103% or less of the maximum outer diameter of the first end portion 26*a*, it is possible to more effectively suppress the generation of the shift force than when the maximum outer diameter is less than 101% or more than 103% of the maximum outer diameter of the first end portion 26*a*.

Examples and Comparative Examples

Figure 6A:
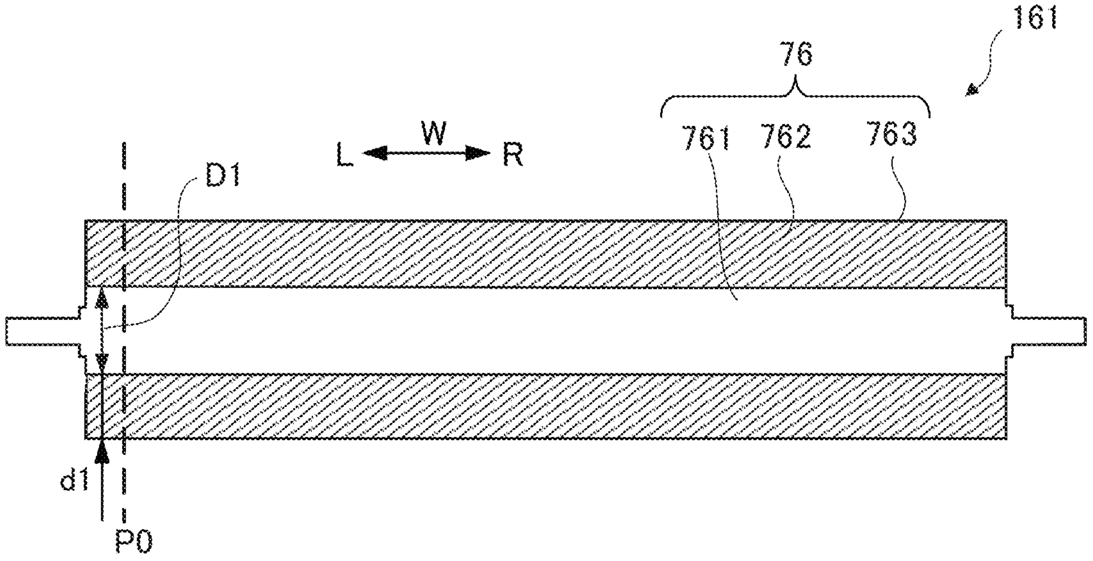
FIG. 6A is a schematic cross-sectional view of a counter roller according to Comparative Examples 1 and 2.

A comparative experiment was conducted using Example 1 in which the counter roller 61 according to the present embodiment was applied and Comparative Example 1 in which a counter roller 161 illustrated in FIG. 6A was applied.

Figure 6B:
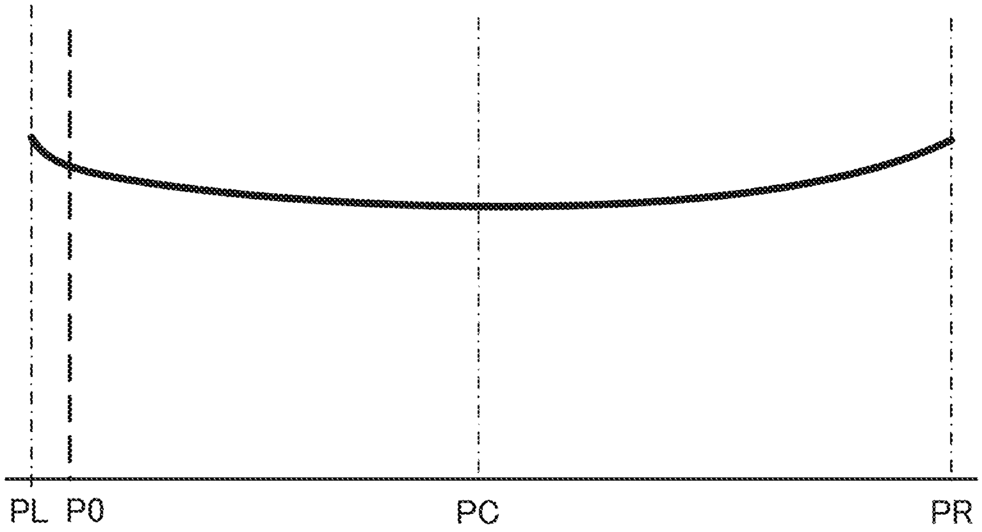
FIG. 6B is a graph illustrating an outer diameter of the counter roller in a width direction according to Comparative Examples 1 and 2.

Comparative Example 1 will be described. As illustrated in FIG. 6A, a roller portion 76 of the counter roller 161 of Comparative Example 1 includes a base portion 761, an elastic layer 762 provided around the base portion 761, and a release layer 763 provided around the elastic layer 762. A maximum outer diameter D1 of the base portion 761 is 20 mm, and is uniform in the width direction W. As illustrated in FIG. 6B, a profile of the outer diameter is a horizontally symmetrical inverted crown shape in which the outer diameter increases from a central portion PC toward both end portions in the width direction W. An outer diameter at an end surface PL on a first side W1 and an end surface PR on a second side W2 is 24.8 mm, and an outer diameter at the central portion PC is 24.7 mm.

In the comparative experiment, 20 letter-sized sheets were continuously passed at a speed of 40 sheets/minute, and a temperature and an outer diameter of a roller portion at a time point when a trailing edge of the last 20-th sheet passed through a fixing nip N2 were measured. Further, 20 A6-sized sheets were continuously passed at a speed of 75 sheets/minute, and a temperature and an outer diameter of the roller portion at a time point when a trailing edge of the last 20-th sheet passed through the fixing nip N2 were measured. The results are shown in Table 1.

TABLE 1

| | | Example 1 | | Comparative Example 1 | |
|---|---|---|---|---|---|
| Size | | PL | PR | PL | PR |
| Letter | Outer diameter | 25.5 mm | 25.4 mm | 25.5 mm | 25.5 mm |
| | Temperature | 90° C. | 90° C. | 90° C. | 90° C. |
| A6 | Outer diameter | 25.5 mm | 25.6 mm | 25.5 mm | 25.9 mm |
| | Temperature | 90° C. | 180 ° C. | 90° C. | 180° C. |

In Table 1, the outer diameter of PL is a maximum outer diameter of a first end portion of the roller portion, that is, the outer diameter at the end surface PL on the first side W1. The outer diameter of PR is a maximum outer diameter of a second end portion of the roller portion, that is, the outer diameter at the end surface PR on the second side W2. In a state before the sheet passes, the outer diameter of PL is 24.8 mm, and the outer diameter of PR is 25.3 mm. In Table 1, the temperature of PL is an average temperature in a half region of the roller portion on the first side W1 with respect to the central portion PC in the width direction W, and the temperature of PR is an average temperature in a half region of the roller portion on the second side W2 with respect to the central portion PC in the width direction W.

In a case where a letter-sized sheet having a maximum sheet-passing width was passed, in Example 1, a heated region of the roller portion 26 substantially coincides with a region through which the sheet passes, and thus, both the temperature of PL and the temperature of PR were 90° C. At this time, the outer diameter of PL increased from 24.8 mm, which is a value before the sheet passes, to 25.5 mm due to the expansion of the elastic layer 262, and increased by 0.7 mm. On the other hand, the outer diameter of PR increased from 25.3 mm, which is a value before the sheet passes, to 25.4 mm due to the expansion of the elastic layer 262, and increased by 0.1 mm. Such a difference is due to the fact that an expansion amount of PL having a larger thickness of the elastic layer 262 is large because the thickness of the elastic layer 262 varies even when the temperature of the elastic layer 262 of the roller portion 26 is the same.

In Comparative Example 1, both the temperature of PL and the temperature of PR were 90° C. as in Example 1. In Comparative Example 1, since a thickness of the elastic layer 762 of the roller portion 26 was uniform in the width direction W, an expansion amount of the elastic layer 762 was the same for both PL and PR, and thus the outer diameter of PL and the outer diameter of PR were both 25.5 mm.

Next, in a case where an A6-sized sheet was passed, the temperature of PL was 90° C. in Example 1 because the sheet passed. On the other hand, in PR, since the non-sheet-passing portion Ar2 through which the sheet does not pass is generated, the temperature increases due to the temperature rise of the non-sheet-passing portion Ar2, and an average temperature in PR was 180° C. The outer diameter of the roller portion 26 was 25.5 mm in PL as in the case of the letter-sized sheet. On the other hand, since the temperature of PR was high, the expansion amount of the elastic layer 262 increased, and thus, the outer diameter was 25.6 mm.

In Comparative Example 1, the temperature of PL was 90° C. and the temperature of PR was 180° C. as in Example 1. The outer diameter of PL was 25.5 mm as in Example 1, but PR had a high temperature of 180° C., and the thickness of the elastic layer 762 was large, and thus, the outer diameter was 25.9 mm.

As can be seen from the results shown in Table 1, a difference between the outer diameter of PL and the outer diameter of PR was able to be reduced in Example 1 as compared with Comparative Example 1 when an A6-sized sheet was passed.

Next, Table 2 shows a proportion of the outer diameter of PR when the outer diameter of PL of the counter roller at the time of conducting this comparative experiment is 100%.

TABLE 2

| Size | Example 1 | Comparative Example 1 |
|---|---|---|
| Letter | 99.6% | 100.0% |
| A6 | 100.4% | 101.6% |

In Example 1, the outer diameter of PR was 99.6% when a letter-sized sheet was passed, and the outer diameter of PR was 100.4% when an A6-sized sheet was passed. In Comparative Example 1, the outer diameter of PR was 100% when a letter-sized sheet was passed, and the outer diameter of PR was 101.6% when an A6-sized sheet was passed. It is considered that the more the outer diameter of PR exceeds 100%, the greater the difference in circumferential speed between PL and PR, and the larger the shift force generated for the fixing film 25. As can be seen from the results shown in Table 2, the shift force generated for the fixing film 25 when an A6-sized sheet was passed was able to be suppressed to be smaller in Example 1 than in Comparative Example 1.

Next, Table 3 shows results indicating whether or not deformation (buckling) of the fixing film 25 caused by the shift force occurred during the comparative experiment.

TABLE 3

| | Deformation of fixing film | |
|---|---|---|
| Size | Example 1 | Comparative Example 1 |
| Letter | None | None |
| A6 | None | Deformed |

In Example 1, no deformation of the fixing film 25 was observed in both the case of a letter-sized sheet and the case of an A6-sized sheet. In Comparative Example 1, deformation of the fixing film 25 was not observed in the case of a letter-sized sheet, but deformation of the fixing film 25 was observed in the case of an A6-sized sheet. This is because the difference in circumferential speed between PL and PR of the roller portion increases as a difference in outer diameter between the left and right portions of the roller portion increases, and the shift force is generated toward a direction in which the fixing film rotates faster for the fixing film 25 driven to rotate. Therefore, in Example 1, deformation of the fixing film 25 caused by the shift force did not occur in both the case of a letter-sized sheet and the case of an A6-sized sheet, and in Comparative Example 1, it was confirmed that there is a possibility that deformation of the fixing film 25 caused by the shift force occurs when the A6-sized sheet is passed.

As described above, with the fixing device 6 according to the present embodiment, the thickness d2 of the elastic layer 262 at the second end portion 26*b* of the roller portion 26 is smaller than the thickness d1 of the elastic layer 262 at the first end portion 26*a*. Therefore, even when the non-sheet-passing portion Ar2 has a relatively higher temperature than the sheet passing portion Ar1, the expansion amount of the elastic layer 262 in the non-sheet-passing portion Ar2 can be made smaller than the expansion amount of the elastic layer 262 in the sheet passing portion Ar1. Therefore, in terms of the outer diameter of the roller portion 26, the non-sheet-passing portion Ar2 can be suppressed from being significantly larger than the sheet passing portion Ar1, and the generation of the shift force for the fixing film 25 can be reduced. As a result, in a case where a conveyance method is based on the side-end reference, both an increase in speed of the fixing processing and an increase in life of the heating unit 60 can be achieved by increasing the speed of the fixing processing without increasing the thickness of the fixing film 25, and increasing the life of the heating unit 60 by reducing the shift force.

With the fixing device 6 according to the present embodiment, in the base portion 261 of the roller portion 26, the maximum outer diameter D2 at the second end portion 26*b* is smaller than the maximum outer diameter D1 at the first end portion 26*a*. As a result, the thickness of the elastic layer 262 at the second end portion 26*b* can be reduced without greatly changing the outer diameter of the roller portion 26 in the width direction W.

Second Embodiment

Next, a second embodiment of the present invention will be described, and the second embodiment has a configuration in which the counter roller 61 according to the first embodiment is changed. Therefore, a configuration similar to that of the first embodiment will be described in a manner of omitting illustration or attaching the same reference numerals in the drawings.

For example, in a case where a sheet passing reference position P0 is on one side and a sheet having a width smaller than a maximum sheet-passing width as illustrated in FIG. 5A, a shift force may be generated toward a right direction R in FIG. 5A for a fixing film 25. One of the reasons will be described.

In a case where the sheet is paper, the paper has a property of containing moisture (absorbing moisture) in the atmosphere in paper fiber, and the moisture contained in the paper is released into a fixing device 6A as water vapor by being rapidly heated at a fixing nip N2. When the sheets are continuously passed through the fixing device 6A, an amount of the generated water vapor also increases, and thus, the water vapor easily adheres to a counter roller 61A as a water droplet. When the water droplet adheres to the surface of the counter roller 61A, a friction coefficient between the surface of the counter roller 61A and the sheet decreases, and thus, a slip phenomenon occurs in which a conveyance speed of the sheet decreases relative to a circumferential speed of the counter roller 61A. When the conveyance speed of the sheet decreases, a rotational speed of the fixing film 25 that is in contact with the sheet and is driven to rotate also decreases.

On the other hand, since the water vapor is not generated in a non-sheet-passing portion Ar2 through which the sheet does not pass, the water droplet is less likely to adhere to the surface of the counter roller 61A. Therefore, the slip phenomenon does not occur in the non-sheet-passing portion Ar2, and the rotational speed of the fixing film 25 does not decrease. Due to the above phenomenon, a rotational speed of a sheet passing portion Ar1 of the fixing film 25 becomes low, a rotational speed of the non-sheet-passing portion Ar2 becomes high, and thus, the shift force is generated toward a direction in which the rotational speed becomes high. In a case where the shift force becomes large, when the shift force exceeds a stiffness of the fixing film 25, the fixing film 25 may be deformed.

Counter Roller

Figure 7A:
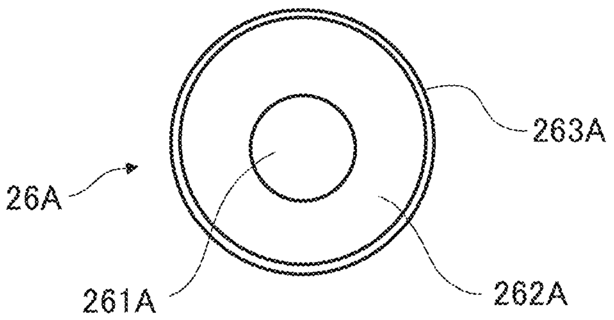
FIG. 7A is a cross-sectional view of a counter roller of a fixing device according to a second embodiment.

Therefore, in the present embodiment, the occurrence of the slip phenomenon is reduced by making an urging force of an urging unit 48 at a first end portion 26*a*A on a first side W1 of a roller portion 26A larger than an urging force at a second end portion 26*b*A on a second side W2. Hereinafter, the counter roller 61A according to the present embodiment will be described with reference to FIGS. 7A and 7B. FIG. 7A is a cross-sectional view of the roller portion 26A of the counter roller 61A according to the second embodiment. The roller portion 26A includes an elastic layer 262A on an outer circumference of a base portion 261A, and includes a release layer 263A on an outer circumference of the elastic layer 262A.

Figure 7B:
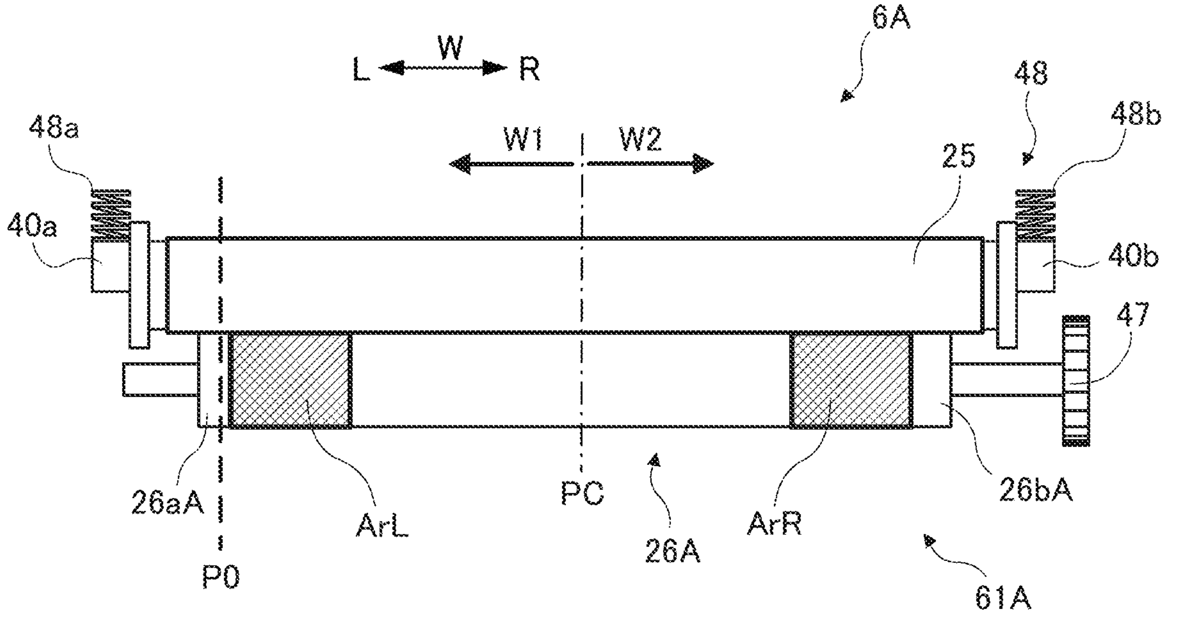
FIG. 7B is a schematic side view of the fixing device according to the second embodiment.

FIG. 7B is a cross-sectional view of the fixing device 6A according to the present embodiment in a width direction W. A hardness of the elastic layer of the roller portion 26A is different between a region ArL provided on a first end portion 26*a*A side and a region ArR provided on a second end portion 26*b*A side, and the hardness of the region ArL is higher than the hardness of the region ArR. The region ArL is an example of a high-hardness region provided in the elastic layer 262A, is provided on the first side W1 in the width direction W, and has a hardness higher than that of a portion of the elastic layer 262A at a central portion PC. The region ArR is an example of a low-hardness region provided in the elastic layer 262A, is provided on the second side W2 in the width direction W, and has a hardness lower than that of the portion of the elastic layer 262A at the central portion PC. The hardness of the elastic layer 262A is adjusted by changing a blending ratio of silicone rubber or the like as a material. In the present embodiment, the hardness of the region ArL is 60° according to Asker C hardness, and the hardness of the region ArR is 54°. Other configurations such as dimensions are the same as those of Comparative Example 1.

In addition, at least a part of the region ArL is positioned so as to overlap a conveyance region for the sheet having a minimum conveyance size when viewed in an intersecting direction (for example, an upward-downward direction) intersecting a sheet conveyance direction DF and the width direction W. The region ArL is positioned between the central portion PC and the sheet passing reference position P0 in the width direction W. As a result, it is possible to reduce the slip phenomenon by increasing the urging force of the urging unit 48 even for the sheet having the minimum conveyance size.

Urging Unit

As for urging forces of a first urging spring 48*a* and a second urging spring 48*b* of the urging unit 48 for flanges 40*a* and 40*b* illustrated in FIG. 7B, the urging force of the first urging spring 48*a* is larger than that of the second urging spring 48*b*. Specifically, the urging force of the first urging spring 48*a* is 147 N, and the urging force of the second urging spring 48*b* is 98 N. That is, the urging unit 48 is configured such that the urging force at the first end portion 26*a*A is larger than the urging force at the second end portion 26*b*A. As a result, the occurrence of the slip phenomenon can be reduced by increasing the urging force on the first side W1 which is likely to slip due to moisture.

Here, by increasing the urging force of the high-hardness region (the region ArL) where the hardness of the roller portion 26A is high and decreasing the urging force of the low-hardness region (the region ArR) where the hardness of the roller portion 26A is low, an amount of deformation of the elastic layer 262A due to urging can be made equal on the left and right sides. Therefore, even when the urging force for the fixing film 25 is different between the first side W1 and the second side W2 of the roller portion 26A, a width of the fixing nip N2 formed by the fixing film 25 and the counter roller 61A in a front-back direction can be made substantially constant in the width direction W.

The hardness of the elastic layer 262A in the region ArL is preferably 110% or more and 120% or less of the hardness of the elastic layer 262A in the region ArR, and is 111% in the present embodiment. In view of a fixing temperature and a thermal expansion coefficient of the elastic layer, when the hardness of the elastic layer 262A in the region ArL is 110% or more and 120% or less of the hardness of the elastic layer 262A in the region ArR, it is possible to more effectively suppress the generation of the shift force than when the hardness of the elastic layer 262A in the region ArL is less than 110% or more than 120% of the hardness of the elastic layer 262A in the region ArR.

The urging force of the first urging spring 48*a* is preferably 130% or more and 170% or less of the urging force of the second urging spring 48*b*, and is 150% of the urging force of the second urging spring 48*b* in the present embodiment. In view of the fixing temperature and the thermal expansion coefficient of the elastic layer, when the urging force of the first urging spring 48*a* is 130% or more and 170% or less of the urging force of the second urging spring 48*b*, it is possible to more effectively reduce the slip phenomenon than when the urging force of the first urging spring 48*a* is less than 130% or more than 170% of the urging force of the second urging spring 48*b*.

Examples and Comparative Examples

A comparative experiment was conducted using Example 2 in which the counter roller 61A according to the present embodiment was applied and Comparative Example 2 in which the counter roller 161 illustrated in FIG. 6A was applied. First, in Example 2 and Comparative Example 2, the hardness of the elastic layer of the roller portion and the urging force of the urging unit 48 were measured. The results are shown in Table 4. A region corresponding to ArL for the hardness in Comparative Example 2 is a region at a position corresponding to the region ArL in Example 2, and a region corresponding to ArR is a region at a position corresponding to the region ArR in Example 2.

TABLE 4

| | Example 2 | | Comparative Example 2 | |
|---|---|---|---|---|
| | ArL | ArR | Corresponding to ArL | Corresponding to ArR |
| Hardness | 60° | 54° | 57° | 57° |
| Urging force | 147N | 98N | 122.5N | 122.5N |

As shown in Table 4, a hardness of an elastic layer of the counter roller 161 of Comparative Example 2 is substantially uniform in the width direction W, and the hardness is 57° according to Asker C hardness. A pressing force applied by the urging unit 48 of Comparative Example 2 is equal between the left and right sides, and is 122.5 N.

As a comparative experiment, 20 letter-sized sheets were continuously passed at a speed of 40 sheets/minute, and 20 A6-sized sheets were continuously passed at a speed of 75 sheets/minute. Table 5 shows results indicating whether or not deformation (buckling) of the fixing film 25 caused by the shift force occurred during the comparative experiment.

TABLE 5

| | Deformation of fixing film | |
|---|---|---|
| Size | Example 2 | Comparative Example 2 |
| Letter | None | None |
| A6 | None | Deformed |

In Example 2, since the width of the fixing nip N2 in the front-back direction is constant in the width direction W, when a letter-sized sheet was passed, there was no difference in conveyance speed of the sheet between the left and right sides, and thus, deformation of the fixing film 25 was not observed. When an A6-sized sheet is passed, water vapor is generated due to heating of the sheet at the fixing nip N2 in a region where the sheet was passed, and thus, there is a possibility that the conveyance speed of the sheet decreases. However, in Example 2, a pressing force on the first side W1 was increased, so that it is possible to minimize the slip phenomenon that occurs when a water droplet adheres to the surface of the roller portion 26A. Therefore, since the difference in speed between the right and left sides of the fixing film 25 can be minimized, when an A6-sized sheet was passed, deformation of the fixing film 25 was not observed.

In Comparative Example 2, since there is no difference in pressing force between the left and right sides, and the width of the fixing nip N2 in the front-back direction is constant in the width direction W, when a letter-sized sheet was passed, there was no difference in sheet conveyance speed between the left and right sides, and deformation of the fixing film 25 was not observed. On the other hand, when an A6-sized sheet was passed, water vapor was generated due to heating of the sheet at the fixing nip N2 in a region where the sheet was passed, and thus, the conveyance speed of the sheet significantly decreased. Therefore, in the sheet passing portion Ar1, the rotational speed of the fixing film 25 decreased due to an influence of the slip phenomenon caused by the water vapor, and the shift force caused by a difference from the rotational speed of the fixing film 25 in the non-sheet-passing portion Ar2 increased, and thus, the deformation (buckling) of the fixing film 25 occurred.

As described above, with the fixing device 6A according to the present embodiment, the urging force of the urging unit 48 at the first end portion **26*a*A of the roller portion 26A is made larger than the urging force at the second end portion 26*b*A, and thus, the occurrence of the slip phenomenon of the fixing film 25 due to moisture can be reduced. Therefore, it is possible to suppress an increase in shift force for the fixing film 25 and to prevent the deformation. As a result, the generation of the shift force for the fixing film 25 can be reduced, and the fixing device 6**A capable of achieving the increase in speed and the increase in life can be implemented.

In the present embodiment, a case where the urging unit 48 includes the first urging spring **48*a* and the second urging spring 48*b* has been described, but the present technology is not limited thereto. For example, a configuration in which only the first urging spring 48*a* is provided, and the second urging spring 48*b* is not provided such that urging is made by its own weight is also possible. Alternatively, a configuration in which the first urging spring 48*a* is not provided on the first side W1 but on, for example, the second side W2, and the urging force is applied to the first end portion 26*a***A by using an appropriate transmission member that is interposed is also possible.

In the present embodiment, a case where the difference in hardness of the elastic layer 262A of the roller portion 26A in the width direction W and the difference in urging force are provided has been described, but the present technology is not limited thereto. For example, a similar effect can be obtained only by providing a difference in hardness of the elastic layer 262A of the roller portion 26A between the left and right sides, or a similar effect can be obtained only by providing a difference in pressing force between the urging springs **48*a* and 48*b*** on the left and right sides.

Third Embodiment

Next, a third embodiment of the present invention will be described, and the third embodiment has a configuration in which the fixing film 25 according to the first embodiment is changed. Therefore, a configuration similar to that of the first embodiment will be described in a manner of omitting illustration or attaching the same reference numerals in the drawings.

Here, buckling of the fixing film 25, which is a problem of the related art, will be described in detail. In a case where a thermally conductive filler contained in the elastic layer 252 is increased in order to achieve a high thermal conductivity of the fixing film 25, wear of the base layer 251 of the fixing film 25 may easily occur. In particular, in a case where the flanges **40*a* and 40*b* have the restriction surfaces 41*a* and 41*b* and the guide portions 42*a* and 42*b*, wear of an inner surface of an end portion of the fixing film 25 (hereinafter, referred to as the wear of the inner surface) in the width direction W may easily occur. As an end portion of the base layer 251 of the fixing film 25** in the width direction W becomes thin due to the wear of the inner surface, buckling is likely to occur, which may hinder an increase in life.

Figure 8:
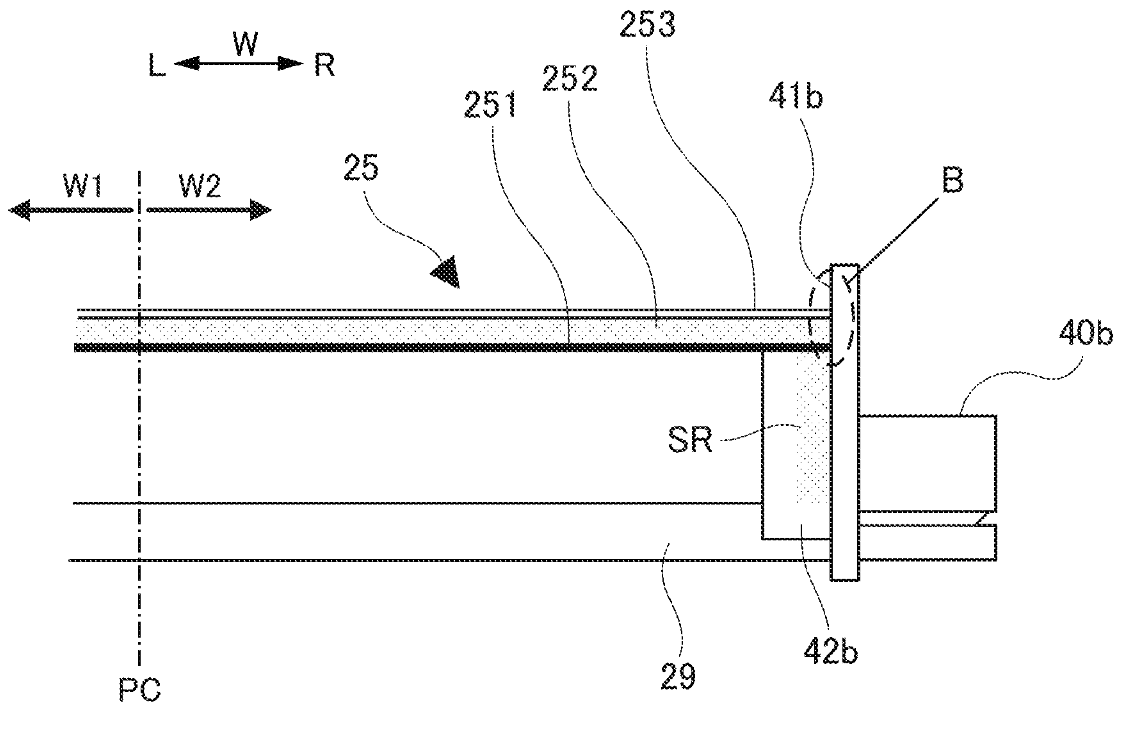
FIG. 8 is a cross-sectional view illustrating a fixing film and a flange according to a comparative example.

A mechanism in which the wear of the inner surface of the fixing film 25 including the elastic layer 252 containing the thermally conductive filler occurs will be described with reference to FIG. 8. FIG. 8 is a cross-sectional view of a configuration in the vicinity of a second flange **40*b* in a fixing device according to a comparative example in which a fixing film 25 is not configured according to the present embodiment when viewed from upstream (front side) in a sheet conveyance direction DF. FIG. 8 illustrates a cross section of the fixing film 25 in the width direction W and a side surface of the second flange 40*b*. FIG. 8 illustrates a state in which a shift of the fixing film 25 in the right direction R in FIG. 5A occurs, and the fixing film 25 is in contact with a restriction surface 41*b* of the second flange 40*b* in FIG. 5**A. In the comparative example, the same reference numerals are given to elements corresponding to those of the present embodiment.

The fixing film 25 receives a shift force toward the right direction R due to an influence of a temperature rise of a non-sheet-passing portion Ar2 described in the first embodiment, and may slide and rotate while being pressed by the restriction surface 41*b* of the second flange 40*b*. The fixing film 25 and the restriction surface 41*b* of the second flange 40*b* slide in a sliding region ArB. The fixing film 25 includes a base layer 251, an elastic layer 252, and a surface layer 253, and the base layer 251 and the elastic layer 252 are worn by rubbing with the restriction surface 41*b*.

The elastic layer 252 contains a thermally conductive filler. Therefore, when the elastic layer 252 is worn by the restriction surface 41*b* of the second flange 40*b*, the thermally conductive filler contained in the elastic layer 252 is scraped out from an end surface of the elastic layer 252. A scraped-out portion of the thermally conductive filler passes through the sliding region ArB between an end portion of the fixing film 25 in the width direction W and the restriction surface 41*b* of the second flange 40*b*. Then, the thermally conductive filler enters a contact region SR between an inner circumferential surface of the base layer 251 of the fixing film 25 and a guide portion 42*b* of the second flange 40*b*. As a result, the thermally conductive filler is interposed in the contact region Sr.

In the present embodiment, the thermally conductive filler is made of a material having a higher hardness than polyimide which is a material of the base layer 251 of the fixing film 25. Therefore, by sliding and rotating the fixing film 25 with respect to the guide portion 42*b* of the second flange 40*b*, the wear of the inner surface of the end portion of the base layer 251 in the width direction W is accelerated by the thermally conductive filler interposed between the inner circumferential surface of the base layer 251 and the guide portion 42*b* in the contact region SR.

When the wear of the inner surface of the base layer 251 of the fixing film 25 occurs, a thickness of the base layer 251 decreases with an increase in use amount of the fixing film 25, as a result of which a strength may decrease, and buckling may occur with a lower shift force. Therefore, there is a possibility of hindering an increase in life. Meanwhile, it is conceivable to increase the thickness of the base layer 251 of the fixing film 25 in order to suppress the buckling and increase the life. However, when the thickness of the base layer 251 is excessively large, fixing performance may deteriorate due to the lowered thermal conductivity, and the cost may be increased. As described above, with the configuration according to the related art, it may be difficult to achieve both an increase in speed and an increase in life.

Therefore, in the present embodiment, a base layer 251B of a fixing film 25B protrudes to a second side W2 in the width direction W to avoid wear of an elastic layer 252B. Hereinafter, the fixing film 25B according to the present embodiment will be described with reference to FIGS. 9A to 10B.

Figure 9A:
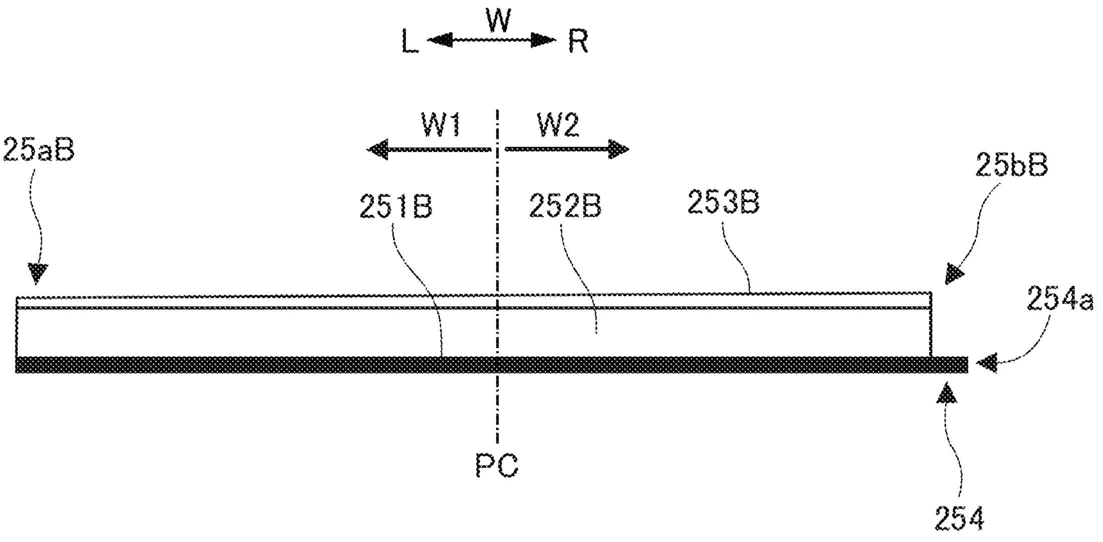
FIG. 9A is a cross-sectional view of a fixing film of a fixing device according to a third embodiment.

FIG. 9A is a cross-sectional view of the fixing film 25B in the width direction W in the present embodiment. In the present embodiment, the fixing film 25B is configured such that in a case where the base layer 251B comes into contact with a restriction surface 41*b* of a second flange 40*b* at an end portion 25*b*B on the second side W2 in the width direction W, the elastic layer 252B does not come into contact with the restriction surface 41*b*. As illustrated in FIG. 9A, the fixing film 25B has a protruding portion 254, which is a portion that does not include the elastic layer 252B and a surface layer 253B and is formed only of the base layer 251B, at the end portion 25*b*B on the second side W2 in the width direction W. In other words, in the present embodiment, at the end portion 25*b*B of the fixing film 25B on the second side W2, the base layer 251B has the protruding portion 254 which is a portion positioned more outward relative to the elastic layer 252B. That is, the protruding portion 254 protrudes in the right direction R on the second side W2 relative to the elastic layer 252B, and can come into contact with the restriction surface 41*b* of the second flange 40*b* in the width direction W.

The elastic layer 252B is desirably configured not to come into contact with the restriction surface 41*b* when the base layer 251B comes into contact with the restriction surface 41*b* of the second flange 40*b* even in a state in which the fixing film 25B is positioned at any phase in a circumferential direction. Therefore, in the present embodiment, the protruding portion 254 is provided continuously over the entire region of the fixing film 25B in the circumferential direction, and an end surface 254*a* of the end portion 25*b*B of the fixing film 25B in the width direction W is implemented by an end surface of the protruding portion 254.

However, there may be a portion where the protruding portion 254 is not provided in a part of the fixing film 25B in the circumferential direction as long as the effect of the present embodiment can be sufficiently exhibited. In the portion where the protruding portion 254 is not provided, the end surface of the end portion of the fixing film 25B in the width direction W is implemented by the base layer 251B and the elastic layer 252B (in addition, the surface layer 253B in the present embodiment). The protruding portion 254 is preferably provided on 70% or more of a circumference of the fixing film 25B, more preferably 80% or more, still more preferably 90% or more, and most preferably the entire circumference of the fixing film 25B. If the protruding portion 254 is provided on 70% or more of the circumference of the fixing film 25B, the elastic layer 252B can be more effectively prevented from coming into contact with the restriction surface 41*b* than when the protruding portion 254 is provided on less than 70%. In the present embodiment, since the protruding portion 254 is provided continuously over the entire region of the fixing film 25B in the circumferential direction, the protruding portion 254 is provided on 70% or more of an end surface of the fixing film 25B on the second side W2.

Figure 9B:
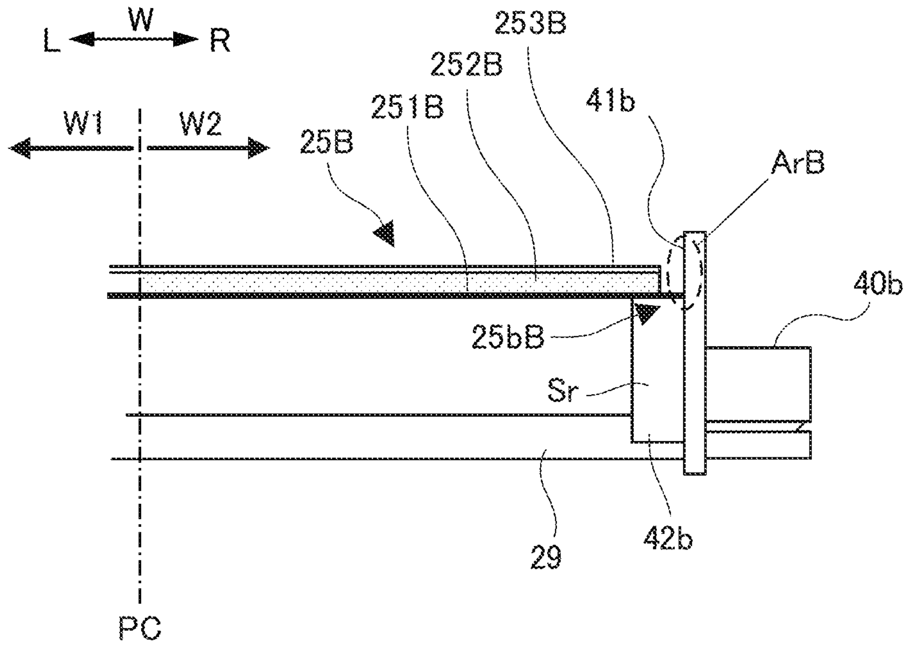
FIG. 9B is a cross-sectional view of the fixing film and a flange of the fixing device according to the third embodiment.

By using the fixing film 25B according to the present embodiment, the wear of the inner surface of the fixing film 25 described above can be suppressed. The reason will be described with reference to FIG. 9B. FIG. 9B is a schematic cross-sectional view of the vicinity of the second flange 40*b* in a fixing device 6B according to the present embodiment when viewed from upstream in a conveyance direction of a sheet S. FIG. 9B illustrates a cross section of the fixing film 25B in the width direction W and a side surface of the second flange 40*b*. FIG. 9B illustrates a state in which a shift of the fixing film 25B in the right direction R in FIG. 5A occurs, and the fixing film 25B is in contact with the restriction surface 41*b* of the second flange 40*b*.

As illustrated in FIG. 9B, in a sliding region ArB between the end portion of the fixing film 25B in the width direction W and the restriction surface 41*b* of the second flange 40*b*, the restriction surface 41*b* of the second flange 40*b* is in contact only with the base layer 251B of the fixing film 25B and is not in contact with the elastic layer 252B. That is, the protruding portion 254 comes into contact with the restriction surface 41*b* to restrict the elastic layer 252B from coming into contact with the restriction surface 41*b*. As a result, the thermally conductive filler contained in the elastic layer 252B is not scraped out or the scraping of the thermally conductive filler is sufficiently suppressed. As a result, in a contact region SR between an inner circumferential surface of the base layer 251B of the fixing film 25B and a guide portion 42*b* of the second flange 40*b*, the inner circumferential surface of the base layer 251B of the fixing film 25B and the guide portion 42*b* of the second flange 40*b* slide with no thermally conductive filler interposed therebetween. Therefore, wear of an inner circumferential surface of the end portion 25*b*B of the fixing film 25B in the width direction W can be suppressed.

As described above, according to the present embodiment, the wear of the inner surface of the fixing film 25B can be suppressed, and the fixing film 25B can be prevented from being buckled even when the shift force due to the temperature rise of the non-sheet-passing portion Ar2 is generated. As a result, the life of the fixing film 25B can be increased.

Length of Protruding Portion

Figure 10A:
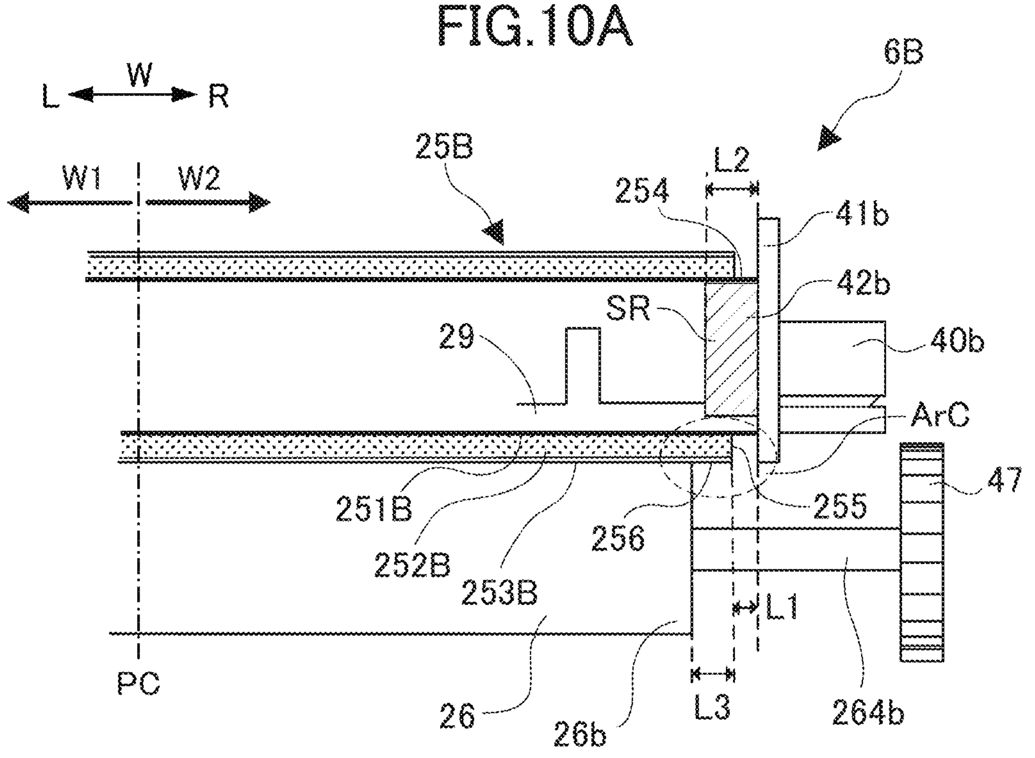
FIG. 10A is a cross-sectional view illustrating the fixing film and the flange on a first side of the fixing device according to the third embodiment.

Next, setting of a protrusion length of the protruding portion 254 will be described. FIG. 10A is a cross-sectional view of the vicinity of the second flange 40*b* in the fixing device 6B according to the present embodiment when viewed from upstream (front side) in the conveyance direction of the sheet S. FIG. 10A illustrates a cross section of the fixing film 25B in the width direction W and side surfaces of the second flange 40*b* and a counter roller 61. FIG. 10A illustrates a state in which a shift of the fixing film 25B in the right direction R occurs, and the fixing film 25B is in contact with the restriction surface 41*b* of the second flange 40*b* on the right side.

A length of the protruding portion 254 of the fixing film 25B in the width direction W (hereinafter, referred to as a protrusion length) is indicated by a protrusion length L1 in FIG. 10A. The protrusion length L1 is represented by a value (initial value) at an initial stage of use (when the fixing film 25B is new) of the fixing film 25B. The protrusion length L1 is desirably set such that the elastic layer 252B does not protrude more outward relative to the base layer 251B in the width direction W of the fixing film 25B even in consideration of, for example, expansion of the elastic layer 252B due to heating or wear from an end surface of the base layer 251B accompanying an increase in use amount.

From such a viewpoint, the protrusion length L1 is preferably set to 0.1 mm or more. In a case where the protrusion length L1 is 0.1 mm or more, the elastic layer 252B can be prevented from coming into contact with the restriction surface 41*b* more effectively than in a case where the protrusion length L1 is less than 0.1 mm. From the above viewpoint, a protrusion width is more preferably set to 0.5 mm or more. The protrusion length L1 can be arbitrarily set in consideration of the life of the fixing film 25B and the like. For example, the protrusion length L1 may be set to be larger for the fixing film 25B used in the fixing device 6B having a longer life. However, from the viewpoint of mechanical strength, running stability, and the like of the fixing film 25B, the protrusion length L1 is preferably 10 mm or less. Therefore, in the present embodiment, a protrusion amount of the protruding portion 254 on the second side W2 with respect to the elastic layer 252B is 0.1 mm or more and 10 mm or less.

A width of a portion of the fixing film 25B that includes the elastic layer 252B in the width direction W of the fixing film 25B is larger than that in a maximum conveyance region Ar0 (see FIG. 3), and the maximum conveyance region Ar0 is within the portion. In the present embodiment, the protrusion length L1 of the protruding portion 254 is set to 2 mm in the entire region of the fixing film 25B in the circumferential direction at an end portion of the fixing film 25B on one side in the width direction W.

In the present embodiment, the protrusion length L1 is 2 mm, and a length L2 of the guide portion 42*b* of the second flange 40*b* in the width direction W of the fixing film 25B is 4 mm. In the present embodiment, even in a state in which at least the fixing film 25B is in contact with the first flange 40*a*, the guide portion 42*b* of the second flange 40*b* and a region of the fixing film 25B where the elastic layer 252B is present overlap each other in the width direction W of the fixing film 25B. That is, the protrusion length L1, which is the protrusion amount of the protruding portion 254 on the second side W2 with respect to the elastic layer 252B, is smaller than the length L2 of the guide portion 42*b* in the width direction W. As described above, the running stability of the fixing film 25B can be kept high by overlapping the region of the fixing film 25B where the elastic layer 252B is present with the guide portion 42*b* of the second flange 40*b*. That is, the protrusion length L1 is preferably set to be smaller than the length L2 of the guide portion 42*b* of the second flange 40*b* in the width direction W of the fixing film 25B.

Position of End Portion of Counter Roller

In the present embodiment, a positional relationship between an end portion of the fixing film 25B and an end portion of a roller portion 26 of the counter roller 61 on the second side W2 in the width direction W is set as follows. In the present embodiment, the roller portion 26 includes a conductive base portion 261, an elastic layer 262, and an electrically insulating release layer 263. In addition, a potential of +300 V is applied to the base portion 261 by using an AC power supply 27. Meanwhile, the fixing film 25B includes the conductive base layer 251B, the electrically insulating elastic layer 252B, and the surface layer 253B. In the present embodiment, in the fixing film 25B, the base layer 251B is electrically grounded from the inner circumferential surface (see FIG. 2).

As described above, in order to obtain a good image, it is desirable to provide a predetermined potential difference between the base layer 251B of the fixing film 25B and the roller portion 26. That is, toner to which a negative charge is applied receives a force to be pressed against the sheet S by an electric field formed by the potential difference, so that scattering and offset of the toner can be suppressed. In a case where discharge occurs between the base layer 251B of the fixing film 25B and the elastic layer 262 of the roller portion 26, the potential difference cannot be appropriately maintained, and thus, image defects may occur. In order to appropriately maintain the potential difference, it is desirable to sufficiently secure a creeping distance between the elastic layer 262 of the counter roller 61 and the base layer 251B of the protruding portion 254 of the fixing film 25B at the end portion of the fixing film 25B in the width direction W to suppress discharge.

Therefore, in the present embodiment, the positional relationship between the end portion of the fixing film 25B and the end portion of the roller portion 26 at the end portion of the fixing film 25B on the second side W2 is set as follows. Here, as illustrated in FIG. 10A, a region where the elastic layer 262 of the roller portion 26 and the base layer 251B of the protruding portion 254 of the fixing film 25B are adjacent to each other is defined as an adjacent region ArC. At this time, in the adjacent region ArC, the elastic layer 252B of the fixing film 25B and an end surface 255 of the surface layer 253B are positioned more outward (downstream in the right direction R) relative to an end surface of a second end portion 26*b* of the elastic layer 262 of the roller portion 26. That is, the elastic layer 252B and the surface layer 253B of the fixing film 25B have an extension portion 256 extending more outward relative to the end surface of the second end portion 26*b* of the elastic layer 262 of the roller portion 26 by a length L3 in the width direction W of the fixing film 25B. That is, the end surface 254*a* of the protruding portion 254 on the second side W2 (see FIG. 9A) is provided on the second side W2 with respect to the end surface of the elastic layer 262 of the roller portion 26 on the second side W2.

As a result, the creeping distance between the elastic layer 262 of the roller portion 26 and the base layer 251B of the protruding portion 254 of the fixing film 25B can be sufficiently secured, and the potential difference can be appropriately maintained. The length L3 of the extension portion 256 can be appropriately set such that the discharge as described above can be sufficiently suppressed according to a potential difference between a potential applied to the base portion 261 of the roller portion 26 and the base layer 251B of the fixing film 25B. In the present embodiment, the length L3 of the extension portion 256 is set to 2 mm in the entire region of each of the fixing film 25B and the roller portion 26 in the circumferential direction.

Considering the protrusion length L1 of the protruding portion 254 and the length L3 of the extension portion 256 for securing the creeping distance, the end surface 254*a* of the protruding portion 254 of the fixing film 25B is set to be positioned more toward the right direction R by (L1+L3) relative to the end surface of the second end portion 26*b* of the roller portion 26. In the present embodiment, the end surface 254*a* of the protruding portion 254 of the fixing film 25B is set to be positioned toward the right direction R by 4 mm.

Protruding Portion

Figure 10B:
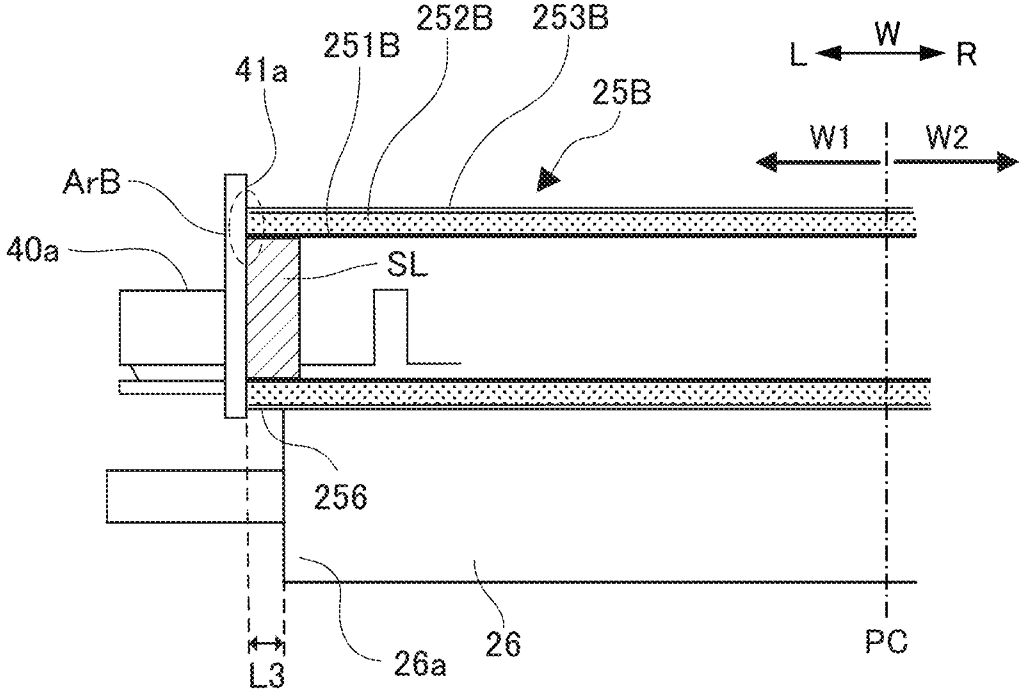
FIG. 10B is a cross-sectional view illustrating the fixing film and the flange on a second side of the fixing device according to the third embodiment.

A configuration of the fixing film 25B according to the present embodiment is illustrated in FIG. 9A. In the present embodiment, the protruding portion 254 of the fixing film 25B is provided only at one side end portion on the second side W2 opposite to a sheet passing reference position P0. FIG. 10B is a cross-sectional view of the vicinity of the first flange 40*a* on the first side W1 in the fixing device 6B according to the present embodiment when viewed from upstream (front side) in the conveyance direction of the sheet S. FIG. 10B illustrates a state in which the fixing film 25B is in contact with the restriction surface 41*a* of the first flange 40*a* on the first side W1.

In the present embodiment, on the first side W1, the restriction surface 41*a* of the first flange 40*a* and the elastic layer 252B of the fixing film 25B are in contact with each other in the sliding region ArB in FIG. 10B. However, on the first side W1, wear of the inner surface of the base layer 251B of the fixing film 25B hardly occurs even with this configuration. The reason will be described below.

Since the shift force due to the temperature rise of the non-sheet-passing portion Ar2 is not generated on the first side W1, even when the elastic layer 252B and the restriction surface 41*a* of the first flange 40*a* slide, the thermally conductive filler contained in the elastic layer 252B is not scraped out or the scraping of the thermally conductive filler is sufficiently suppressed. As a result, the inner circumferential surface of the base layer 251B of the fixing film 25B and the guide portion 42*a* of the first flange 40*a* slide on each other without interposing the thermally conductive filler in the contact region SL between the inner circumferential surface of the base layer 251B of the fixing film 25B and the guide portion 42*a* of the first flange 40*a* (see FIG. 3). Therefore, the wear of the inner circumferential surface of the end portion of the fixing film 25B does not occur on the first side W1.

In addition, the fixing film 25B according to the present embodiment also has the extension portion 256 extending more outward in the width direction W (toward the left direction L) relative to an end surface of an end portion 26*a* of the elastic layer 262 of the counter roller 61 by the length L3 in the width direction W even on the first side W1. Here, similarly to the second side W2, it is necessary to set the length L3 in order to secure the creeping distance between the elastic layer 262 of the counter roller 61 and the base layer 251B of the fixing film 25B. Therefore, the length L3 can be appropriately set such that the discharge can be sufficiently suppressed according to the potential difference between the potential applied to the base portion 261 of the roller portion 26 and the base layer 251B of the fixing film 25B. In the present embodiment, on the first side W1, the length L3 of the extension portion 256 is set to 2 mm in the entire region of each of the fixing film 25B and the roller portion 26 in the circumferential direction.

Examples and Comparative Examples

Figure 11A:
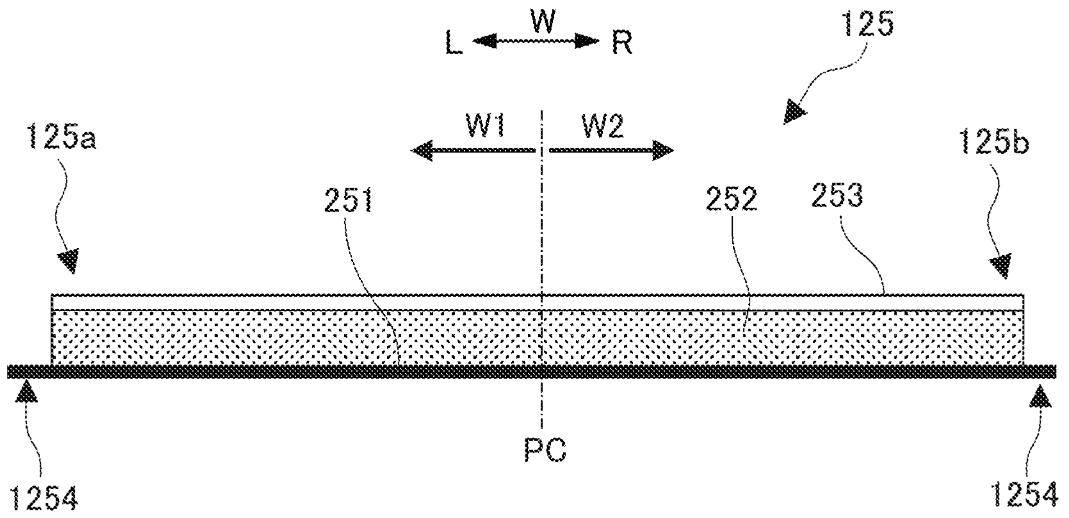
FIG. 11A is a cross-sectional view illustrating a fixing film according to Comparative Example 3.
Figure 11B:
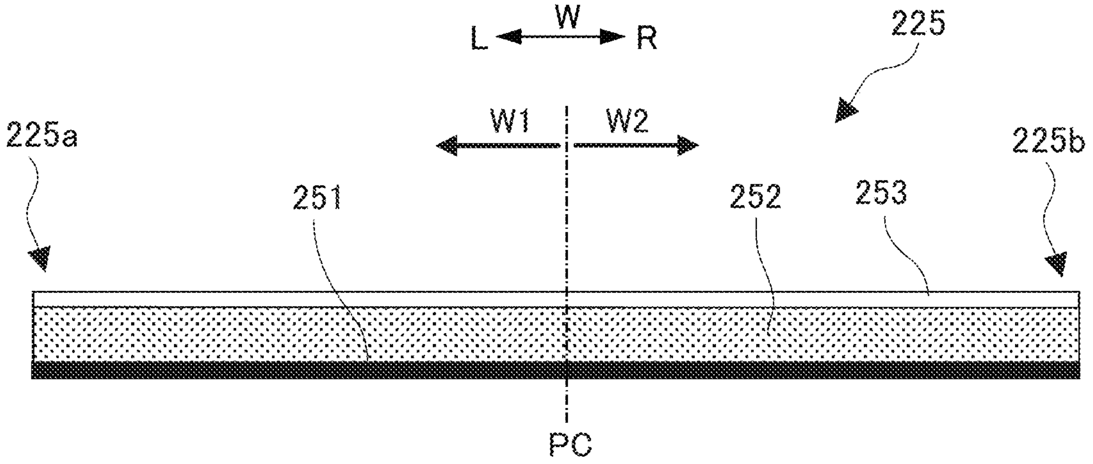
FIG. 11B is a cross-sectional view illustrating a fixing film according to Comparative Example 4.

Comparison was made using Example 3 in which the fixing film 25B according to the present embodiment was applied, Comparative Example 3 in which a fixing film 125 illustrated in FIG. 11A was applied, and Comparative Example 4 in which a fixing film 225 illustrated in FIG. 11B was applied.

Comparative Examples 3 and 4 will be described. FIGS. 11A and 11B are cross-sectional views of the fixing films 125 and 225 used in the configurations of Comparative Examples 3 and 4 in the width direction W. FIG. 11A illustrates the configuration of the fixing film 125 of Comparative Example 3, in which protruding portions 1254 are provided at both end portions 125*a* and 125*b* of the fixing film 125. FIG. 11B illustrates the configuration of the fixing film 225 of Comparative Example 4, in which no protruding portion is provided at both end portions 225*a* and 225*b* of the fixing film 225.

The fixing film 125 of Comparative Example 3 has the protruding portions 1254 at both end portions in the width direction W. Therefore, scraping due to heat of a thermally conductive filler caused by sliding between an elastic layer 252 of the fixing film 125 and restriction surfaces 41*a* and 41*b* of flanges 40*a* and 40*b* at both end portions does not occur or is sufficiently suppressed, and thus, wear of an inner surface of the fixing film 125 is suppressed. However, on the other hand, the fixing film 125 of Comparative Example 3 has a disadvantage from the viewpoint of a manufacturing procedure and a size of the fixing device as compared with the fixing film 25B of Example 3. As for the manufacturing procedure, the fixing film 125 of Comparative Example 3 has a disadvantage that a procedure for forming the protruding portion 1254 on a first side W1 increases and the cost increases as compared with the fixing film 25B of Example 3.

In addition, the fixing film 125 of Comparative Example 3 has a disadvantage that the size of the fixing device increases. The reason will be described below. In the fixing film 125 of Comparative Example 3, it is necessary to appropriately set a protrusion length L1 of the protruding portion 1254 and a length L3 of an extension portion 256 (see FIGS. 10A and 10B) at both end portions 125*a* and 125*b*. In Comparative Example 3, at both end portions 125*a* and 125*b* of the fixing film 125, an end surface of the fixing film 125 needs to be set to be positioned more outward in the width direction W by (L1+L3) relative to an end surface of a roller portion 26. That is, it is necessary to increase the size of the fixing film 125 of Comparative Example 3 by about 2×(L1+L3) in the width direction W relative to the roller portion 26. For example, in a case where L1=L3=2 mm, it is necessary to increase a width of the fixing film 125 by 8 mm.

On the other hand, in the fixing film 25B of Example 3, the protruding portion 254 is provided at the end portion 25*b*B on the second side W2, but the protruding portion 254 is not provided at the end portion 25*a*B on the first side W1 (see FIG. 9A). As a result, the end surface of the fixing film 25B of Example 3 on the second side W2 needs to be set to be positioned outward in the width direction W by (L1+L3), and an end surface of the fixing film 25B of Example 3 on the first side W1 needs to be set to be positioned outward by L3. That is, it is necessary to increase the size of the fixing film 25B of Example 3 by about (L1+2×L3) in the width direction W relative to the roller portion 26. Therefore, the fixing film 25B of Example 3 can be set to be smaller than the fixing film 125 of Comparative Example 3 by about L1 in the width direction W. In Example 3, L1=L3=2 mm, and the fixing film 25B of Example 3 is 6 mm larger than the roller portion 26 in the width direction W.

That is, the fixing film 25B of Example 3 can be made 2 mm smaller than the fixing film 125 of Comparative Example 3 in the width direction W. The restriction surfaces 41*a* and 41*b* of the flanges 40*a* and 40*b* are set to regulate movement of the fixing film in the width direction W. Therefore, an interval for the fixing film is set by providing a predetermined clearance according to the length of the fixing film in the width direction W to prevent the fixing film from becoming tight at the time of thermal expansion. Therefore, the interval between the flanges 40*a* and 40*b* is set according to the length of the fixing film, and the interval between the flanges 40*a* and 40*b* of Example 3 can be set to be smaller by 2 mm than that of Comparative Example 3. As a result, the fixing device 6B of Example 3 and an image forming apparatus 100 can be reduced in size as compared with Comparative Example 3.

Next, in the fixing film 225 of Comparative Example 4, a protruding portion of a base layer 251 in the width direction W is not formed. As a result, at an end portion 225*b* on a second side W2, an elastic layer 252 of the fixing film 225 and a restriction surface 41*b* of a second flange 40*b* slide while receiving a shift force due to a temperature rise of a non-sheet-passing portion Ar2. As a result, a thermally conductive filler contained in the elastic layer 252 is scraped out, and wear of an inner surface of the base layer 251 of the fixing film 225 occurs. Therefore, an increase in life of the fixing film 225 is hindered. Hereinafter, results of a durability test comparing durability performances of Example 3 and Comparative Example 4 are shown.

Print Durability Test

In order to compare the durability performance between Example 3 and Comparative Example 4, a comparative test comparing Example 3 and Comparative Example 4 was conducted. In the configuration of Example 3, the fixing film 25B illustrated in FIG. 9A was used. In the configuration of Comparative Example 4, the fixing film 225 illustrated in FIG. 11B was used. A configuration of an image forming apparatus of Comparative Example 4 is substantially the same as the configuration of the image forming apparatus 100 according to the present embodiment except for the above points. In Comparative Example 4, the same reference numerals are given to constituent elements corresponding to those of the present embodiment.

Regarding Example 3 and Comparative Example 4, the test was conducted under the following conditions. A pressure applied between each fixing film and the roller portion 26 was 186.2 N (19 kgf). A width (nip width) of a fixing nip N2 in the sheet conveyance direction DF was 9 mm. As a test environment, a temperature was 23° C., a relative humidity was 50%, and a mixture of CS068 (A4 size and 68 g/cm$^2$) and PB paper (A5 size and 68 g/cm$^2$) was used for an evaluation sheet as appropriate. Under the above conditions, in Example 3 and Comparative Example 4, a paper passing durability test of printing 200 k sheets of character images with a low image coverage was performed to evaluate the durability.

Table 6 shows evaluation results of the durability test. Evaluation criteria for the durability are as follows. A case where the durability of the fixing film was good without any problem was evaluated as "Good", and a case where a problem related to the durability of the fixing film, which can cause a problem in practical use, occurred was evaluated as "Poor". As for evaluation criteria for fixing performance, a case where the fixing performance was good without any problem was evaluated as "Good", and a case where the fixing performance was insufficient was evaluated as "Poor".

TABLE 6

| Number of sheets (sheets) | Fixing performance/durability | | | | |
|---|---|---|---|---|---|
| | 50k | 100k | 150k | 175k | 200k |
| Example 3 | Good/ Good | Good/ Good | Good/ Good | Good/ Good | Good/ Good |
| Comparative Example 4 | Good/ Good | Good/ Poor | Not performed | Not performed | Not performed |

As shown in Table 6, in Comparative Example 4, buckling occurred at the end portion 225*b* of the fixing film 225 in the width direction W on the second side at a time point when 100 k sheets were printed. As a result, since the running of the fixing film 225 became unstable and an image defect occurred, the sheet passing durability test was stopped. It was found that the reason why the buckling occurred at the end portion 225*b* of the fixing film 225 in the width direction W on the second side W2 is the wear of the inner surface of the fixing film 225. That is, in Comparative Example 4, the thickness of the base layer 251 of the end portion 225*b* of the fixing film 225 on the second side W2 at the time point when 100 k sheets were printed was reduced from an initial thickness of 70 μm to about 40 μm. Therefore, it is considered that the buckling occurred at the end portion 225*b* of the fixing film 225 in the width direction W because the fixing film 225 was not able to withstand a shift force applied to the fixing film 225 in the width direction W (right direction R) when the fixing film 225 abuts on the restriction surface 41*b* of the second flange 40*b*. As described above, in Comparative Example 4, it was difficult to satisfy the durability.

In Example 3, no problems with the durability and fixing performance occurred when printing 200 k sheets. Therefore, it has been confirmed that the image forming apparatus 100 having the side-end reference conveyance configuration can achieve an increase in life, an increase in speed, and size reduction with the configuration of Example 3.

As described above, in the fixing device 6B according to the present embodiment, the protruding portion 254 is provided at the end portion of the fixing film 25B on the second side W2, and thus, it is possible to reduce the wear of the inner surface of the fixing film 25B and to increase the life even when the shift force for the fixing film 25B is generated. As a result, the wear of the inner surface of the fixing film 25B due to the shift force can be reduced, and the fixing device 6B capable of achieving an increase in speed and an increase in life can be implemented. In addition, the wear of the inner surface of the fixing film 25B can be suppressed by using the fixing device 6B described in the present embodiment, thereby making it possible to achieve the increase in life, size reduction, and cost reduction. It can be said that the configuration of the present embodiment is a configuration suitable for a high-speed machine or a long-life machine in which high durability is required for the fixing film 25B.

In the present embodiment, a case where the protruding portion 254 is provided at the end portion **25*b*B of the fixing film 25B on the second side W2 and is not provided at the end portion 25*a*B on the first side W1 has been described, but the present technology is not limited thereto. For example, the protruding portion may be provided at the end portion 25*a*B on the first side W1. In this case, a protrusion amount of the protruding portion of the end portion 25*a*B on the first side W1 may be equal to or larger than a protrusion amount of the protruding portion 254 of the end portion 25*b*B on the second side W2, but it is preferable that the protrusion amount of the protruding portion of the end portion 25*a*B on the first side W1 is smaller than the protrusion amount of the protruding portion 254 of the end portion 25*b*B on the second side W2** from the viewpoint of size reduction.

Fourth Embodiment

Next, a fourth embodiment of the present invention will be described, and the fourth embodiment has a configuration in which the heater holder 29 according to the first embodiment is changed. Therefore, a configuration similar to that of the first embodiment will be described in a manner of omitting illustration or attaching the same reference numerals in the drawings.

In a case where a small-sized sheet is passed through a fixing device based on a side-end reference, a shift of a fixing film 25 in a width direction W may occur due to a temperature rise of a non-sheet-passing portion Ar2. A longitudinal shape of the fixing film 25 may change due to an influence of the temperature rise of the non-sheet-passing portion Ar2 in addition to the shift of the fixing film 25. There is a possibility that a shift force is increased due to the shape change, and there is a possibility that the fixing film 25 is deprived of heat by coming into contact with a member in an internal space and a fixing failure occurs. A mechanism of occurrence of a defect due to a change in longitudinal shape of the fixing film 25 will be described below by using comparison in a case where a letter-sized sheet having a maximum sheet-passing width and an A6-sized sheet having a small width are passed.

Figure 12A:
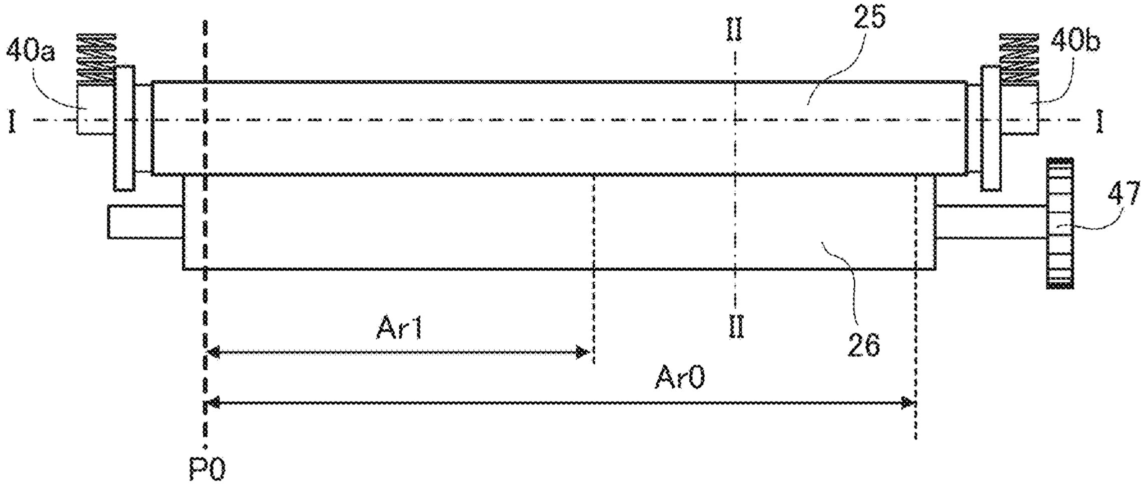
FIG. 12A is a side view illustrating a fixing device according to a fourth embodiment.
Figure 12B:
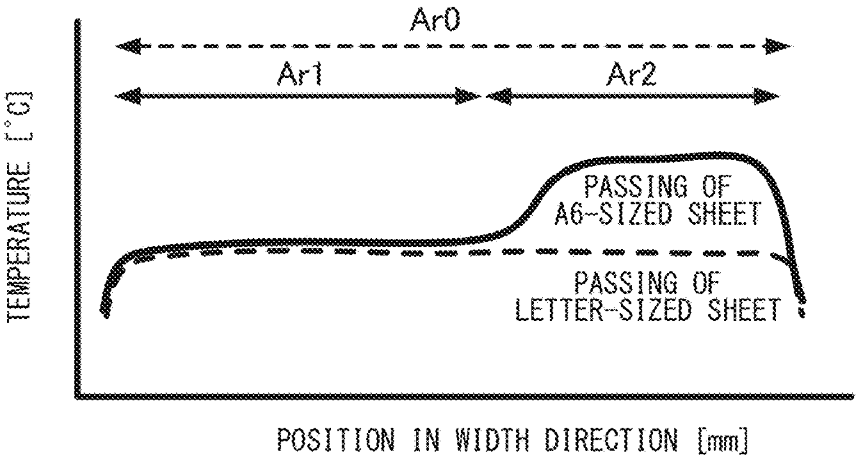
FIG. 12B is a graph illustrating a temperature distribution in a width direction of a counter roller of the fixing device according to the fourth embodiment.

FIG. 12A is a schematic view of sheet passage regions of a letter-sized sheet and an A6-sized sheet S. FIG. 12B illustrates a surface temperature distribution of a counter roller 61 in the width direction W when the letter-sized sheet and the A6-sized sheet are continuously passed. In the case of the letter-sized sheet, a surface temperature of a roller portion 26 is substantially uniform in a maximum conveyance region Ar0 (a sheet passing portion of the letter-sized sheet). In the case of the A6-sized sheet, a temperature of the non-sheet-passing portion Ar2 is higher than that of a sheet passing portion Ara due to the temperature rise of the non-sheet-passing portion Ar2. At this time, in a case where the roller portion 26 is configured such that an outer diameter of a base portion 261 in the width direction W illustrated in FIG. 6A is uniform and an outer diameter shape is a horizontally symmetrical inverted crown shape illustrated in FIG. 6B, a conveyance speed of the roller portion 26 in the width direction W is distributed as illustrated in FIG. 12C for each size.

Figure 12C:
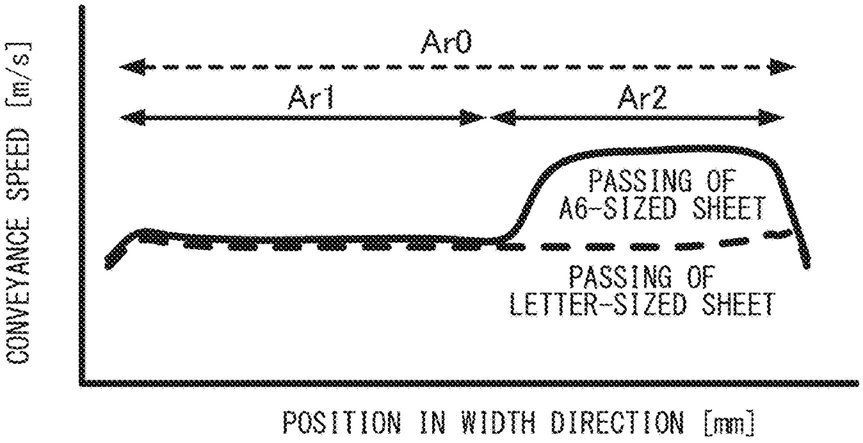
FIG. 12C is a graph illustrating a conveyance speed distribution in the width direction of the counter roller of the fixing device according to the fourth embodiment.

As illustrated in FIG. 12C, in the case of the letter-sized sheet, since the temperature of the roller portion 26 is substantially uniform in the width direction W, the conveyance speed is also substantially uniform in the width direction W. In the case of the A6-sized sheet, the conveyance speed in the width direction W is also distributed according to the temperature distribution of the roller portion 26 in the width direction W due to the temperature rise of the non-sheet-passing portion Ar2. This is because since an elastic layer 262 of the roller portion 26 thermally expands according to the temperature, an outer diameter in the non-sheet-passing portion Ar2 becomes larger than that in the sheet passing portion Ar1, an outer diameter difference and a circumferential speed difference thus occur, as a result of which a conveyance speed difference occurs. The conveyance speed difference in the width direction W may affect the shape of the fixing film 25 in the width direction W.

Figure 13A:
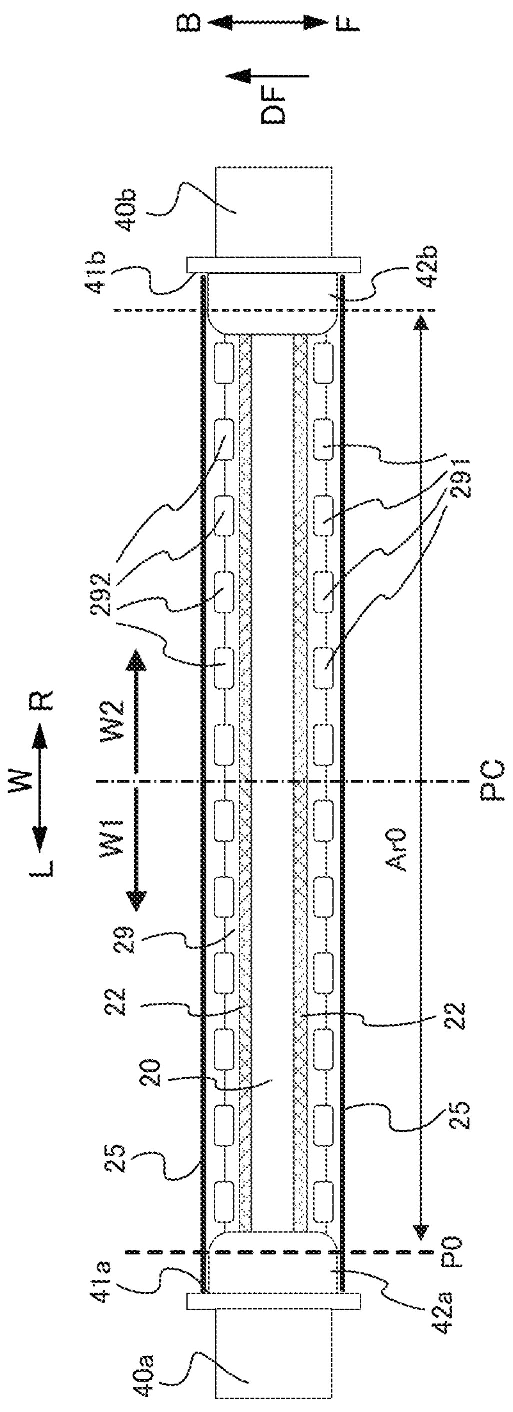
FIG. 13A is a cross-sectional view of a heating unit according to Comparative Example 5 at the time of fixing a letter-sized sheet when viewed from above.

FIG. 13A is a cross-sectional view taken along line I-I in FIG. 12A when viewed from above in a case where the letter-sized sheets are continuously passed in Comparative Example 5. A heater holder 29 of Comparative Example 5 is provided with an upstream guide portion 291 provided upstream in a sheet conveyance direction DF and a downstream guide portion 292 provided downstream to guide rotation of the fixing film 25 from the inside. As illustrated in FIG. 12C, since the conveyance speed distribution of the roller portion 26 in the width direction W is substantially uniform, the shape of the fixing film 25 in the width direction W is also substantially straight as illustrated in FIG. 13A.

Figure 14A:
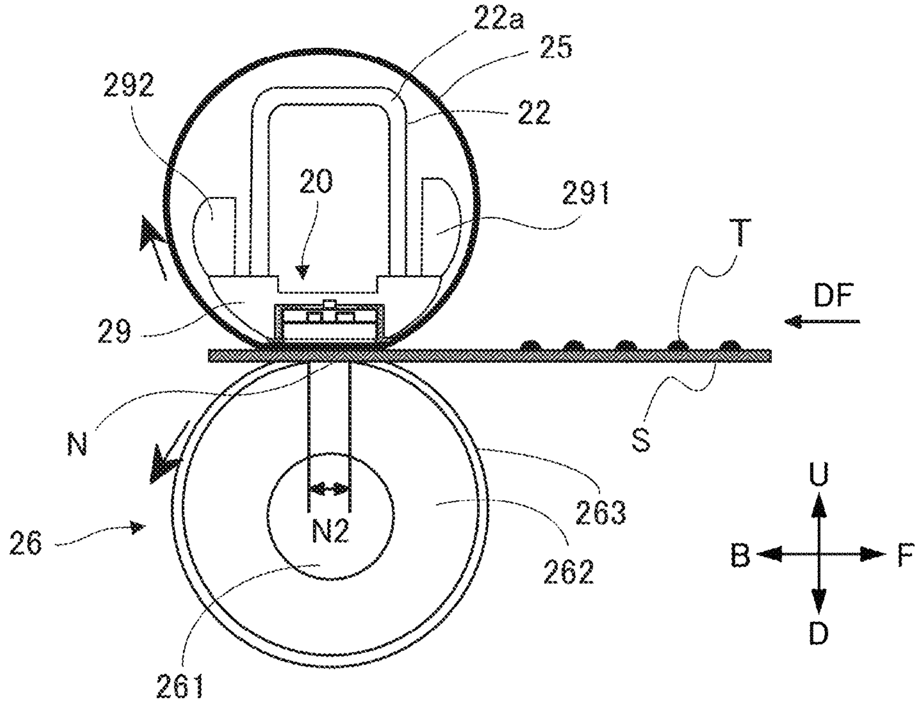
FIG. 14A is a cross-sectional view of the heating unit according to Comparative Example 5 at the time of fixing a letter-sized sheet when viewed from the front.

FIG. 14A is a cross-sectional view taken along line II-II in FIG. 12A in a case where the letter-sized sheets are continuously passed in Comparative Example 5. The fixing film 25 is not in contact with a stay 22 or the upstream guide portion 291 or the downstream guide portion 292 of the heater holder 29, which are components inside the fixing film 25.

Figure 13B:
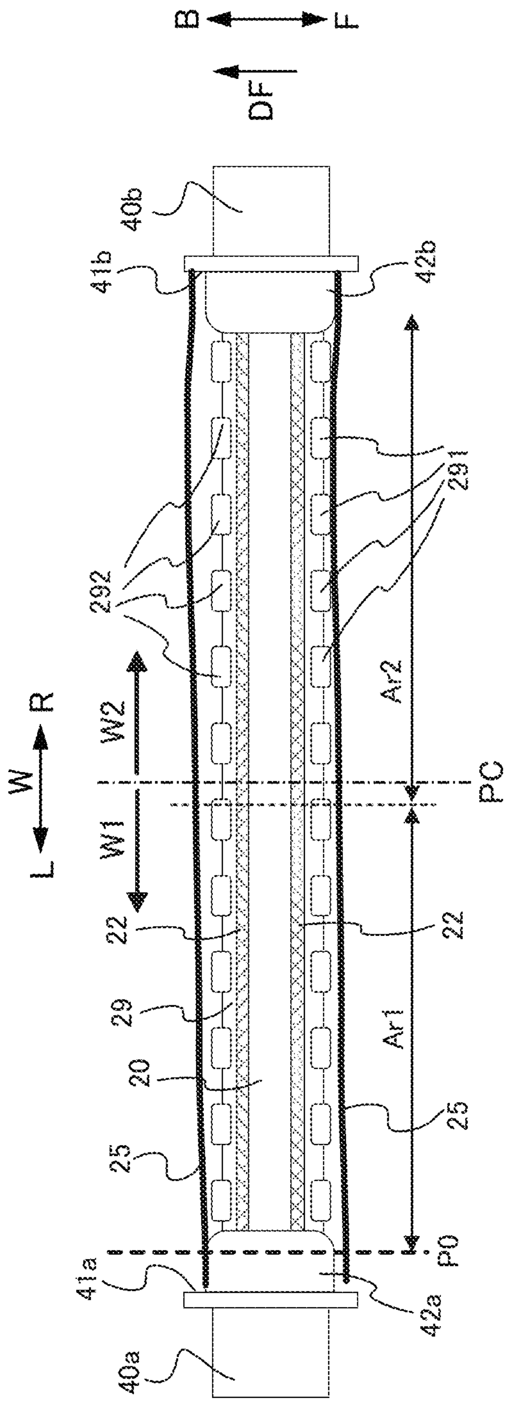
FIG. 13B is a cross-sectional view of the heating unit according to Comparative Example 5 at the time of fixing an A6-sized sheet when viewed from above.

Next, FIG. 13B illustrates a cross-sectional view taken along line I-I in FIG. 12A when viewed from above in a case where the A6-sized sheets are continuously passed in Comparative Example 5. As illustrated in FIG. 12C, since the conveyance speed of the roller portion 26 is higher in the non-sheet-passing portion Ar2 than in the sheet passing portion Ar1, the fixing film 25 bulges downstream in the non-sheet-passing portion Ar2. A posture of the fixing film 25 is similar to a state in which an intersection angle is formed with respect to the roller portion 26.

Figure 15:
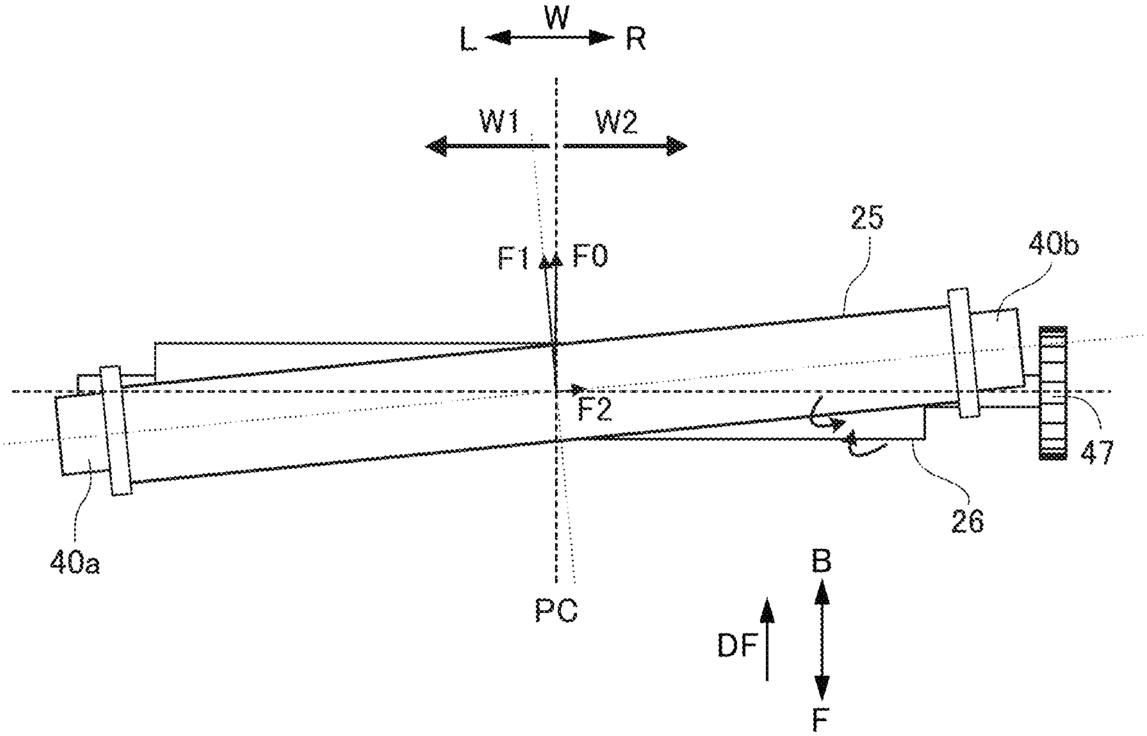
FIG. 15 is an explanatory view illustrating a force acting on a fixing film in a case where a cross angle is formed between the counter roller and the fixing film.

Here, a force acting on the fixing film 25 in a case where the intersection angle is formed between the fixing film 25 and the roller portion 26 will be described with reference to FIG. 15. The fixing film 25 receives a force F0 from the roller portion 26 by a frictional resistance. Since the force F0 can be decomposed into a component force F1 in a transverse direction (radial direction) of the fixing film 25 and a component force F2 in the width direction W, the fixing film 25 receives a force toward a second side W2, that is, a second flange **40*b* in the width direction W. Therefore, a shift force toward a side where the conveyance speed is high due to the temperature rise of the non-sheet-passing portion Ar2 and a shift force generated by the intersection angle being formed act together on the fixing film 25 illustrated in FIG. 13**B, as a result of which buckling is likely to occur.

Figure 14B:
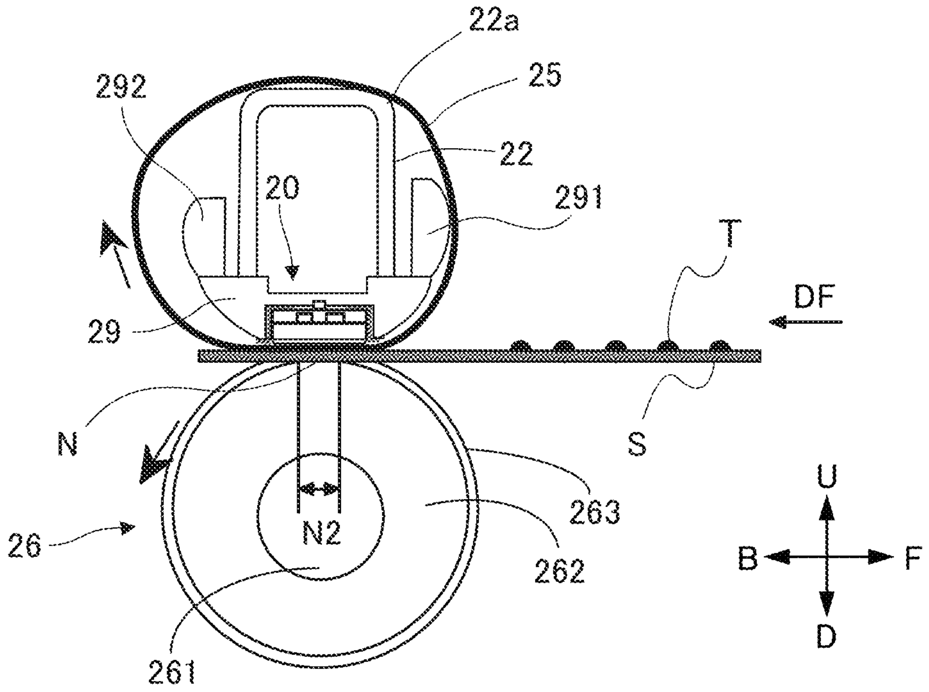
FIG. 14B is a cross-sectional view of the heating unit according to Comparative Example 5 at the time of fixing an A6-sized sheet when viewed from the front.

Next, FIG. 14B illustrates a cross-sectional view taken along line II-II in a case where the A6-sized sheets are continuously passed in Comparative Example 5. When the fixing film 25 bulges downstream in the sheet conveyance direction DF, an inner circumferential surface of the fixing film 25 comes into contact with the stay 22 upstream in the sheet conveyance direction DF. When the fixing film 25 comes into contact with the stay 22 having a large heat capacity, the temperature of the fixing film 25 may greatly decrease, leading to a fixing failure.

Such a phenomenon is likely to occur when a clearance between the fixing film 25 and the stay 22 is narrowed. For example, such a phenomenon occurs in a case where the outer diameter of the fixing film 25 is decreased in order to reduce a size of the fixing device, or a thickness or height of the stay 22 is increased in order to increase a stiffness of the stay 22. In addition, when a base layer 251 and an elastic layer 252 of the fixing film 25 are thin and a strength of the fixing film 25 is low, a deformation amount of the fixing film 25 increases even with the same conveyance speed difference of the roller portion 26 in the width direction W, and thus, the above phenomenon is likely to occur. In addition, when the temperature difference between the sheet passing portion Ar1 and the non-sheet-passing portion Ar2 of the roller portion 26 increases, the conveyance speed difference of the roller portion 26 in the width direction W increases, and the deformation amount of the fixing film 25 increases. Therefore, the above phenomenon is likely to occur.

Therefore, in the present embodiment, a protruding guide portion 293 protruding upstream of an upstream guide portion 291 in the sheet conveyance direction DF is provided upstream of a heater holder 29C, so that the fixing film 25 is prevented from coming into contact with internal components. Hereinafter, the heater holder 29C according to the present embodiment will be described with reference to FIGS. 16A to 17B.

Figure 16A:
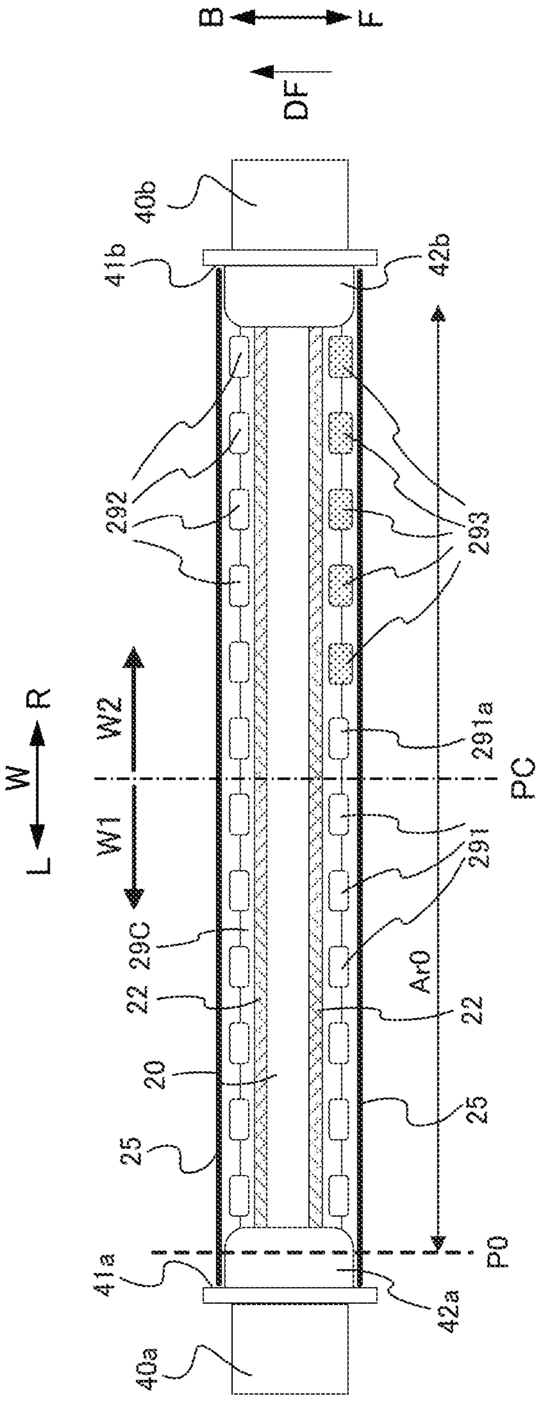
FIG. 16A is a cross-sectional view of a heating unit according to the fourth embodiment at the time of fixing a letter-sized sheet when viewed from above.

FIG. 16A is a cross-sectional view taken along line I-I in FIG. 12A when viewed from above in a case where the letter-sized sheets are continuously passed according to the fourth embodiment. A configuration of the heater holder 29C is different from that of Comparative Example 5. In the fourth embodiment, the protruding guide portion 293 for preventing film deformation is provided upstream of the heater holder 29C in the sheet conveyance direction DF and on a second side W2, and a protrusion amount toward an upstream side is increased as compared with the upstream guide portion 291.

Heater Holder and Stay

Figure 17A:
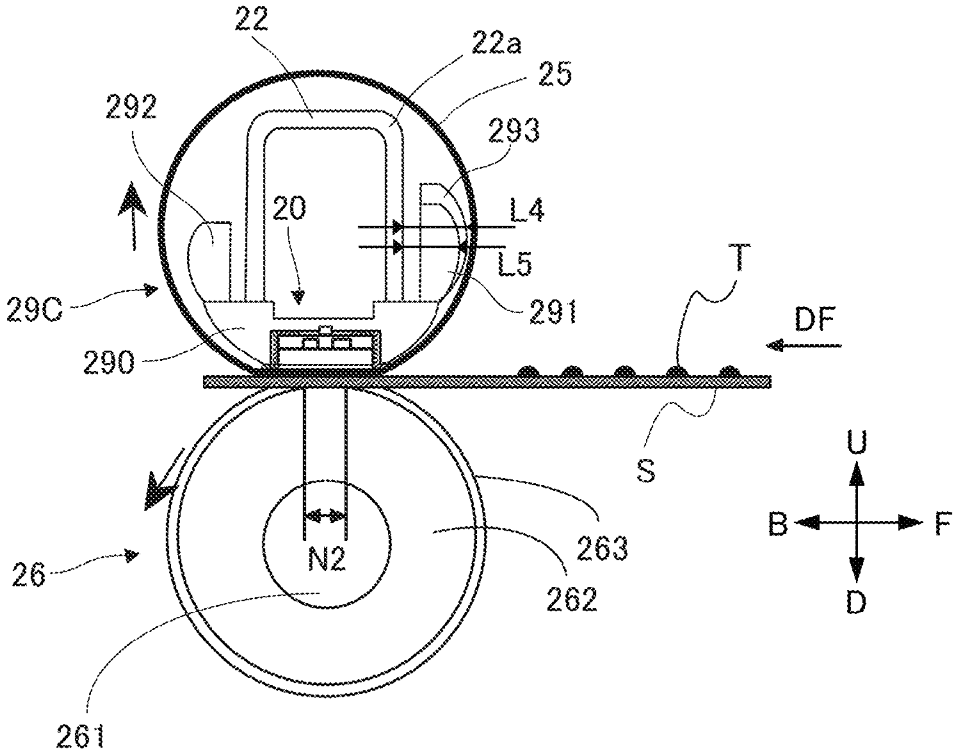
FIG. 17A is a cross-sectional view of the heating unit according to the fourth embodiment at the time of fixing a letter-sized sheet when viewed from the front.

As illustrated in FIGS. 16A and 17A, the heater holder 29C includes a heater holding portion 290 that holds a heater 20, and the upstream guide portion 291, a downstream guide portion 292, and the protruding guide portion 293 that are provided integrally with the heater holding portion 290. In the present embodiment, the heater holder 29C is made of a resin and integrally formed. However, the present technology is not limited thereto, and the heater holder 29C may be formed by integrating another member.

The upstream guide portion 291 is an example of a first guide portion, is provided on a first side W1 in the width direction W, and can guide the fixing film 25 at a position upstream of a fixing nip N2 in the sheet conveyance direction DF. The downstream guide portion 292 is provided in the entire region of the heater holder 29C in the width direction W, and can guide the fixing film 25 downstream of the fixing nip N2 in the sheet conveyance direction DF. The protruding guide portion 293 is an example of a second guide portion, is provided on the second side W2 in the width direction W, and can guide the fixing film 25 at a position upstream of the fixing nip N2 in the sheet conveyance direction DF.

A stay 22 has a facing portion 22*a* facing an inner circumferential surface of the fixing film 25. Here, an orthogonal direction orthogonal to the sheet conveyance direction DF and the width direction W is defined as an upward-downward direction. The facing portion 22*a* is a part of the stay 22 and is a portion that is positioned farther from the fixing nip N2 than the upstream guide portion 291 and the protruding guide portion 293 in the upward-downward direction and faces an upstream part of the inner circumferential surface of the fixing film 25 in the sheet conveyance direction DF.

In the present embodiment, as illustrated in FIG. 17A, a distance LA from the facing portion 22*a* of the stay 22 to an upstream end of the protruding guide portion 293 is longer than a distance L5 from the facing portion 22*a* to an upstream end of the upstream guide portion 291 in the sheet conveyance direction DF. As a result, in a case where a portion of the fixing film 25 on the second side W2 is about to be deformed downstream in the sheet conveyance direction DF, the protruding guide portion 293 comes into contact with the fixing film 25 even when the amount of deformation of the fixing film is small unlike a case where only the upstream guide portion 291 is provided on the second side W2. For this reason, the protruding guide portion 293 comes into contact with the fixing film 25 before the inner circumferential surface of the fixing film 25 abuts on the facing portion 22*a*, and further deformation of the fixing film 25 is suppressed, so that it is possible to prevent the inner circumferential surface of the fixing film 25 from coming into contact with the facing portion 22*a*.

FIG. 17A is a cross-sectional view taken along line II-II in FIG. 12A in a case where the letter-sized sheets are continuously passed. The protruding guide portion 293 protrudes upstream in the sheet conveyance direction DF as compared with the upstream guide portion 291 of Comparative Example 5 illustrated in FIG. 13A, and has a shape close to but not in contact with the fixing film 25. In FIG. 17A, a height of the protruding guide portion 293 is larger than that of the upstream guide portion 291 of Comparative Example 5, but the heights may be the same.

Figure 16B:
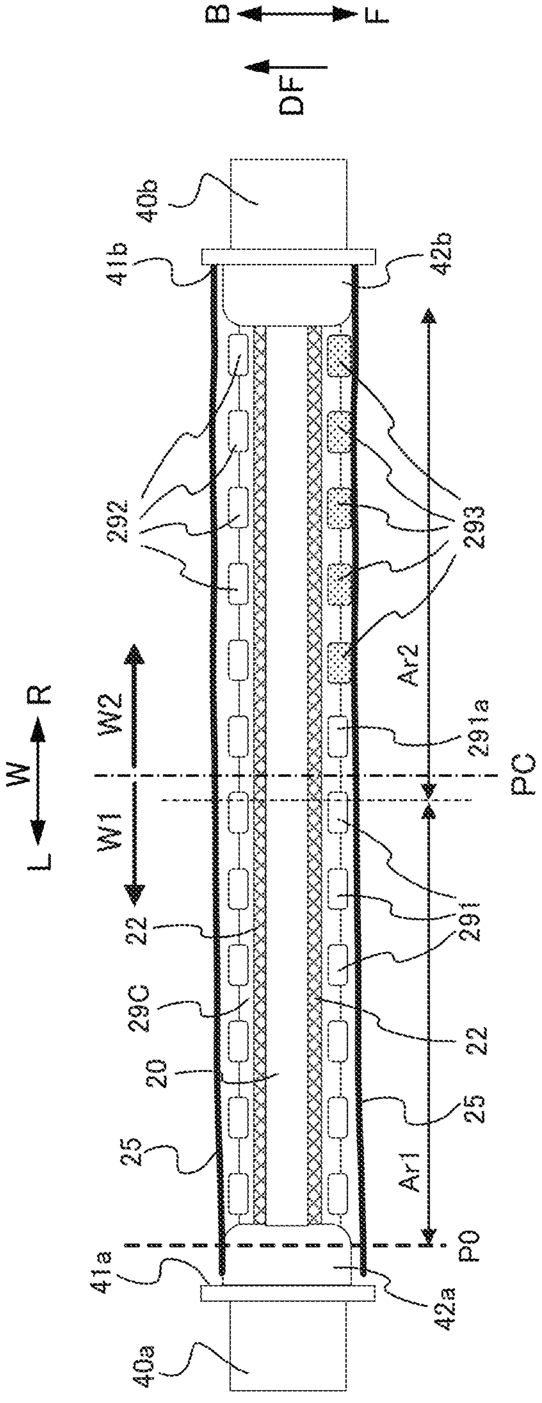
FIG. 16B is a cross-sectional view of the heating unit according to the fourth embodiment at the time of fixing an A6-sized sheet when viewed from above.

FIG. 16B is a cross-sectional view taken along line I-I in FIG. 12A when viewed from above in a case where the A6-sized sheets are continuously passed according to the fourth embodiment. The temperature rises in a non-sheet-passing portion Ar2, a conveyance speed of a roller portion 26 in the non-sheet-passing portion Ar2 increases, and the fixing film 25 is about to bulge downstream in the sheet conveyance direction DF, but the protruding guide portion 293 supports the fixing film 25 upstream to prevent deformation. Therefore, an intersection angle between the fixing film 25 and the roller portion 26 is not significantly large, and an increase in shift force due to the intersection angle is prevented.

Figure 17B:
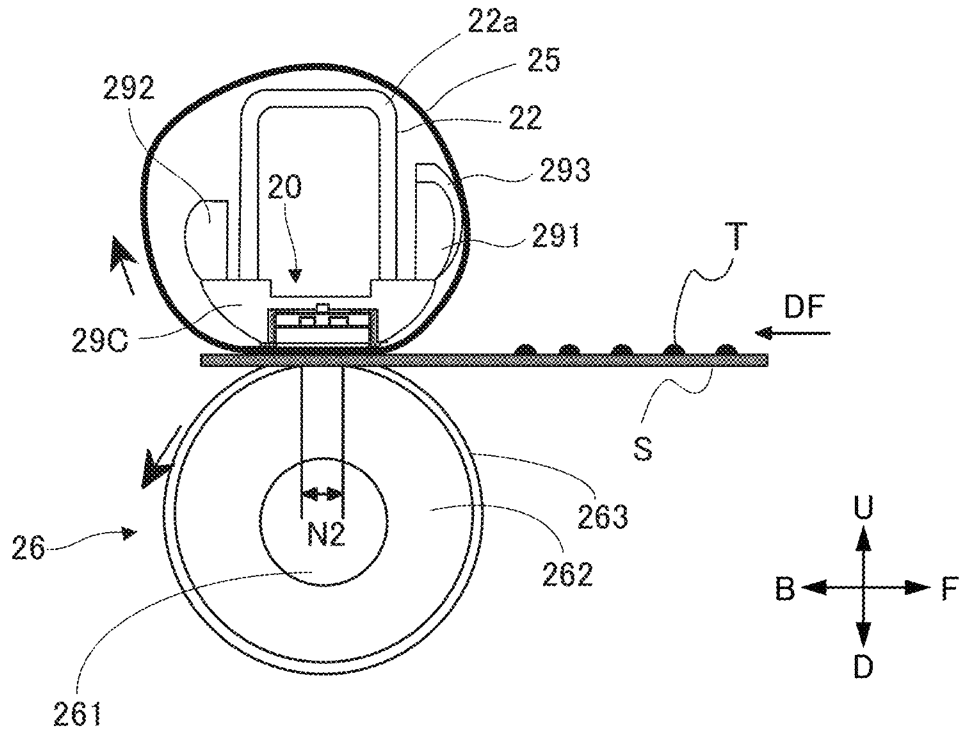
FIG. 17B is a cross-sectional view of the heating unit according to the fourth embodiment at the time of fixing an A6-sized sheet when viewed from the front.

FIG. 17B is a cross-sectional view taken along line II-II in FIG. 12A in a case where the A6-sized sheets are continuously passed according to the fourth embodiment. Since the protruding guide portion 293 supports the fixing film 25 from an inner circumferential side upstream in the sheet conveyance direction DF, the fixing film 25 can be prevented from coming into contact with the stay 22 having a large heat capacity. The protruding guide portion 293 is made of the same material as the heater holder 29C, and for example, a heat-resistant resin such as a liquid crystal polymer, a phenolic resin, PPS, or PEEK is used. Since the resins have a lower heat capacity than the stay 22, the resins do not take much heat even when coming into contact with the fixing film 25, and fixing performance is suppressed from greatly deteriorating.

In the present embodiment, a contact surface of the protruding guide portion 293 with respect to the fixing film 25 is flat. However, the contact surface is not limited to being flat, and a groove, a rib, or the like may be provided on the surface of the protruding guide portion 293 in order to reduce a contact area with the fixing film 25. In the present embodiment, five protruding guide portions 293 are arranged side by side on a distal end side of the second side W2. However, the number of protruding guide portions 293 is not limited to five, and may be other numbers. That is, the number and position are not limited to those illustrated in the drawings, and any configuration may be used as long as deformation of the fixing film 25 can be suppressed.

In the present embodiment, the heater holder 29C also includes an upstream guide portion 291*a* on the second side W2 in the width direction W. The upstream guide portion 291*a* is an example of a third guide portion, and is provided so as to be separated from the protruding guide portion 293 in the width direction W. In the sheet conveyance direction DF, a distance L5 from the facing portion 22*a* to an upstream end of the upstream guide portion 291*a* is set to be shorter than the distance LA from the facing portion 22*a* to the upstream end of the protruding guide portion 293. That is, not all the guide portions provided on the second side W2 in the width direction W of the heater holder 29C are necessarily the protruding guide portions 293, and some of the guide portions including other upstream guide portions 291 are the protruding guide portions 293. However, the present technology is not limited thereto, and all the guide portions provided on the second side W2 in the width direction W of the heater holder 29C may be the protruding guide portions 293.

Examples and Comparative Examples

A print durability test was conducted using Example 4 and Comparative Example 5 in which the heater holder 29C according to the present embodiment was applied. In the print durability test, the fixing films 25 with the base layers 251 having different thicknesses were prepared, and the fixing films 25 having different thicknesses were incorporated into fixing devices using Example 4 and Comparative Example 5, respectively. Then, the fixing performance and durability when 5000 sheets of PB paper (A6 size and 68 g/cm$^2$) were continuously passed at a speed of 75 sheets/minute were evaluated. In the fixing films 25 used in the comparative test, the base layer 251 had three levels of thicknesses of 60 μm, 65 μm, and 70 μm, the elastic layer 252 had a thickness of 250 μm, and the surface layer 253 had a common thickness of 12 μm.

Table 7 shows durability and fixing performance evaluation results. Evaluation criteria for the durability are as follows. A case where the durability of the fixing film 25 was good without any problem was evaluated as "Good", and a case where a problem related to the durability of the fixing film 25, which can cause a problem in practical use, occurred was evaluated as "Poor". Further, as for evaluation criteria for fixing performance, a case where the fixing performance was good without any problem was evaluated as "Good", and a case where the fixing performance was insufficient was evaluated as "Poor".

TABLE 7

| | Fixing performance/durability | | |
|---|---|---|---|
| | Base layer: 70 μm | Base layer: 65 μm | Base layer: 60 μm |
| Comparative Example 5 | Good/Good | Poor/Good | Poor/Poor |
| Example 4 | Good/Good | Good/Good | Good/Good |

In Comparative Example 5, the fixing film 25 with the base layer having a thickness of 70 μm had no problem in both fixing performance and durability. The fixing film 25 with the base layer having a thickness of 65 μm had no problem in durability, but the fixing performance deteriorated midway during the use. In the fixing film 25 with the base layer having a thickness of 60 μm, problems occurred in fixing performance and durability.

The above results indicate that when the thickness of the base layer 251 of the fixing film 25 decreases, the strength of the fixing film 25 decreases, and as a result, the shape change of the fixing film 25 in the width direction W increases due to the temperature rise of the non-sheet-passing portion Ar2. When the thickness of the base layer was 65 μm or 60 μm, the shape change of the fixing film 25 was large, and the inner circumferential surface of the fixing film 25 was brought into contact with the stay 22 by bulging downstream in the sheet conveyance direction DF in the non-sheet-passing portion Ar2, and heat was deprived, so that a fixing failure occurred. In addition, since the shape change was large and the intersection angle with the roller portion 26 became large, the shift force due to the intersection angle also became large. When the thickness of the base layer was 65 μm, there was no problem in durability, but when the thickness of the base layer was 60 μm, the strength of the fixing film 25 was low, as a result of which buckling occurred at the end portion.

In Example 4, there was no problem in fixing performance and durability at all thicknesses of the base layer. This is because the shape change of the fixing film 25 due to the temperature rise of the non-sheet-passing portion Ar2 was suppressed by the protruding guide portion 293 from the inner circumferential surface side, and thus the contact of the fixing film 25 with the stay 22 was also able to be prevented. The fixing film 25 was in contact with the protruding guide portion 293, but the heater holder 29C has a low heat capacity and thus did not take much heat, and therefore, there was no significant deterioration in fixing performance. In addition, since the shape change was suppressed, the intersection angle with the roller portion 26 was able to be prevented from increasing, and the shift force was also able to be suppressed to some extent. As a result, even when the thickness of the base layer was 60 μm, occurrence of buckling during the use was able to be prevented.

In the comparative experiment, the degree of shape change was changed by changing the strength in a manner of changing the thickness of the base layer of the fixing film 25. However, the present technology is not limited to this method, and similar results can be obtained in a configuration in which a temperature difference between the sheet passing portion Ar1 and the non-sheet-passing portion Ar2 is increased or a clearance between the fixing film 25 and the stay 22 is narrowed.

As described above, with the heater holder 29C according to the present embodiment, the shape change is suppressed by the protruding guide portion 293 provided to support the inner circumferential surface of the fixing film 25 from the inside, and thus, it is possible to prevent the inner circumferential surface of the fixing film 25 from coming into contact with the facing portion 22*a*. As a result, even in a configuration in which the deformation amount of the fixing film 25 tends to increase due to thinning of the fixing film 25 or the like, occurrence of the fixing failure and buckling can be suppressed, and a fixing device capable of achieving an increase in speed and an increase in life can be implemented.

Fifth Embodiment

Next, a fifth embodiment of the present invention will be described, and the fifth embodiment has a configuration in which the stay 22 according to the fourth embodiment is changed. Therefore, a configuration similar to that of the fourth embodiment will be described in a manner of omitting illustration or attaching the same reference numerals in the drawings.

Figure 18:
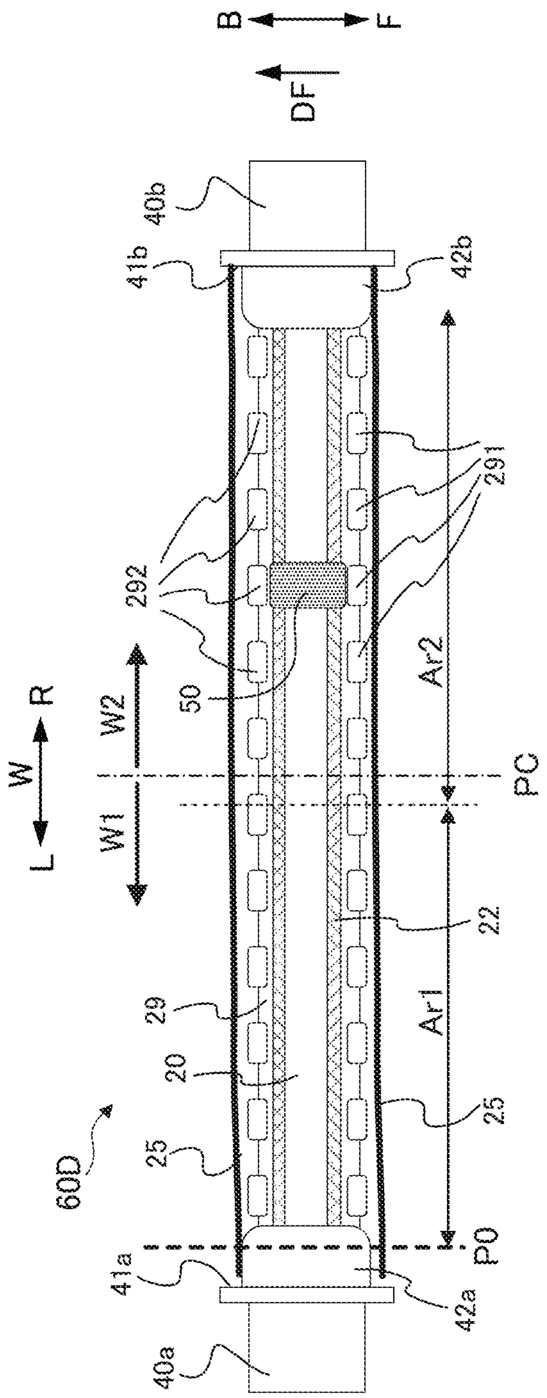
FIG. 18 is a cross-sectional view of a heating unit according to a fifth embodiment when viewed from above.

In the present embodiment, a shape change of a fixing film 25 is suppressed by a configuration different from that of the fourth embodiment to suppress a fixing failure and buckling. A configuration of the present embodiment will be described with reference to FIGS. 18 to 19B. FIG. 18 is a cross-sectional view taken along line I-I in FIG. 12A when viewed from above in a case where A6-sized sheets are continuously passed according to the present embodiment. In the present embodiment, a heating unit 60D of a fixing device 6D includes a cover 50 for contact prevention provided on a second side W2 of a stay 22 unlike the fixing device of Comparative Example 5.

Figure 19A:
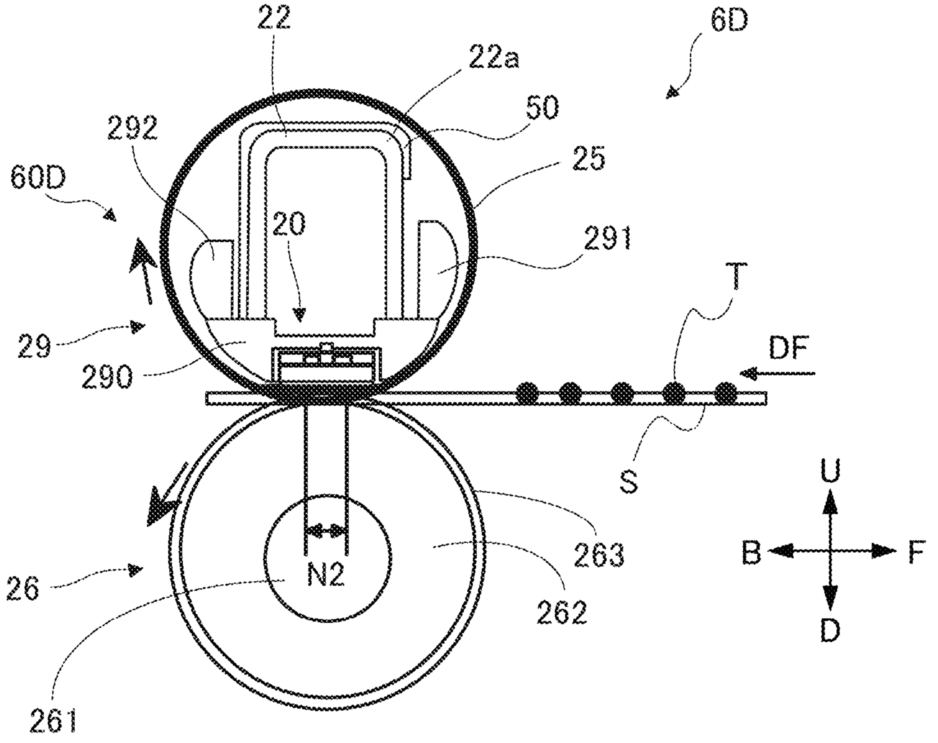
FIG. 19A is a cross-sectional view of the heating unit according to the fifth embodiment at the time of fixing a letter-sized sheet when viewed from the front.
Figure 19B:
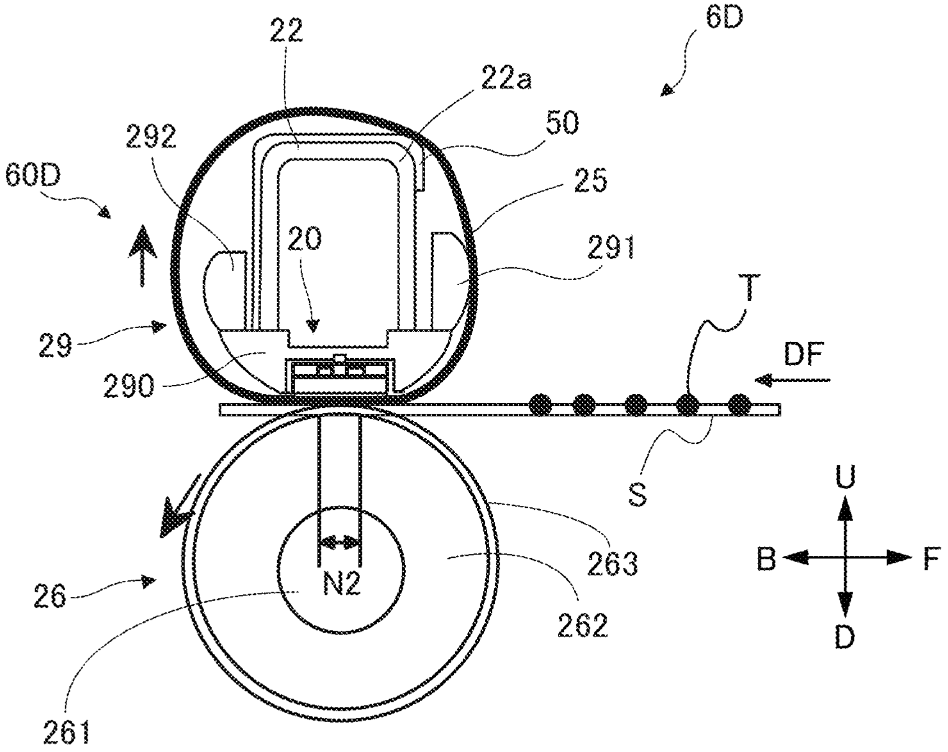
FIG. 19B is a cross-sectional view of the heating unit according to the fifth embodiment at the time of fixing an A6-sized sheet when viewed from the front.

FIG. 19A is a cross-sectional view taken along line II-II in FIG. 12A in a case where letter-sized sheets are continuously passed. The cover 50 is not in contact with the fixing film 25 when the letter-sized sheet is passed. FIG. 19B is a cross-sectional view taken along line II-II in FIG. 12A in a case where the A6-sized sheets are continuously passed. The cover 50 supports the fixing film 25 from an inner circumferential surface side, thereby suppressing deformation of the fixing film 25. Similarly to the fourth embodiment, the fixing film 25 does not come into direct contact with the stay 22, and thus, it is possible to prevent a fixing failure from occurring. In addition, as illustrated in FIG. 18, the shape change of the fixing film 25 is suppressed, and thus, it is possible to prevent an increase in shift force due to an increase in intersection angle.

In the present embodiment, a heater holder 29 includes a heater holding portion 290 that holds a heater 20, and an upstream guide portion 291 and a downstream guide portion 292 provided integrally with the heater holding portion 290. In the present embodiment, the protruding guide portion 293 in the fourth embodiment is not provided. The stay 22 has a facing portion 22*a* similar to that of the fourth embodiment. In the present embodiment, only one cover 50 is provided. In addition, the cover 50 is provided so as to extend from upstream of the facing portion 22*a* toward downstream along an upper surface of the stay 22 in a sheet conveyance direction DF, and further extend downward along a downstream side surface of the stay. The surface of the cover 50 that comes into contact with the fixing film 25 is a flat surface.

The cover 50 is provided between the facing portion 22*a* of the stay 22 and the inner circumferential surface of the fixing film 25 upstream in the sheet conveyance direction DF. Accordingly, even when the fixing film 25 is deformed, it is possible to prevent the fixing film 25 from directly abutting on the facing portion 22*a*. The cover 50 is supported by the stay 22. The cover 50 is made of a material having a thermal conductivity lower than that of the stay 22, such as a resin. As a result, escape of heat can be suppressed as compared with a case where the fixing film 25 directly abuts on the facing portion 22*a*.

As described above, in the fixing device 6D according to the present embodiment, the cover 50 is provided to support the fixing film 25 from the inside, and thus, the shape change can be suppressed, and the inner circumferential surface of the fixing film 25 can be prevented from coming into contact with the facing portion 22*a*. As a result, even in a configuration in which the deformation amount of the fixing film 25 tends to increase due to thinning of the fixing film 25 or the like, occurrence of the fixing failure and buckling can be suppressed, and a fixing device capable of achieving an increase in speed and an increase in life can be implemented.

In the present embodiment, an example in which one cover 50 is disposed on the second side W2 has been described, but the present technology is not limited thereto, and a plurality of covers 50 may be disposed. In addition, the surface of the cover 50 with which the fixing film 25 comes into contact is not limited to a flat surface, and a groove may be provided for the purpose of reducing a contact area.

Sixth Embodiment

Next, a sixth embodiment of the present invention will be described, and the sixth embodiment has a configuration in which the second flange 40*b* according to the first embodiment is changed. Therefore, a configuration similar to that of the first embodiment will be described in a manner of omitting illustration or attaching the same reference numerals in the drawings.

In the fourth embodiment and the fifth embodiment, the fixing failure due to the contact with the stay 22 and the increase in the shift force due to the intersection angle formed with respect to the roller portion 26 caused by the shape change of the fixing film 25 due to the temperature rise of the non-sheet-passing portion Ar2 are prevented. However, it is not possible to suppress the shift force itself caused by occurrence of the conveyance speed difference due to the temperature rise of the non-sheet-passing portion Ar2. Therefore, in the present embodiment, a shift flange unit 43 is used for a second flange 40*b*E on a second side W2 to reduce a shift force generated by a temperature rise of a non-sheet-passing portion Ar2.

Shift Flange Unit

The shift flange unit 43 of a fixing device 6E according to the present embodiment will be described with reference to FIGS. 20A to 21B. The shift flange unit 43 includes a second flange 40*b*E, a support portion 44, and an urging spring 45. The support portion 44 is fixed to a frame (not illustrated) of the fixing device 6E. The second flange 40*b*E is movably engaged with the support portion 44, and a gap having a slight distance G0 in a sheet conveyance direction DF is provided between the second flange 40*b*E and the support portion 44. The support portion 44 supports the second flange 40*b* in a movable manner.

The second flange 40*b*E includes a restriction surface 41*b*E facing an end surface of a fixing film 25 on the second side W2, and a guide portion 42*b*E facing an inner circumferential surface of an end portion of the fixing film 25. When the fixing film 25 moves in a width direction W, the end surface of the fixing film 25 abuts on the restriction surface 41*b*E. The guide portion 42*b*E also has a function of guiding the inner circumferential surface of the fixing film 25 at the time of rotation of the fixing film 25.

The second flange 40*b*E includes a protrusion 46 provided to protrude toward the second side W2 in the width direction W and having a distal end surface 46*a* facing an oblique direction with respect to the width direction W. The distal end surface 46*a* of the protrusion 46 is inclined such that the second side W2 in the width direction W is upstream in the sheet conveyance direction DF. The support portion 44 has a recess 44*a* provided so as to be recessed from an end surface on a first side W1 toward the second side W2 in the width direction W and having a bottom surface 44*b* facing the oblique direction with respect to the width direction W. The bottom surface 44*b* of the recess 44*a* is inclined such that the second side W2 in the width direction W is upstream in the sheet conveyance direction DF. That is, the support portion 44 has the bottom surface 44*b* of the recess 44*a* as an example of a cam surface, and the second flange 40*b*E has the distal end surface 46*a* of the protrusion 46 that abuts on the bottom surface 44*b* and slides as an example of a slider.

In the present embodiment, a case where the distal end surface 46*a* of the protrusion 46 is an inclined surface that slides on the bottom surface 44*b* has been described, but the present technology is not limited thereto. For example, a distal end of the protrusion 46 may have a curved surface shape or a spherical shape, or a rotatable rotary member may be provided to slide with respect to the bottom surface 44*b*. In the present embodiment, a case where the slider is provided in the second flange 40*b*E and the cam surface is provided in the support portion 44 has been described, but the present technology is not limited thereto, and the relationship may be reversed. That is, one of the second flange 40*b*E and the support portion 44 may have the cam surface, and the other one of the second flange 40*b*E and the support portion 44 may have the slider that abuts on the cam surface and slides.

When the second flange 40*b*E and the support portion 44 are combined, the protrusion 46 of the second flange 40*b*E fits in the recess 44*a* of the support portion 44. With such a configuration, the second flange 40*b*E is slidably held along the recess 44*a* of the support portion 44. An urging spring 45 is an example of an urging portion, and is a compression coil spring that is contracted between the second flange 40*b*E and the support portion 44 and urges the second flange 40*b*E in a direction away from the support portion 44 (first side W1).

Figure 20A:
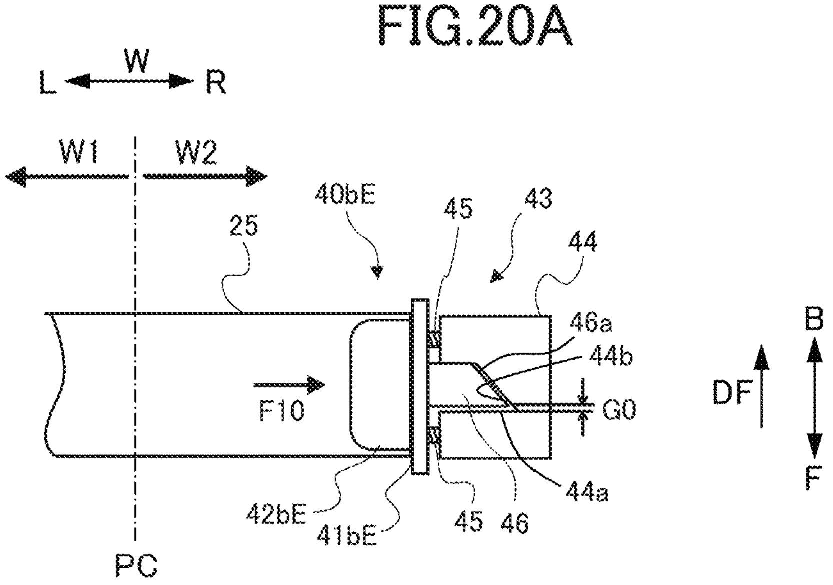
FIG. 20A is an explanatory view when a flange of a fixing device according to a sixth embodiment is positioned at a first position.

Next, an operation of the shift flange unit 43 will be described. FIG. 20A illustrates a state in which no shift force is generated for the fixing film 25. At this time, the urging spring 45 pushes the second flange 40*b*E toward the first side. There is a gap between a restriction surface 41*b*E of the second flange 40*b*E and an end surface of the fixing film 25. In addition, there is a gap between the distal end surface of the protrusion 46 of the second flange 40*b*E and the bottom surface of the recess 44*a* of the support portion 44.

In this state, when a shift force F10 is generated for the fixing film 25 due to the temperature rise of the non-sheet-passing portion Ar2 or the like, the fixing film 25 abuts on the restriction surface 41*b*E. When the shift force F10 is stronger than a pushing force of the urging spring 45, the fixing film 25 pushes the restriction surface 41*b*E toward the support portion 44. When the distal end surface of the protrusion 46 of the second flange 40*b*E reaches the bottom surface of the recess 44*a* of the support portion 44, the distal end surface of the protrusion 46 slides along the bottom surface of the recess 44*a*.

Figure 20B:
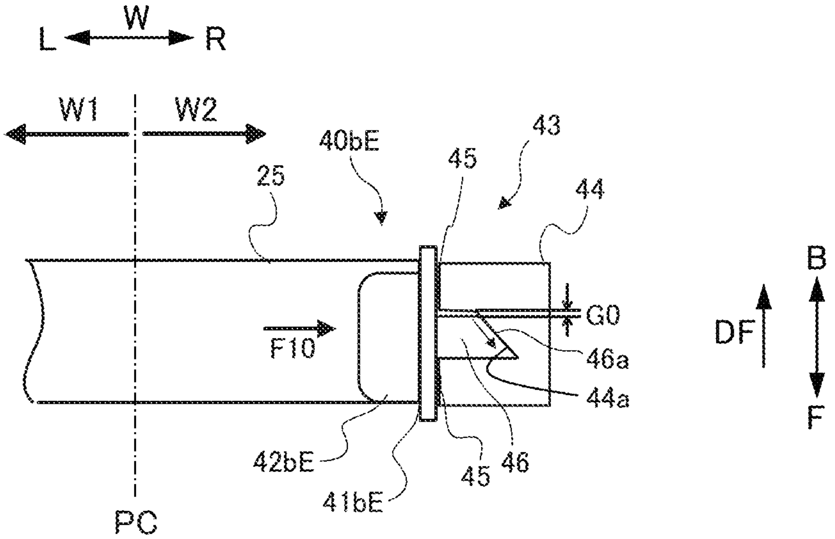
FIG. 20B is an explanatory view when the flange of the fixing device according to the sixth embodiment is positioned at a second position.

As illustrated in FIG. 20B, when the distal end surface of the protrusion 46 of the second flange 40*b*E slides on the bottom surface of the recess 44*a* of the support portion 44 and abuts in the sheet conveyance direction DF, the second flange 40*b*E move upstream by the distance G0 in the sheet conveyance direction DF.

Here, a position of the second flange 40*b*E in FIG. 20A is defined as a first position, and a position of the second flange 40*b*E in FIG. 20B is defined as a second position. The second flange 40*b*E is movable to the first position and the second position. At the second position, the guide portion 42*b*E is positioned upstream of that at the first position in the sheet conveyance direction DF. Then, the second flange 40*b*E moves from the first position to the second position by the fixing film 25 pushing the restriction surface 41*b*E toward the second side W2 when the second flange 40*b*E is positioned at the first position. The position of the restriction surface 40*b*E when the second flange 41*b*E is positioned at the second position is positioned more toward the second side W2 relative to the position of the restriction surface 40*b*E when the second flange 41*b*E is positioned at the first position. The bottom surface 44*b* and the distal end surface 46*a* guide the second flange 40*b*E toward the second position by the restriction surface 41*b*E of the second flange 40*b*E positioned at the first position receiving the pushing force against the urging force of the urging spring 45 toward the second side W2 from the fixing film 25. Here, in the present embodiment, a case where the guide portion 42*b*E and the restriction surface 41*b*E are integrally formed and move integrally has been described, but the present technology is not limited thereto, and the guide portion 42*b*E and the restriction surface 41*b*E may be members that move separately and independently. In this case, for example, the guide portion 42*b*E and the restriction surface 41*b*E may be moved independently using an actuator or the like.

When the second flange 40*b*E moves upstream in the sheet conveyance direction DF by the distance G0, the fixing film 25 is shifted upstream by the distance G0 only on the second side W2, and an intersection angle is formed with respect to a roller portion 26. Here, the effect that the fixing film 25 on the second side W2 is shifted upstream in the sheet conveyance direction DF will be described with reference to FIG. 15. In FIG. 15, the fixing film 25 is shifted upstream in the sheet conveyance direction DF on the first side W1. The fixing film 25 receives a force F0 from the roller portion 26, and the force F0 can be decomposed into a component force F2 acting in a longitudinal direction of the fixing film 25 and a component force F1 acting in a transverse direction of the fixing film 25. Therefore, it can be seen that, when the intersection angle is formed between the fixing film 25 and the roller portion 26, the component force F2 acts on the fixing film 25 in a direction away from a first flange 40*a* shifted upstream in the sheet conveyance direction DF.

Figure 21A:
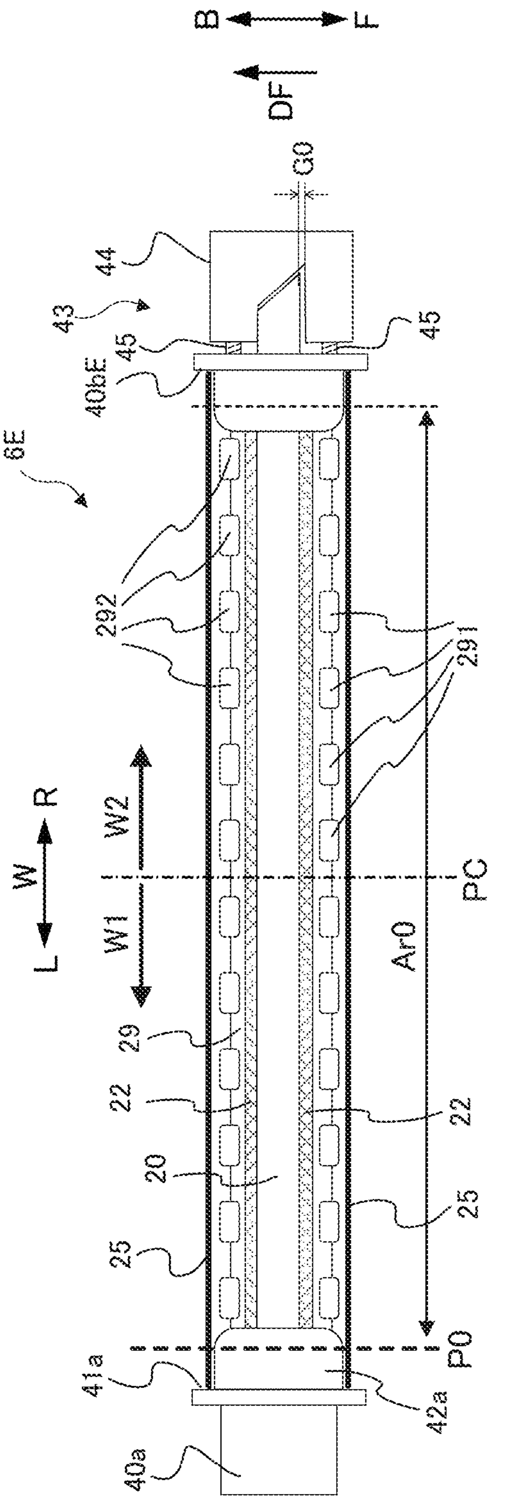
FIG. 21A is an explanatory view illustrating a heating unit according to the sixth embodiment when the flange is positioned at the first position.

FIG. 21A is a cross-sectional view taken along line I-I in FIG. 12A when viewed from above in a case where letter-sized sheets are continuously passed according to the present embodiment. The shift flange unit 43 is not operated because no shift force due to the temperature rise of the non-sheet-passing portion Ar2 is generated.

Figure 21B:
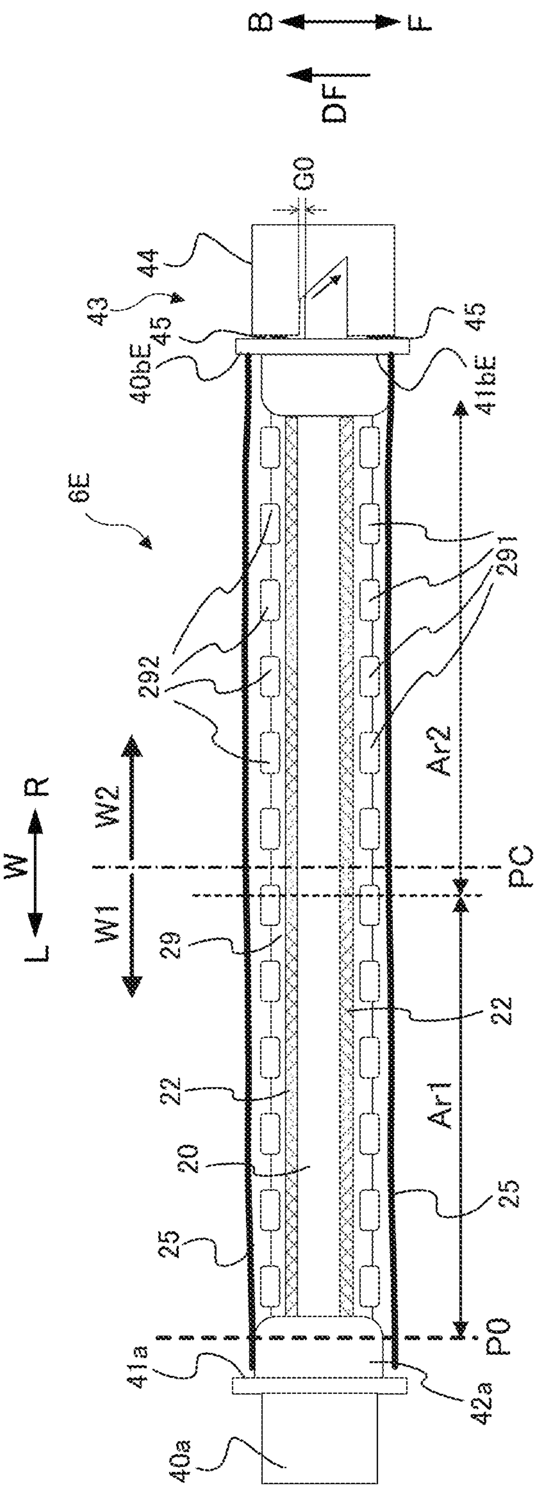
FIG. 21B is an explanatory view illustrating the heating unit according to the sixth embodiment when the flange is positioned at the second position.

FIG. 21B is a cross-sectional view taken along line I-I in FIG. 12A when viewed from above in a case where A6-sized sheets are continuously passed according to the present embodiment. Due to the temperature rise of the non-sheet-passing portion Ar2, a shift force in a direction of pushing the restriction surface 41*b*E of the shift flange unit 43 acts on the fixing film 25.

The fixing film 25 is shifted by the distance G0 upstream in the sheet conveyance direction DF while being restricted by the second flange 40*b*E only on the second side W2 by the operation of the shift flange unit 43. The fixing film 25 is separated from the stay 22 by the second flange 40*b*E and does not come into contact with the stay 22, so that occurrence of a fixing failure can be prevented. In addition, since the fixing film 25 can form the intersection angle with the roller portion 26 so as to cancel the shift force due to the temperature rise of the non-sheet-passing portion Ar2 by the movement of the second flange 40*b*E, the shift force can be reduced.

Examples and Comparative Examples

In order to confirm the effect of the present embodiment, a comparative test was conducted using Example 6 of the present embodiment, and Example 4 and Comparative Example 5. In the fixing film 25 used in the comparative test, a base layer 251 had a thickness of 60 μm, an elastic layer 252 had a thickness of 250 μm, and a surface layer 253 had a thickness of 12 μm. The fixing film 25 was incorporated in each configuration, and fixing performance and a shift force applied to the end portion of the fixing film when 500 sheets of PB paper (A6 size and 68 g/cm$^2$) were continuously passed at a speed of 75 sheets/minute were evaluated.

Table 8 shows fixing performance and shift force evaluation results. As for evaluation criteria for fixing performance, a case where the fixing performance was good without any problem was evaluated as "Good", and a case where the fixing performance was insufficient was evaluated as "Poor".

TABLE 8

| | Fixing performance | Shift force |
|---|---|---|
| Comparative Example 5 | Poor | 1.8 kgf |
| Example 4 | Good | 1.1 kgf |
| Example 6 | Good | 0.5 kgf |

The fixing performance evaluation results of Comparative Example 5 and Example 4 are as described in the fourth embodiment. In Example 6, the fixing film 25 did not come into contact with the stay 22 by the operation of the shift flange unit 43, and thus, the occurrence of fixing failure was able to be prevented.

The temperature rising in the non-sheet-passing portion Ar2 was substantially the same in all the configurations, but the shift force applied to the end portion of the fixing film 25 was 1.8 kgf in Comparative Example 5, 1.1 kgf in Example 4, and 0.5 kgf in Example 6. In Comparative Example 5, a high numerical value was obtained due to an influence of the shift force generated due to the intersection angle caused by the shape change of the fixing film 25 in addition to the shift force due to the temperature rise of the non-sheet-passing portion Ar2. In Example 4, the shift force due to the temperature rise of the non-sheet-passing portion Ar2 was not different from that in Comparative Example 5, but since the shape change of the fixing film 25 in the width direction W was suppressed by the protruding guide portion 293, the intersection angle was not large, and thus, the shift force was able to be lower than that in Comparative Example 5. In Example 6, the shift force due to the temperature rise of the non-sheet-passing portion Ar2 was canceled by the shift flange unit 43, so that the shift force was able to be suppressed to be lower than that in Example 4.

As described above, in the fixing device 6E according to the present embodiment, the shift flange unit 43 is provided on the second side W2, and thus, it is possible to reduce the shift force due to the temperature rise of the non-sheet-passing portion Ar2. As a result, even in a configuration in which the deformation amount of the fixing film 25 tends to increase due to thinning of the fixing film 25 or the like, occurrence of the fixing failure and buckling can be suppressed, and a fixing device capable of achieving an increase in speed and an increase in life can be implemented. In addition, for example, the fixing film 25 of which the base layer 251 is further thinned can also be applied, so that cost reduction and the like can be achieved.

OTHER EMBODIMENTS

In each of the above-described embodiments, the image forming apparatus 100 that is a monochrome laser printer has been described as an example, but the present technology is not limited thereto. For example, the present disclosure may be applied to an image forming apparatus that is a full-color laser printer.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-194635, filed Nov. 15, 2023, which is hereby incorporated by reference herein in its entirety.

What is claimed is:

1. An image forming apparatus comprising:

an image forming unit configured to form a toner image on a sheet;

a fixing device configured to fix the toner image formed by the image forming unit to the sheet, the fixing device including:

a heating unit configured to heat a sheet; and a counter roller facing the heating unit and forming a fixing nip together with the heating unit; and a conveyance unit configured to convey the sheet toward the fixing device, wherein the fixing device is configured to fix a toner image borne on the sheet to the sheet by applying heat and pressure while conveying the sheet in a sheet conveyance direction at the fixing nip, wherein the conveyance unit is configured to convey the sheet to the fixing device such that one end portion of the sheet, in a width direction orthogonal to the sheet conveyance direction, conveyed to the fixing device passes through a predetermined position of the fixing nip in the width direction regardless of a size of the sheet, wherein the counter roller includes a roller portion including a base portion and an elastic layer provided around the base portion and having elasticity, wherein in a case where a side on which the predetermined position is positioned with respect to a central portion of the roller portion in the width direction is defined as a first side, and a side opposite to the first side is defined as a second side, the roller portion has a first end portion which is an end portion on the first side in the width direction, and a second end portion which is an end portion on the second side in the width direction, and wherein a thickness of the elastic layer at the second end portion is smaller than a thickness of the elastic layer at the first end portion.

2. The image forming apparatus according to claim 1, wherein a maximum outer diameter of the base portion at the second end portion is larger than a maximum outer diameter of the base portion at the first end portion.

3. The image forming apparatus according to claim 1, wherein an outer diameter of the central portion of the roller portion is smaller than a maximum outer diameter of the first end portion and a maximum outer diameter of the second end portion.

4. The image forming apparatus according to claim 1, wherein a maximum outer diameter of the second end portion of the roller portion is larger than a maximum outer diameter of the first end portion.

5. The image forming apparatus according to claim 4, wherein the maximum outer diameter of the second end portion is 101% or more and 103% or less of the maximum outer diameter of the first end portion.

6. The image forming apparatus according to claim 1, wherein the thickness of the elastic layer at the second end portion is 65% or more and 75% or less of the thickness of the elastic layer at the first end portion.

7. The image forming apparatus according to claim 1, wherein the roller portion includes a release layer provided around the elastic layer.

8. An image forming apparatus comprising:
- an image forming unit configured to form a toner image on a sheet;
- a fixing device configured to fix the toner image formed by the image forming unit to the sheet, the fixing device including:
  - a heating unit configured to heat a sheet;
  - a counter roller facing the heating unit and forming a fixing nip together with the heating unit; and
  - an urging unit configured to urge one of the heating unit and the counter roller toward the other one of the heating unit and the counter roller; and
- a conveyance unit configured to convey the sheet toward the fixing device,
- wherein the fixing device is configured to fix a toner image borne on the sheet to the sheet by applying heat and pressure while conveying the sheet in a sheet conveyance direction at the fixing nip,
- wherein the conveyance unit is configured to convey the sheet to the fixing device such that one end portion of the sheet, in a width direction orthogonal to the sheet conveyance direction, conveyed to the fixing device passes through a predetermined position of the fixing nip in the width direction regardless of a size of the sheet,
- wherein the counter roller includes a roller portion including a base portion and an elastic layer provided around the base portion and having elasticity,
- wherein in a case where a side on which the predetermined position is positioned with respect to a central portion of the roller portion in the width direction is defined as a first side, and a side opposite to the first side is defined as a second side, the roller portion has a first end portion which is an end portion on the first side in the width direction, and a second end portion which is an end portion on the second side in the width direction,
- wherein the urging unit is configured such that an urging force at the first end portion is larger than an urging force at the second end portion, and
- wherein the elastic layer includes a high-hardness region provided on the first side and having a hardness higher than that of the elastic layer at the central portion.

9. The image forming apparatus according to claim 8, wherein at least a part of the high-hardness region overlaps a conveyance region for a sheet having a minimum conveyance size when viewed in an intersecting direction intersecting the sheet conveyance direction and the width direction.

10. The image forming apparatus according to claim 8, wherein the elastic layer includes a low-hardness region provided on the second side and having a hardness lower than that of the elastic layer at the central portion.

11. The image forming apparatus according to claim 10, wherein the hardness of the elastic layer in the high-hardness region is 110% or more and 120% or less of the hardness of the elastic layer in the low-hardness region.

12. The image forming apparatus according to claim 8,
- wherein the urging unit includes a first urging portion configured to urge one of the heating unit and the counter roller toward the other one of the heating unit and the counter roller on the first side in the width direction, and a second urging portion configured to urge one of the heating unit and the counter roller toward the other one of the heating unit and the counter roller on the second side in the width direction, and
- wherein an urging force of the first urging portion is 130% or more and 170% or less of an urging force of the second urging portion.

13. The image forming apparatus according to claim 8, wherein the high-hardness region is positioned between the central portion and the predetermined position in the width direction.

14. An image forming apparatus comprising:
- an image forming unit configured to form a toner image on a sheet;
- a fixing device configured to fix the toner image formed by the image forming unit to the sheet, the fixing device including:
  - a heating unit configured to heat a sheet; and
  - a counter roller facing the heating unit and forming a fixing nip together with the heating unit; and
- a conveyance unit configured to convey the sheet toward the fixing device,
- wherein the fixing device is configured to fix a toner image borne on the sheet to the sheet by applying heat and pressure while conveying the sheet in a sheet conveyance direction at the fixing nip,
- wherein the conveyance unit is configured to convey the sheet to the fixing device such that one end portion of the sheet, in a width direction orthogonal to the sheet conveyance direction, conveyed to the fixing device passes through a predetermined position of the fixing nip in the width direction regardless of a size of the sheet,
- wherein the heating unit includes an endless rotary member that is rotatable and flexible, a heater disposed in an internal space of the rotary member and configured to heat the rotary member, and a restriction member,
- wherein the counter roller includes a roller portion including a base portion and an elastic layer provided around the base portion and having elasticity,
- wherein in a case where a side on which the predetermined position is positioned with respect to a central portion of the roller portion in the width direction is defined as a first side, and a side opposite to the first side is defined as a second side, the restriction member has a restriction surface configured to come into contact with an end surface of the rotary member on the second side in the width direction to restrict movement of the rotary member toward the second side, wherein the rotary member includes a base layer and an elastic layer provided around the base layer and containing a filler, and wherein the base layer has a protruding portion that protrudes in a first direction extending from the first side to the second side in the width direction relative to the elastic layer and is configured to come into contact with the restriction surface in the width direction.

15. The image forming apparatus according to claim 14, wherein the protruding portion is provided in a region of 70% or more of the end surface of the rotary member on the second side.

16. The image forming apparatus according to claim 14, wherein a protrusion amount of the protruding portion on the second side relative to the elastic layer in the width direction is 0.1 mm or more and 10 mm or less.

17. The image forming apparatus according to claim 14, wherein the protruding portion is configured to come into contact with the restriction surface to restrict contact of the elastic layer with the restriction surface.

18. The image forming apparatus according to claim 14, wherein the restriction member includes a guide portion provided so as to protrude from the restriction surface toward the rotary member in the width direction and configured to guide the rotary member by coming into contact with an inner circumferential surface of the rotary member.

19. The image forming apparatus according to claim 18, wherein a protrusion amount of the protruding portion on the second side relative to the elastic layer is smaller than a length of the guide portion in the width direction.

20. The image forming apparatus according to claim 14, wherein the elastic layer is a first elastic layer, wherein the roller portion includes the base portion and a second elastic layer provided around the base portion and having elasticity, wherein an inner circumferential surface of the base layer is electrically grounded, and wherein an end surface of the protruding portion on the second side is provided downstream in the first direction relative to an end surface of the second elastic layer on the second side.

21. The image forming apparatus according to claim 14, wherein the base layer is made of a resin material.

22. The image forming apparatus according to claim 14, wherein the filler is made of an inorganic material.

23. The image forming apparatus according to claim 22, wherein the filler contains ceramic powder, metal oxide powder, or metal powder.

24. The image forming apparatus according to claim 23, wherein the filler contains alumina, metallic silicon, silicon carbide, or zinc oxide.

25. An image forming apparatus comprising:

an image forming unit configured to form a toner image on a sheet;

a fixing device configured to fix the toner image formed by the image forming unit to the sheet, the fixing device including:

a heating unit configured to heat a sheet; and a counter roller facing the heating unit and forming a fixing nip together with the heating unit; and a conveyance unit configured to convey the sheet toward the fixing device, wherein the fixing device is configured to fix a toner image borne on the sheet to the sheet by applying heat and pressure while conveying the sheet in a sheet conveyance direction at the fixing nip, wherein the conveyance unit is configured to convey the sheet to the fixing device such that one end portion of the sheet, in a width direction orthogonal to the sheet conveyance direction, conveyed to the fixing device passes through a predetermined position of the fixing nip in the width direction regardless of a size of the sheet, wherein the heating unit includes an endless rotary member that is rotatable and flexible, a heater disposed in an internal space of the rotary member and configured to heat the rotary member, a first support member disposed in the internal space and configured to support the heater, and a second support member disposed in the internal space and configured to support the first support member, wherein the counter roller includes a roller portion including a base portion and an elastic layer provided around the base portion and having elasticity, wherein in a case where a side on which the predetermined position is positioned with respect to a central portion of the roller portion in the width direction is defined as a first side, and a side opposite to the first side is defined as a second side, the first support member includes a first guide portion that is provided on the first side in the width direction and is configured to guide the rotary member at a position upstream of the fixing nip in the sheet conveyance direction, and a second guide portion that is provided on the second side in the width direction and is configured to guide the rotary member at a position upstream of the fixing nip in the sheet conveyance direction, wherein the second support member has a facing portion that is positioned farther from the fixing nip than the first guide portion and the second guide portion in an orthogonal direction orthogonal to the sheet conveyance direction and the width direction, and faces an upstream part of an inner circumferential surface of the rotary member in the sheet conveyance direction, and wherein a distance from the facing portion to an upstream end of the second guide portion in the sheet conveyance direction is longer than a distance from the facing portion to an upstream end of the first guide portion in the sheet conveyance direction.

26. The image forming apparatus according to claim 25, wherein the first support member includes a third guide portion that is provided on the second side in the width direction, is configured to guide the rotary member at a position upstream of the fixing nip in the sheet conveyance direction, and is provided so as to be separated from the second guide portion in the width direction, and wherein a distance from the facing portion to an upstream end of the third guide portion in the sheet conveyance direction is shorter than the distance from the facing portion to the upstream end of the second guide portion in the sheet conveyance direction.

27. An image forming apparatus comprising:

an image forming unit configured to form a toner image on a sheet;

a fixing device configured to fix the toner image formed by the image forming unit to the sheet, the fixing device including:

a heating unit configured to heat a sheet; and a counter roller facing the heating unit and forming a fixing nip together with the heating unit; and a conveyance unit configured to convey the sheet toward the fixing device, wherein the fixing device is configured to fix a toner image borne on the sheet to the sheet by applying heat and pressure while conveying the sheet in a sheet conveyance direction at the fixing nip, wherein the conveyance unit is configured to convey the sheet to the fixing device such that one end portion of the sheet, in a width direction orthogonal to the sheet conveyance direction, conveyed to the fixing device passes through a predetermined position of the fixing nip in the width direction regardless of a size of the sheet, wherein the heating unit includes an endless rotary member that is rotatable and flexible, a heater disposed in an internal space of the rotary member and configured to heat the rotary member, a first support member disposed in the internal space and configured to support the heater, and a second support member disposed in the internal space and configured to support the first support member, wherein the counter roller includes a roller portion including a base portion and an elastic layer provided around the base portion and having elasticity, wherein the second support member has, at an end portion thereof located on a side opposite to the roller portion with respect to the fixing nip in an orthogonal direction orthogonal to the sheet conveyance direction and the width direction, a facing portion that faces an upstream part of an inner circumferential surface of the rotary member in the sheet conveyance direction, and wherein the heating unit includes a cover disposed on a side opposite to the predetermined position with respect to a central portion of the roller portion in the width direction, the cover being provided between the facing portion of the second support member and the upstream part of the inner circumferential surface of the rotary member in the sheet conveyance direction.

28. The image forming apparatus according to claim 27, wherein the cover is supported by the second support member.

29. The image forming apparatus according to claim 27, wherein the cover is made of a material having a thermal conductivity lower than that of the second support member.

30. An image forming apparatus comprising:

an image forming unit configured to form a toner image on a sheet;

a fixing device configured to fix the toner image formed by the image forming unit to the sheet, the fixing device including:

a heating unit configured to heat a sheet; and a counter roller facing the heating unit and forming a fixing nip together with the heating unit; and a conveyance unit configured to convey the sheet toward the fixing device, wherein the fixing device is configured to fix a toner image borne on the sheet to the sheet by applying heat and pressure while conveying the sheet in a sheet conveyance direction at the fixing nip, wherein the conveyance unit is configured to convey the sheet to the fixing device such that one end portion of the sheet, in a width direction orthogonal to the sheet conveyance direction, conveyed to the fixing device passes through a predetermined position of the fixing nip in the width direction regardless of a size of the sheet, wherein the heating unit includes an endless rotary member that is rotatable and flexible, a heater disposed in an internal space of the rotary member and configured to heat the rotary member, and a restriction member, wherein the counter roller includes a roller portion including a base portion and an elastic layer provided around the base portion and having elasticity, wherein in a case where a side on which the predetermined position is positioned with respect to a central portion of the roller portion in the width direction is defined as a first side, and a side opposite to the first side is defined as a second side, the restriction member has a restriction surface configured to come into contact with an end surface of the rotary member on the second side in the width direction to restrict movement of the rotary member toward the second side, and a guide portion provided so as to protrude from the restriction surface toward the rotary member in the width direction and configured to guide the rotary member by coming into contact with an inner circumferential surface of the rotary member, and wherein the restriction member is configured to move to a first position and a second position such that the guide portion of the restriction member positioned at the second position is located upstream in the sheet conveyance direction of the guide portion of the restriction member positioned at the first position, and is configured to move from the first position to the second position by the rotary member pushing the restriction surface in a first direction extending from the first side toward the second side in a case where the restriction member is positioned at the first position.

31. The image forming apparatus according to claim 30, wherein the restriction surface in a case where the restriction member is positioned at the second position is configured to be positioned downstream, in the first direction, of the restriction surface in a case where the restriction member is positioned at the first position.

32. The image forming apparatus according to claim 30, wherein the heating unit includes a support portion configured to support the restriction member in a movable manner, and an urging portion configured to urge the restriction member toward the first side with respect to the support portion, wherein one of the restriction member and the support portion includes a cam surface, wherein the other one of the restriction member and the support portion includes a slider configured to abut on the cam surface and slide, and wherein the cam surface and the slider are configured to guide the restriction member toward the second position by the restriction surface of the restriction member positioned at the first position receiving a pushing force against an urging force of the urging portion from the rotary member in the first direction.

33. The image forming apparatus according to claim 30, wherein the guide portion and the restriction surface are integrally formed.

34. The image forming apparatus according to claim 1, wherein the conveyance unit is disposed upstream of the image forming unit in the sheet conveyance direction.

35. The image forming apparatus according to claim 34, wherein the conveyance unit includes a side abutment plate, and a skew roller pair configured to convey the sheet simultaneously in the sheet conveyance direction and the width direction such that the one end portion of the sheet abuts the side abutment plate and passes through the predetermined position of the fixing nip.

* * * * *